(12) United States Patent
McDaniel

(10) Patent No.: US 7,586,490 B2
(45) Date of Patent: Sep. 8, 2009

(54) SYSTEMS AND METHODS FOR THREE-DIMENSIONAL SKETCHING

(75) Inventor: Richard McDaniel, Oakland, CA (US)

(73) Assignee: Siemens Aktiengesellschaft, Munich (DE)

( * ) Notice: Subject to any disclaimer, the term of this patent is extended or adjusted under 35 U.S.C. 154(b) by 624 days.

(21) Appl. No.: 11/111,168

(22) Filed: Apr. 20, 2005

(65) Prior Publication Data

US 2006/0082571 A1 Apr. 20, 2006

Related U.S. Application Data

(60) Provisional application No. 60/620,869, filed on Oct. 20, 2004.

(51) Int. Cl.
*G06T 11/20* (2006.01)
(52) U.S. Cl. ........................ 345/441; 345/419; 345/629; 382/181; 382/173
(58) Field of Classification Search ........................ None
See application file for complete search history.

(56) References Cited

U.S. PATENT DOCUMENTS

| | | | | |
|---|---|---|---|---|
| 4,058,849 A | * | 11/1977 | Fitzgerald et al. | 358/1.2 |
| 5,012,521 A | * | 4/1991 | Endo et al. | 382/189 |
| 5,068,804 A | * | 11/1991 | Watanabe et al. | 358/452 |
| 5,467,411 A | * | 11/1995 | Tanaka et al. | 382/113 |
| 5,544,265 A | * | 8/1996 | Bozinovic et al. | 382/203 |
| 5,771,342 A | * | 6/1998 | Todd | 345/660 |
| 5,805,168 A | * | 9/1998 | Minakata | 345/427 |
| 5,990,900 A | * | 11/1999 | Seago | 345/427 |
| 6,054,990 A | * | 4/2000 | Tran | 715/863 |
| 6,067,094 A | * | 5/2000 | Schuster | 345/441 |
| 6,233,351 B1 | * | 5/2001 | Feeney et al. | 382/155 |
| 6,289,513 B1 | | 9/2001 | Bentwich | |
| 6,292,190 B1 | * | 9/2001 | Corn | 345/427 |
| 6,308,144 B1 | * | 10/2001 | Bronfeld et al. | 703/2 |
| 6,549,201 B1 | * | 4/2003 | Igarashi et al. | 345/423 |
| 6,618,040 B1 | * | 9/2003 | Mattaway et al. | 345/173 |
| 6,628,287 B1 | | 9/2003 | Duda et al. | |
| 7,058,896 B2 | | 6/2006 | Hughes et al. | |
| 7,149,665 B2 | | 12/2006 | Feld et al. | |
| 2003/0025713 A1 | * | 2/2003 | Wang et al. | 345/611 |
| 2004/0037463 A1 | * | 2/2004 | Calhoun et al. | 382/186 |
| 2004/0090439 A1 | * | 5/2004 | Dillner | 345/440 |
| 2004/0193428 A1 | * | 9/2004 | Fruchter et al. | 704/276 |

(Continued)

FOREIGN PATENT DOCUMENTS

WO WO 00/31689 A 6/2000

OTHER PUBLICATIONS

Zeleznik, Robert C. et al., "Sketch: An Interface for Sketching 3D Scenes", Research Director Computer Graphics, Brown University. [Retrieved Mar. 25, 2005] Retrieved from Internet: URL: <http://www.cs.brown.edu/people/bcz/sketch/sig.html> 23pgs.

(Continued)

*Primary Examiner*—Kee M Tung
*Assistant Examiner*—David H Chu

(57) ABSTRACT

Systems, methods and computer program code for three-dimensional sketching may comprise, according to some embodiments, receiving input from a computer-augmented surface such as a Liquid Crystal Display (LCD) of a tablet computer, recording the input as "digital ink", and interpreting the ink to convert the drawing into a three-dimensional sketch model.

40 Claims, 58 Drawing Sheets

U.S. PATENT DOCUMENTS

| | | | |
|---|---|---|---|
| 2005/0063594 A1* | 3/2005 | Li et al. | 382/206 |
| 2006/0001664 A1* | 1/2006 | Carbonera | 345/419 |
| 2006/0045337 A1* | 3/2006 | Shilman et al. | 382/181 |
| 2006/0045343 A1* | 3/2006 | Tremblay et al. | 382/186 |
| 2006/0082571 A1* | 4/2006 | McDaniel | 345/419 |
| 2006/0114252 A1* | 6/2006 | Ramani et al. | 345/419 |
| 2008/0010041 A1 | 1/2008 | McDaniel | |

OTHER PUBLICATIONS

"3D Studio Max", Discreet. [Retrieved Mar. 24, 2005] Retrieved from Internet: URL: http://www4.discreet.com/3dsmax/> 2pgs.

"Create Without Compromise", Pro/Engineer Wildfire, Parametric Technology Corporation. [Retrieved Mar. 24, 2005] Retrieved from Internet: URL: <http://www.ptc.com/cgi/common/print_version.pl> 2pgs.

Igarashi, Takeo "Teddy: A Sketching Interface for 3D Freeform Design". [Retrieved Mar. 24, 2005] Retrieved from Internet: URL: <http://www-ui.is.s.u-tokyo.ac.jp/~takeo/teddy/teddy.htm> 1pg.

"Adobe Photoshop: Professional Photo editing software", Adobe Systems Inc. [Retrieved Mar. 24, 2005] Retrieved from Internet: URL: <http://www.adobe.com/products/photoshop/main.html> 2pgs.

I. J. Grimstead and R. R. Martin, "Creating solid models from single 2D sketches", University of Wales College of Cardiff, *Solid Modeling '95*. Salt Lake City, Utah, 1995. 15pgs.

H. Lipson and M. Shpitalni, "Optimization-based reconstruction of a 3D object from a single freehand line drawing", *Computer-Aided Design*, vol. 28, pp. 651-663, 1996, 0010-4485(95)00081-X.

"LU Decomposition and Its Applications", *Numerical Recipes in C: The Art of Scientific Computing*, ISBN 0-521-43108-5, Cambridge University Press, 1988-1992. pp. 43-50.

L. Eggli, B.D. Bruderlin, and Gershon Elber, "Sketching as a Solid Modeling Tool", *Solid Modeling '95*, Salt Lake City, Utah, 1995. pp. 313-321.

Eggli, L. et al.: "Inferring 3D Models From Freehand Sketches and Constraints", Computer Aided Design, Elsevier Publishers BV., Barking, GB, vol. 29, No. 2, Feb. 1997, pp. 101-112, XP004070873, ISSN: 0010-4485.

Grimstead, I. J. et al.: "Creating Solid Models From Single 2D Sketches", Proceedings. Third Symposium on Solid Modeling and Application ACM New York, NY USA, 1995, pp. 323-337, XP000530132, ISBN: 0-89791-672-7, pp. 651-652.

Lipson, H. et al.: "Optimization-Based Reconstruction of a 3D Object From a Single Freehand Line Drawing", Computer Aided Design, Elsevier Publishers, BV., Barking, GB, vol. 28, No. 8, Aug. 1996, pp. 651-663, XP004022681, ISSN: 0010-4485.

Igarashi, T. et al.: Teddy: a Sketching Interface for 3D Freeform Design, Computer Graphics Proceedings, Siggraph 99, ACM New York, NY, USA, 1999, pp. 409-416, XP001024740, ISBN: 0-201-48560-5, p. 412.

Jenkins, D. L. et al.: "Applying Constraints to Enforce Users' Intentions in Free-Hand w-D Sketches", Intelligent System Engineering, Institution of Electrical Engineers, Stevenage, GB, vol. 1, No. 1, Sep. 21, 1992, pp. 31-49, XP000362701, ISSN: 0963-9640.

Lipson, H. et al.: "Conceptual Design and Analysis by Sketching", (AI EDAM) Artificial Intelligence for Engineering Design, Analysis and Manufacturing Cambridge University Press UK, vol. 14, No. 5, Nov. 2000, pp. 391-401, XP009054862, ISSN: 0890-0604.

U.S. Appl. No. 12/236,584, filed Sep. 24, 2008, McDaniel.

Masry, et al., "Freehand Sketching Interface for Progressive Construction and Analysis of 3D Objects", American Association for Artificial Intelligence, 2004, http://ccsl.mae.cornell.edu/papers/AAAI04_Masry.pdf.

\* cited by examiner

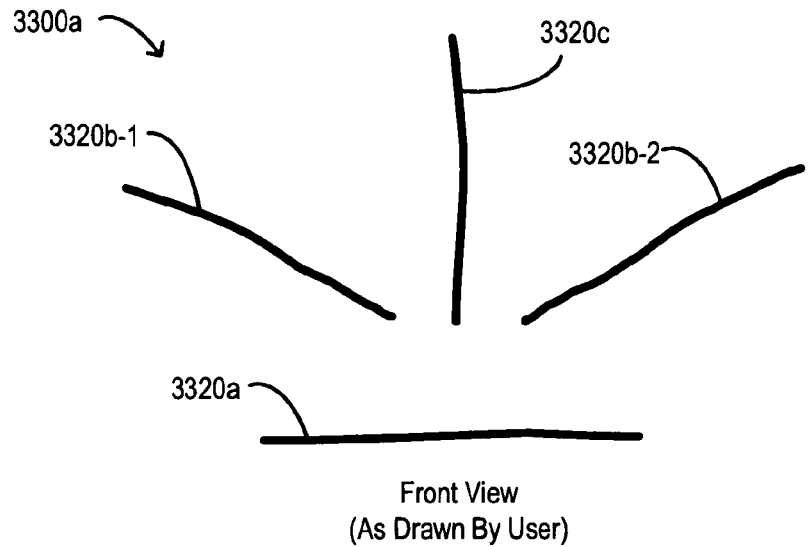
FIG. 33A
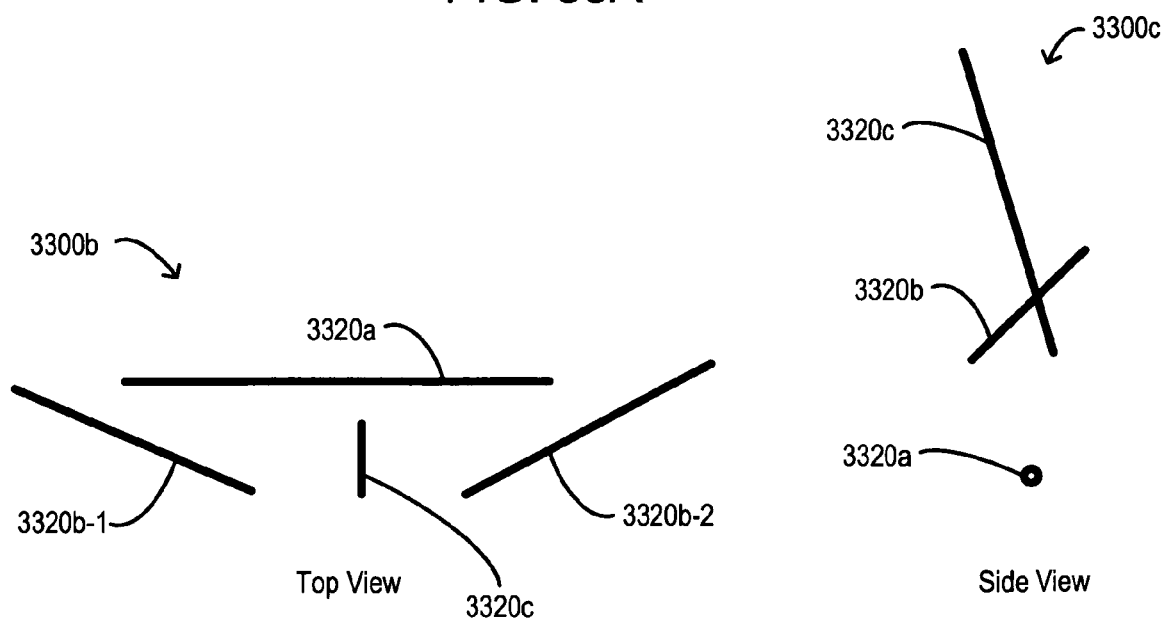
FIG. 33B
FIG. 33C

Front View
(As Drawn By User)

Side View

SYSTEMS AND METHODS FOR THREE-DIMENSIONAL SKETCHING

CROSS-REFERENCE TO RELATED APPLICATIONS

This application claims priority and benefit under 35 U.S.C. § 119(e) to U.S. Provisional Patent Application Ser. No. 60/620,869, entitled "Inferring 3D Geometry from Hand Drawn Ink Using Interaction, Constraints, and Refinement", filed in the name of McDaniel on Oct. 20, 2004, the contents of which are hereby incorporated by reference in their entirety for all purposes.

BACKGROUND

The present disclosure relates generally to systems and methods for three-dimensional sketching and, more particularly, to the inference of three-dimensional geometry from hand-drawn graphical input.

Sketches are used by a variety of individuals within many professional, academic, and technical fields. Designers, teachers, architects, and engineers, for example, may utilize sketches to facilitate conceptualization of new products or ideas. The emerging field of three-dimensional computerized sketching is directed to allowing a user to produce computerized three-dimensional images with an ease and informality comparable to traditional hand-sketching. Three-dimensional computerized sketching may provide many advantages over traditional hand-sketching. A three-dimensional computerized sketch may, for example, allow a user to view the sketch from any angle (e.g., rotate the sketch), add animation to the sketch, and/or perform other computer-augmented enhancements.

Computerized three-dimensional sketch interpretation can be performed either interactively or off-line. In an off-line system, complete two-dimensional drawings are scanned and interpreted by a system to convert them into three-dimensions. In an interactive system, the user draws lines as live input to the system. For interactivity, the accuracy of the three-dimensional analysis must be good, but does not need to be perfect, since the user is available to correct mistakes. However, to maintain interactive speeds, the three-dimensional analysis must be performed quickly to keep up with the user. Also, the analysis should be able to be augmented with feedback to inform the user of the system's results.

Typical three-dimensional drawing applications assume a structured approach where the user creates images by selecting appropriate primitives from a palette. The user sets instances of these primitives into the drawing surface and then manipulates them by setting their properties. Examples of structured three-dimensional modeling programs include three-dimensional Computer Aided Design (CAD) and three-dimensional modeling tools. Three-dimensional CAD tools are used to develop precise, three-dimensional descriptions of physical objects from anything like a house to a toothpaste cap. Special attention in three-dimensional CAD is paid to dimensions and details. Three-dimensional CAD tools may include, for example, tools such as Pro/ENGINEER™ and AutoCAD® 2005 tools. Three-dimensional modeling tools are used to create three-dimensional shapes for purposes such as animation or games. Modeling tools are used to create the shapes of characters and objects. These shapes are then transferred to other tools where they are parameterized to be animated or used in whatever manner is intended. An example of a three-dimensional modeling tool is 3ds Max® 7 tool.

Hand-drawn images are typically created on a computer using two-dimensional "painting" programs. A painting program treats the computer's bitmap display as a canvas for paint. The user selects tools that emulate various kinds of paintbrushes or other pigmentation devices and applies their effect to different portions of the display. The final image is effectively a two-dimensional rectangle of colored pixels. An example of a two-dimensional painting program is Photoshop®.

Some of the properties of three-dimensional drawing and two-dimensional painting may be combined by rendering the two-dimensional image using three-dimensional geometry. This technique is called a "texture map". Instead of coloring the pixels of a three-dimensional model using computed colors, one chooses the color from a two-dimensional rectangle of pixels. However, this technique does not create three-dimensional geometry from the two-dimensional painting. Instead, it uses three-dimensional geometry created from another source.

Some research systems, such as Robert Zeleznik's SKETCH, convert pen input into three-dimensional geometry using a gesture-based approach. Pen-based gestures are specific marks or stroke patterns that represent commands to the system. For instance, drawing three lines into a single corner point may invoke a command for creating a cubic primitive. The corner of the primitive is placed where the three lines intersect and the sizes of the primitive's edges are made relative to the size of the original marks. Some systems also combine pen gestures with menu-based commands to achieve a similar effect.

Other research systems, such as Quick-sketch by Eggli, allow the designer to draw lines using a pen, but immediately convert the strokes into a set of basic primitives. The imprecisely sketched look of the designer's lines is immediately replaced with smooth lines and arcs. This transformation of sketched lines into straight lines is called performing "clean up" on the image. The goal of these systems is to disambiguate the designer's drawing at the first opportunity. Users of these systems are restricted to drawing only the types of images that the system is able to recognize. This restriction makes systems that clean up the designer's sketches similar to the gesture-based approach.

Another class of research systems attempts to convert paper-based drawings into three-dimensional geometry. The intention is to allow the designer to draw the sketch in a standard two-dimensional medium like paper. The entire drawing is then scanned to convert it into a digital representation. The image is then converted into three-dimensional geometry all at once. One advantage of this technique is that it allows a designer to work with standard paper and pencil instead of using a digital ink device. It also allows one to convert pre-existing sketches the same way. The algorithms for recognizing constraints are limited and can only handle specific geometries and kinds of drawings. When applied to an entire drawing, these algorithms may often fail. As a result, current systems that use this technique restrict the kinds of drawings that they can handle. For example, curved lines or lines that emanate from a surface are always excluded. Grimstead and Martin created one example of this kind of tool that can only handle cubic geometries with three line point intersections. Shptalni and Lipson created a similar but more advanced system that used a genetic algorithm to select which constraints to apply.

The Teddy system by Igarashi supports a restricted class of three-dimensional sketched drawings. This system combines some elements of gesture-based drawing with some forms of free-form drawing. Teddy allows the designer to draw cartoon character-like objects with balloon-like projections and appendages. The designer may use the system to draw a single closed surface with an arbitrary number of appendages that project outward from the body of the object. Line strokes drawn in Teddy are assumed to either fall on the object or are flat to the viewing plane. Also, the designer can only draw curved surfaces and not single lines or surfaces that meet at a corner.

Current three-dimensional drawing and sketching tools are therefore limited in functionality. Current systems may, for example, either convert a user's hand-drawn input into perfect three-dimensional shapes (e.g., not resembling a sketch), utilize the input to infer a command to create a perfect three-dimensional shape, and/or may limit the types of objects that the user may draw.

Accordingly, there is a need for systems and methods for three-dimensional sketching that address these and other problems found in existing technologies.

SUMMARY OF THE INVENTION

Methods, systems, and computer program code are therefore presented for three-dimensional sketching.

According to some embodiments, systems, methods, and computer code are operable to receive an indication of graphical input data, simplify one or more segments of the graphical input data, group the simplified segments of the graphical input data to form one or more spine lines, create one or more framework objects for one or more portions of the spine lines, identify joins between the one or more framework objects, and group the one or more portions of the spine lines into recognizable structures. Some embodiments may also or alternatively be operable to determine to convert the graphical input data into three-dimensional data.

In some embodiments, systems, methods, and computer code are operable to determine a framework associated with graphical input data, determine one or more positional constraints, determine one or more first directional constraints, solve the one or more first directional constraints, solve the one or more positional constraints, and define one or more second directional constraints.

According to some embodiments, systems, methods, and computer code are operable to determine a framework associated with graphical input data, determine one or more constraints associated with the framework, wherein the one or more constraints comprise at least one or more directional constraints, identify gaps within the framework, and adjust the one or more directional constraints to close the identified gaps.

In some embodiments, systems, methods, and computer code are operable to receive an indication of graphical input data, simplify one or more segments of the graphical input data, group the simplified segments of the graphical input data to form one or more spine lines, create one or more framework objects for one or more portions of the spine lines, identify joins between the one or more framework objects, group the one or more portions of the spine lines into recognizable structures, determine one or more positional constraints, determine one or more first directional constraints, solve the one or more first directional constraints, solve the one or more positional constraints, define one or more second directional constraints, identify gaps within the framework, and adjust at least one of the one or more first directional constraints or the one or more second directional constraints to close the identified gaps. Some embodiments may also or alternatively be operable to determine to convert the graphical input data into three-dimensional data.

With these and other advantages and features of embodiments that will become hereinafter apparent, embodiments may be more clearly understood by reference to the following detailed description, the appended claims and the drawings attached herein.

BRIEF DESCRIPTION OF THE DRAWINGS

FIGS. 33A, 33B, & 33C are diagrams of a drawing according to some embodiments;

DETAILED DESCRIPTION OF SPECIFIC EMBODIMENTS

Figure 1:
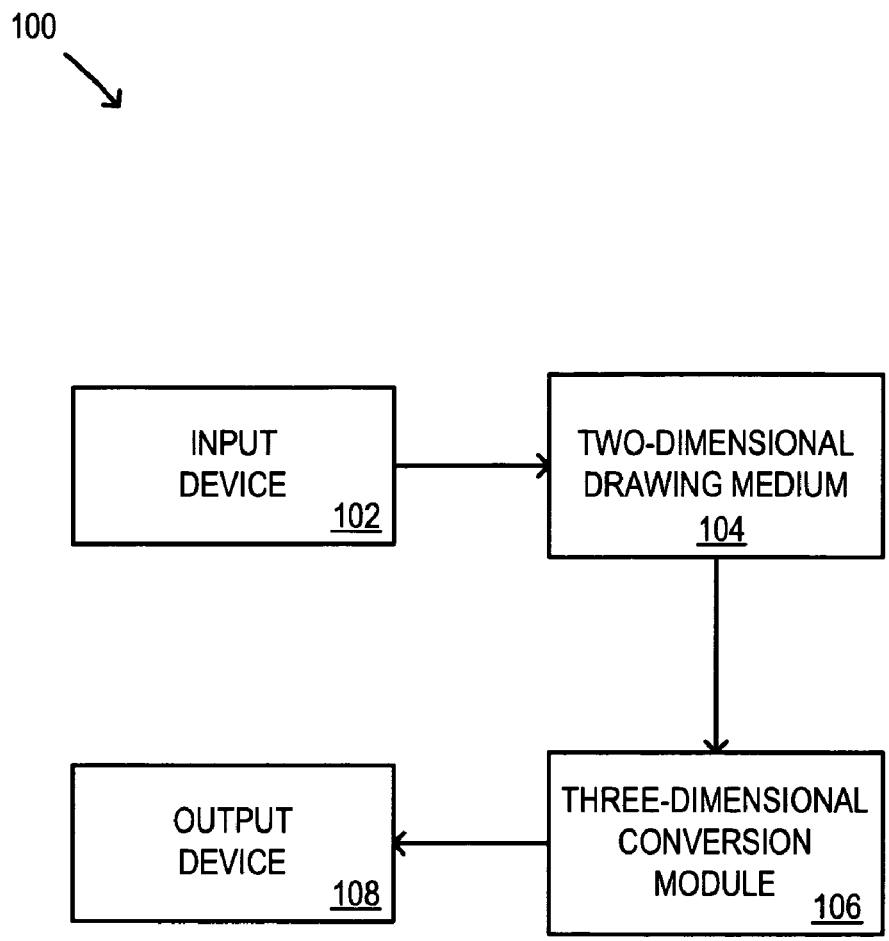
FIG. 1 is a block diagram of a system according to some embodiments.

According to some embodiments, systems and methods for interpreting hand-drawn lines as three-dimensional geometry may be provided. Referring to FIG. 1, for example, a block diagram of a system 100 according to some embodiments is shown. The various systems described herein are depicted for use in explanation, but not limitation, of described embodiments. Different types, layouts, quantities, and configurations of any of the systems described herein may be used without deviating from the scope of some embodiments. Fewer or more components than are shown in relation to the systems described herein may be utilized without deviating from some embodiments.

The system 100 may comprise, for example, an input device 102, a two-dimensional drawing medium 104, a three-dimensional conversion module 106, and/or an output device 108. In some embodiments, a user may utilize the input device 102 to create, define, and/or edit a two-dimensional drawing via the two-dimensional drawing medium 104. The input device may comprise, for example, a mouse, a pen, a keypad and/or keyboard, a digitizer, a combination thereof, and/or any other type or configuration of device that is or becomes known for facilitating drawing operations. In some embodiments, the input device 102 may comprise a digitizer pen and/or the two-dimensional drawing medium 104 may comprise a digitizer pad (e.g., for accepting input from the digitizer pen).

According to some embodiments, the two-dimensional drawing medium 104 may be in communication with the three-dimensional conversion module 106. The three-dimensional conversion module 106 may, for example, be an application stored and/or executed by a computer connected to the two-dimensional drawing medium 104. In some embodiments, the three-dimensional conversion module 106 may process input from the two-dimensional drawing medium 104 (and/or from the input device 102) to create a three-dimensional graphical model based upon the user's input.

The three-dimensional conversion module 106 may then, for example, send an image and/or other data associated with the three-dimensional model to the output device 108. In some embodiments, the output device 108 may be any type of output device that is or becomes known, including, but not limited to a display device such as a Cathode Ray Tube (CRT) and/or a Liquid Crystal Display (LCD). The three-dimensional conversion module 106 may, for example, cause an image of the three-dimensional model to be rendered on the output device 108 to be viewed by the user. In some embodiments, the three-dimensional conversion module 106 may perform, manage, conduct, and/or otherwise be associated with any of the methods and/or procedures described herein. The three-dimensional conversion module 106 may, for example, convert a user's hand-drawn input into a three-dimensional sketch.

Figure 2:
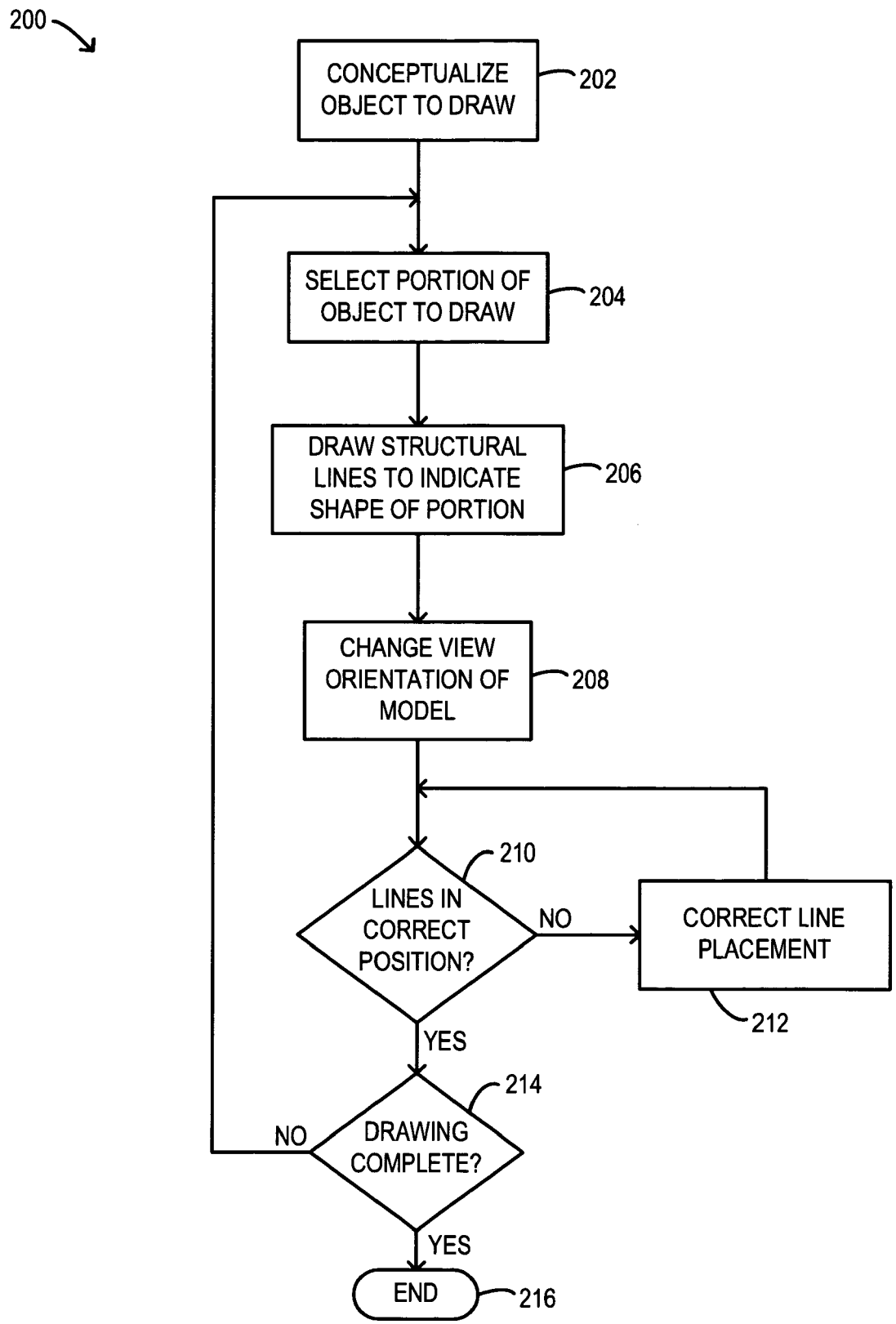
FIG. 2 is a flowchart of a method according to some embodiments.

Turning now to FIG. 2, a flowchart of a method 200 according to some embodiments is shown. In some embodiments, the method 200 may be performed by and/or otherwise associated with the system 100 and/or any of the components thereof, as described in conjunction with FIG. 1. The method 200 may, for example, be performed by and/or using the input device 102 and/or the two-dimensional drawing medium 104. A user may, in some embodiments, utilize the input device 102 and/or the two-dimensional drawing medium 104 to perform, at least partially, the method 200.

The flowcharts described herein do not necessarily imply a fixed order to the actions, and embodiments may be performed in any order that is practicable. Note that any of the methods described herein may be performed by hardware, software (including microcode), firmware, manual means, or any combination thereof. For example, a storage medium may store thereon instructions that when executed by a machine result in performance according to any of the embodiments described herein.

In some embodiments, the method 200 may be a method performed by a user to interact with a three-dimensional sketching tool (and/or the three-dimensional conversion module 106) to create and/or edit a three-dimensional sketch. The method 200 may begin, for example, to conceptualize an object to draw at 202. The role of the user may, according to some embodiments, be to conceptualize the object and then to segment that object into sections that can be drawn independently. The method 200 may continue at 204, for example, to select a portion of the object to draw. In some embodiments, the user may select a portion of the object to draw based at least in part on the way in which the three-dimensional sketching tool process hand-drawn input. Knowledge of the logic used to convert input into three-dimensional objects may, for example, allow the user to tailor a drawing style, method, and/or sequence to facilitate the minimization of logical processing errors. In some embodiments, a manual and/or other documentation associated with the three-dimensional sketching tool may, for example, describe preferred input methods that may reduce ambiguities and/or assist the tool in more accurately analyzing the user's input.

According to some embodiments, the method 200 may continue at 206 to draw structural lines to indicate a shape of the selected portion of the object. The user may, for example, form the object by drawing lines that convey its three-dimensional shape and structure. These kinds of lines may be distinguished from other strokes, according to some embodiments, that may be used to paint the color of the object, provide shading, and/or indicate other kinds of decoration. Structural lines may also be referred to as "contour lines" because they may be used to reveal the contours of curved surfaces in a traditional sketch. In some embodiments, the user may draw only structural lines, at least when initially drawing the object, to reduce the possibility of confusing the three-dimensional sketching tool (e.g., a shading line may otherwise accidentally be interpreted as a structural part of the object).

In some embodiments, the three-dimensional sketching tool may utilize these structural lines to infer a three-dimensional geometry and/or orientation for the portion of the object that has been drawn. The three-dimensional sketching tool may, for example, utilize the hand-drawn input from the user to infer three-dimensional positioning, line and/or object associations, and/or other three-dimensional model information. According to some embodiments, the three-dimensional sketching tool may create and/or edit a three-dimensional graphical model based upon the input from the user.

The method 200 may continue, according to some embodiments, to change the view orientation of the model at 208. Once the user has drawn the selected portion of the object at 208, for example, the user may rotate the view of the drawing to observe the inferred three-dimensional information computed by the three-dimensional sketching tool. According to some embodiments, the method 200 may continue at 210 to determine if the structural lines are correctly oriented in three-dimensions. In the case that the three-dimensional sketching tool fails to properly place any of the drawn lines in the third dimension (e.g., assuming the user defined the position of the lines in the first two dimensions by providing the input), for example, the method may continue to 212 to correct the line placement. The user may, for example, use a mouse and/or digitizer pen to drag the rendered lines to new positions and/or orientations as desired. The method 200 may then, according to some embodiments, proceed back to 210 to determine if the lines are in the correct positions.

In the case that the drawn lines are in the correct and/or desired positions, the method 200 may continue, for example, to 214 to determine if the drawing is complete. In some embodiments, such as in the case of a simple graphical object, the user may select the entire object to draw at 204. The user may then determine at 214, for example, that the drawing is complete and the method 200 may end at 216. In the case that the user desires to continue drawing (e.g., the user has only drawn one of a plurality of portions of the desired object), the method 200 may continue back to 204 to select the next portion of the object (and/or next object) to draw. In such a manner, for example, portions of the drawing may be input by the user, rendered in three-dimensions by the three-dimensional sketching tool, and adjusted (if needed) by the user to convert hand-drawn input into a three-dimensional sketch.

Figure 3:
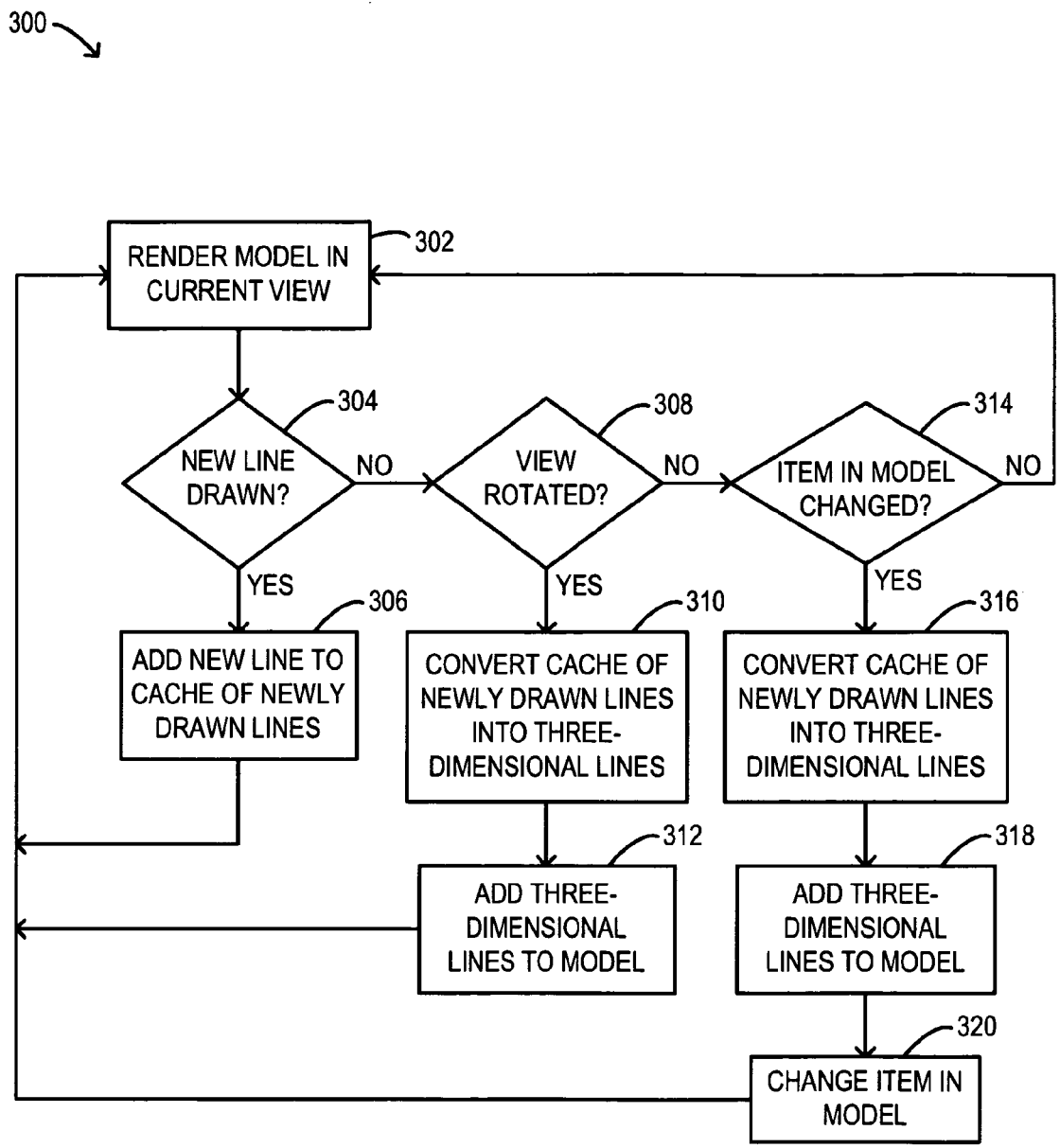
FIG. 3 is a flowchart of a method according to some embodiments.

Referring now to FIG. 3, a flowchart of a method 300 according to some embodiments is shown. The method 300 may, in some embodiments, be associated with the system 100 and/or any components thereof and/or may also or alternatively be associated with the method 200. The method 300 may, for example, be performed by the three-dimensional conversion module 106 to utilize a user's input to create a three-dimensional sketch. The user may, in some embodiments, perform the method 200 and/or any portion thereof, and the three-dimensional conversion module 106 may, for example, perform the method 300 in conjunction therewith to produce the three-dimensional sketch from the user's input.

According to some embodiments, the method 300 may begin at 302 to render the three-dimensional model in the current view. The three-dimensional model created, opened, loaded, and/or editing by the user, for example, may be displayed to the user in whatever orientation is currently desired (e.g., a default orientation and/or an orientation selected by the user). In some embodiments, the three-dimensional sketching tool may act as a command processor waiting for whatever the user does. The user may, for example, draw new lines, rotate the view, and/or perform other kinds of editing tasks. In some embodiments, the newly drawn lines input by the user may also or alternatively be rendered at 302 (e.g., as they are drawn). According to some embodiments, the lines input and/or drawn by the user may be similar to "ink strokes" and/or "ink lines" that a user may hand-draw, for example, in two-dimensions. The method 300 may continue, according to some embodiments, to determine if any new lines have been drawn, at 304. In some embodiments, any new lines may be cached at 306. The list of cached new lines may, for example, grow until the user has completed drawing a portion of a graphical object. Once a new line is added to the cache, the method 300 may continue back to 302 to continue rendering the model in the current view.

In the case that no new lines have been added, the method 300 may continue from 304, according to some embodiments, to determine if the drawing view has been rotated, at 308. If an indication is received from the user associated with rotating the view, for example, the method 300 may continue to 310 to convert the cache of newly drawn lines into three-dimensional lines. The newly drawn lines may be processed, for example, and then added to the three-dimensional model at 312. In some embodiments, the updated model may then be rendered and/or refreshed at 302.

In the case that no new lines have been added and the view has not been rotated, the method 300 may, according to some embodiments, continue to 314 to determine if any items in the model have been changed. If no model items have been changed, then the method 300 may, for example, revert to 302 to continue rendering the current view of the model. In such a manner, for example, the method 300 may loop to determine if and/or when new lines are added, the model view is changed, and/or items in the model are changed. In some embodiments, other and/or alternative user actions may be monitored and/or used to initiate changes to the graphical model.

According to some embodiments, if an item has been changed in the model (e.g., an attribute and/or parameter) then the method 300 may continue to 316 to convert the cache of newly drawn lines into three-dimensional lines. The lines may then, for example, be added to the three-dimensional model at 318. In some embodiments, the method 300 may also or alternatively continue to change the item in the model. In the case that the user issues a command to alter the existing model, for example, the three-dimensional sketching tool may make the requested change to the model and/or add any newly cached lines to the model. The method 300 may then, for example, continue to 302 to render and/or refresh the model view as is necessary and/or appropriate. In such a manner, for example, objects may be added to the graphical three-dimensional model in portions as desired and/or directed by the user. The practice of sporadic, delayed, scheduled, and/or structured additions to the three-dimensional model may, according to some embodiments, facilitate the reduction of errors in processing the inferred three-dimensional positions of any new lines and/or objects. Constraints between new and/or existing model objects may, for example, be more accurately defined by performing an analysis for each portion of an object drawn by a user (e.g., as opposed to trying to infer relationships for all portions of an object at once).

The three-dimensional sketching tool may, for example, interpret several lines together. Often, the position of a single line will be ambiguous until it is combined with others. Also, the user may draw a single line with multiple input strokes. In some embodiments for example, the user may draw a single conceptual line comprised of multiple newly drawn lines. Any other operation that requires the system to modify or view the data in three-dimensions may also or alternatively cause the system to convert the cached lines into three-dimensional lines. With the new lines positioned, they may, for example, become part of the three-dimensional model. The three-dimensional model is the system's internal representation for the object the user is drawing. The three-dimensional model may be represented entirely with three-dimensional geometry and can be rendered from any angle. In some embodiments, the point when cached lines are interpreted may be caused by internal signals. For example, the three-dimensional sketching tool's interpretation might be triggered by a timer and/or be caused by the length, number, and/or type of lines the user has drawn.

The user may, according to some embodiments, be an active participant in the line interpretation process. The user may, for example, choose what lines to draw and/or when the three-dimensional sketching tool is meant to interpret the lines and convert them to three-dimensions. By judiciously choosing the right point to commit newly drawn lines to the model, the user may aid the tool by giving it enough data to find the correct positions, but not so much as to overload it with spurious relationships. Also, the user may fix the tool's mistakes by manually editing any misplaced lines (e.g., at 212).

Figure 4:
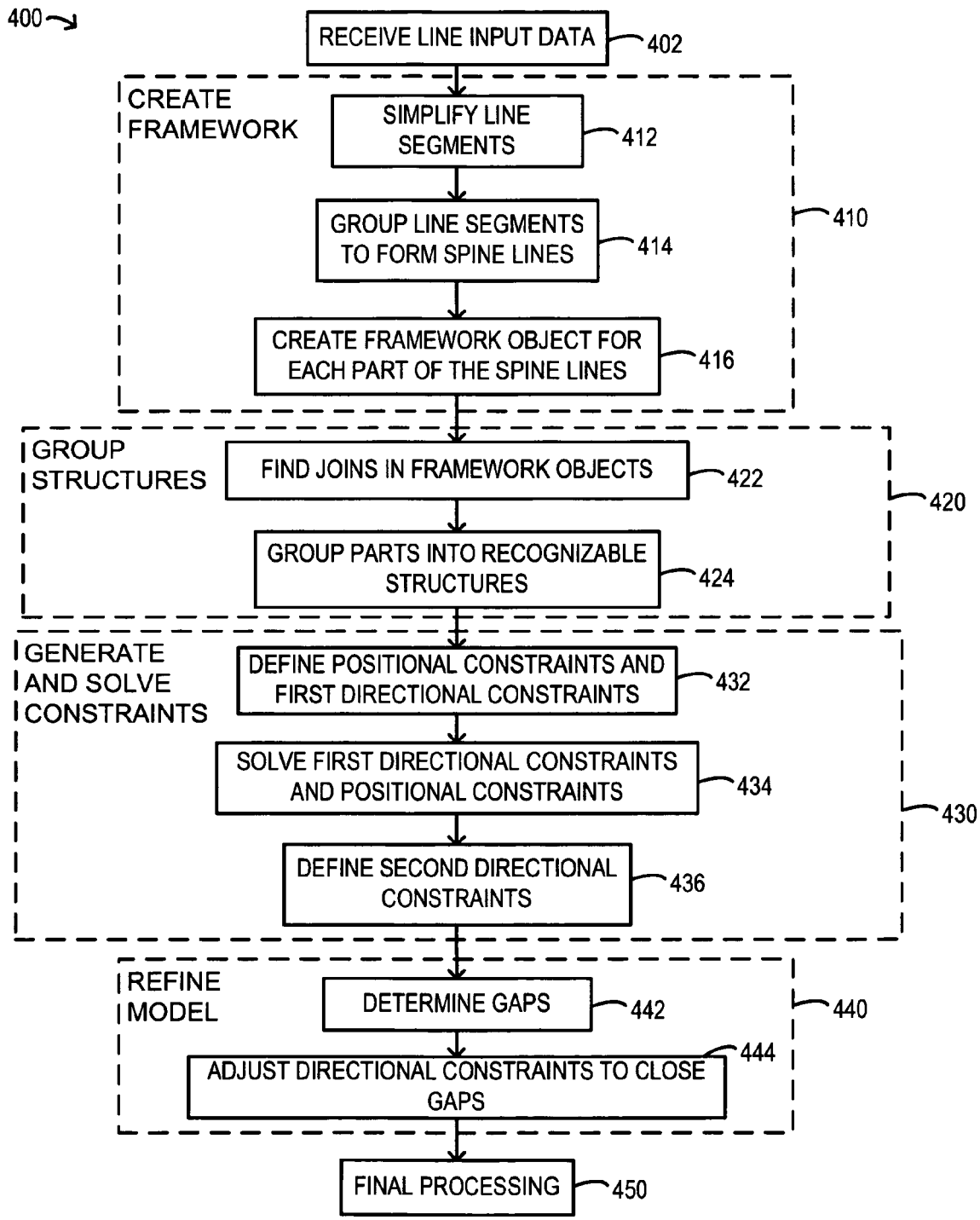
FIG. 4 is a flowchart of a method according to some embodiments.

Turning now to FIG. 4, a flowchart of a method 400 according to some embodiments is shown. The method 400 may, in some embodiments, be associated with the system 100 and/or any components thereof and/or may also or alternatively be associated with the methods 200, 300 described herein. The method 400 may, for example, be performed by the three-dimensional conversion module 106 to utilize a user's input to create a three-dimensional sketch. The user may, in some embodiments, perform the method 200 and/or any portion thereof, and the three-dimensional conversion module 106 may, for example, perform the method 400 in conjunction therewith to produce the three-dimensional sketch. In some embodiments, the method 400 may be or include portions of the method 300. The method 400 may, for example, be associated with the conversion of new lines into three-dimensional form and/or adding those lines to a three-dimensional model (e.g., at 310, 312, 316, and/or 318).

In some embodiments, the method 400 may be or include a line interpretation algorithm directed to converting hand-drawn input into a three-dimensional sketch. Interpretation may be described as a filtering and accumulation process that takes the raw input point data (e.g., from the user's hand-drawn lines) along with the three-dimensional model and successively transforms it into data structures that describe its role and position within the three-dimensional model. These kinds of analysis may be roughly broken into four phases. After the method 400 begins at 402 to receive the line input data, for example, the method 400 may continue by progressing through various analysis and/or logical phases. Each phase may, according to some embodiments, generate different kinds of data.

For example, the method 400 may continue to create a framework for the user's hand-drawn line input data, at 410. In some embodiments, this "primitive analysis" may utilize raw input data and turn it into something that can be managed by the succeeding phases. In some embodiments, the creating of the framework at 410 may comprise various sub-procedures. The raw data of any input line segments may first be simplified, at 412 for example, by reducing the number of points in each line segment and/or ink stroke. According to some embodiments, the reduced point data may then be more vigorously processed to compress and group ink strokes into line data. The reduced line segments may be grouped, at 414 for example, to form "spine" lines. The grouped line data is called the "spine" because it represents the overall position of the ink (e.g., the user's hand-drawn input). In some embodiments, the spine lines may tend to run smoothly down the center of potentially messily drawn ink strokes.

In some embodiments, the creating of the framework 410 may continue to create a framework object for each part of the spine lines, at 416. The spine line data may, for example, be divided into sections called "parts." In some embodiments, parts may either be straight or curved. These parts, together with points as well as planar structures (e.g., introduced in the next phase) may be called the "framework" or "frame." The frame acts as the skeleton of the model, according to some embodiments. The frame may generally, for example, be used to summarize the position of the spine lines.

The second phase of the method 400 may, according to some embodiments, take the results of the first phase (e.g., the creation of the framework 410) and build upon it by grouping the parts of the spine lines. The method 400 may continue, for example, to group structures at 420. The grouping of the structures 420 may, according to some embodiments, begin to find joins in the framework objects, at 422. The joins may, for example, comprise positional constraints associated with various framework objects. The framework objects created at 416, for example, may be analyzed to determine where joins may occur. In some embodiments, the grouping of the structures may continue at 424 to group the parts of the spine lines into recognizable structures. Recognizable structures may include, for example, ovals, straight lines, spirals, and/or other recognized and/or pre-determined shapes.

In the third phase, the method 400 may perform a searching and matching process to look for relationships between the identified points, parts, and groups. In some embodiments, the method 400 may continue, for example, to generate and solve constraints at 430. The generation and solving of the constraints 430 may, according to some embodiments, begin at 432 to define positional constraints and first directional constraints. Positions of various points, parts, and groups may, for example be represented by positional constraints, while orientations of objects, parts, and groups may be represented by positional constraints. According to some embodiments, the positional constraints defined at 432 may be in addition to any positional constraints (e.g., joins) determined at 422.

In some embodiments, the generation and solving of constraints 430 may continue to solve the first directional constraints and the positional constraints, at 434. Any or all positional constraints may be solved at 434. First positional constraints defined as joins at 422 and/or second positional constraints defined at 432 may, for example, be analyzed, filtered, and/or solved at 434. According to some embodiments, the directional constraints may be solved first, since they are not dependent upon the positions of the particular objects, parts, and/or groups. In some embodiments, the generation and solving of constraints 430 may continue to define second directional constraints at 436. The solving of the first directional constraints and the positional constraints may, for example, reveal more and/or more accurate information that allows the second directional constraints to be identified.

In the fourth phase, closing up gaps and pulling the parts together may complete the method 400. Solving the constraints (e.g., at 434) may, according to some embodiments, result in noticeable gaps appearing at ends of the parts. In some embodiments, gaps may be associated with framework parts whose constraints may not have been successfully solved. According to some embodiments, gaps may be formed even by successful constraints. In other words, constraints may be solved successfully, in some embodiments, as long as the framework parts are configured and/or oriented correctly, while framework irregularities may nonetheless result in gaps. In some embodiments, the method 400 may continue to refine the model at 440. The refining of the model 440 may, for example, determine gaps at 442 and/or adjust the directional constraints to close the gaps at 444. In some embodiments, the refining of the model 440 and/or the adjusting of the directional constraints 444 may be repeated as needed (i.e., iterated) to substantially close any identified gaps.

According to some embodiments, the method 400 may continue to undertake final processing at 450. The results of the various processing phases 410, 420, 430, 440 may, for example, be utilized to add the received line input data to a three-dimensional sketch model. The updated model may then be rendered (e.g., on a display device) to provide visual feedback to the user. In some embodiments, fewer or more procedures than are shown in FIG. 4 may be included in the method 400.

Figure 5:
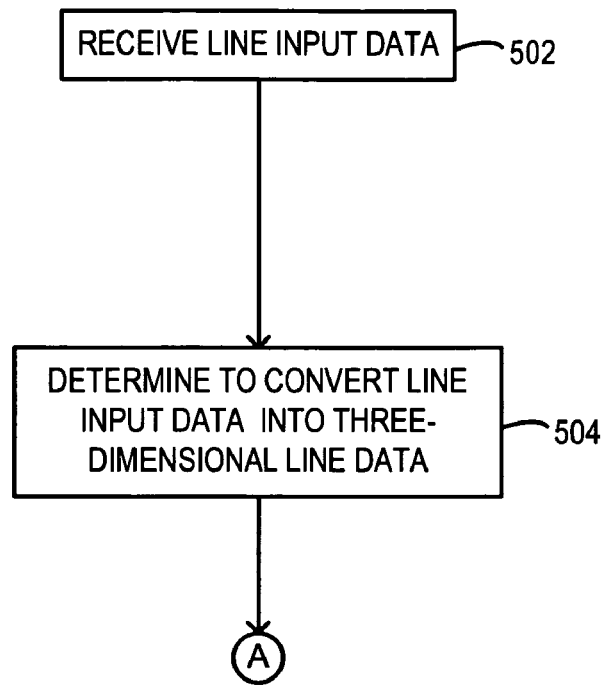
FIG. 5 is a flowchart of a method according to some embodiments.

Referring now to FIG. 5, a flowchart of a method 500 according to some embodiments is shown. The method 500 may, in some embodiments, be associated with the system 100 and/or any components thereof and/or may also or alternatively be associated with the methods 200, 300, 400 described herein. The method 500 may, for example, be a portion and/or continuation of the method 400 described in conjunction with FIG. 4. In some embodiments, the method 500 may begin to receive line input data at 502. The receiving at 502 may, according to some embodiments, be similar to the receiving at 402. A three-dimensional sketching tool may, for example, receive hand-drawn line data from a user (e.g., via an input device 102 such as a digitizer).

In some embodiments, the method 500 may continue to determine to convert the line input data into three-dimensional line data, at 504. As in the method 300, for example, the newly received line data may only be converted to three-dimensional line data upon the occurrence of certain pre-determined events. For example, new line data may be cached until a certain event occurs and/or until a certain condition becomes satisfied. In some embodiments, the determining at 504 may be to determine if and/or when the particular event occurs and/or the particular condition is satisfied. According to some embodiments, the determining at 504 may occur due to and/or as part of determinations such as the determinations made at 308 and/or 314. In some embodiments, the method 500 may then continue to and/or end at A.

Figure 6A:
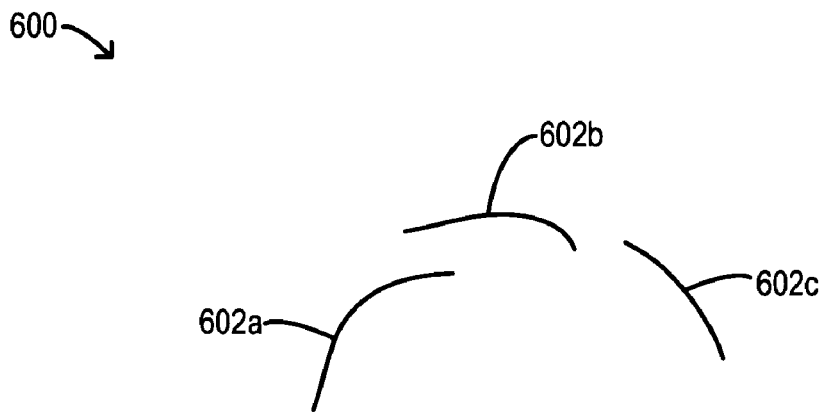
FIGS. 6A & 6B are diagrams of an exemplary drawing according to some embodiments.
Figure 6B:
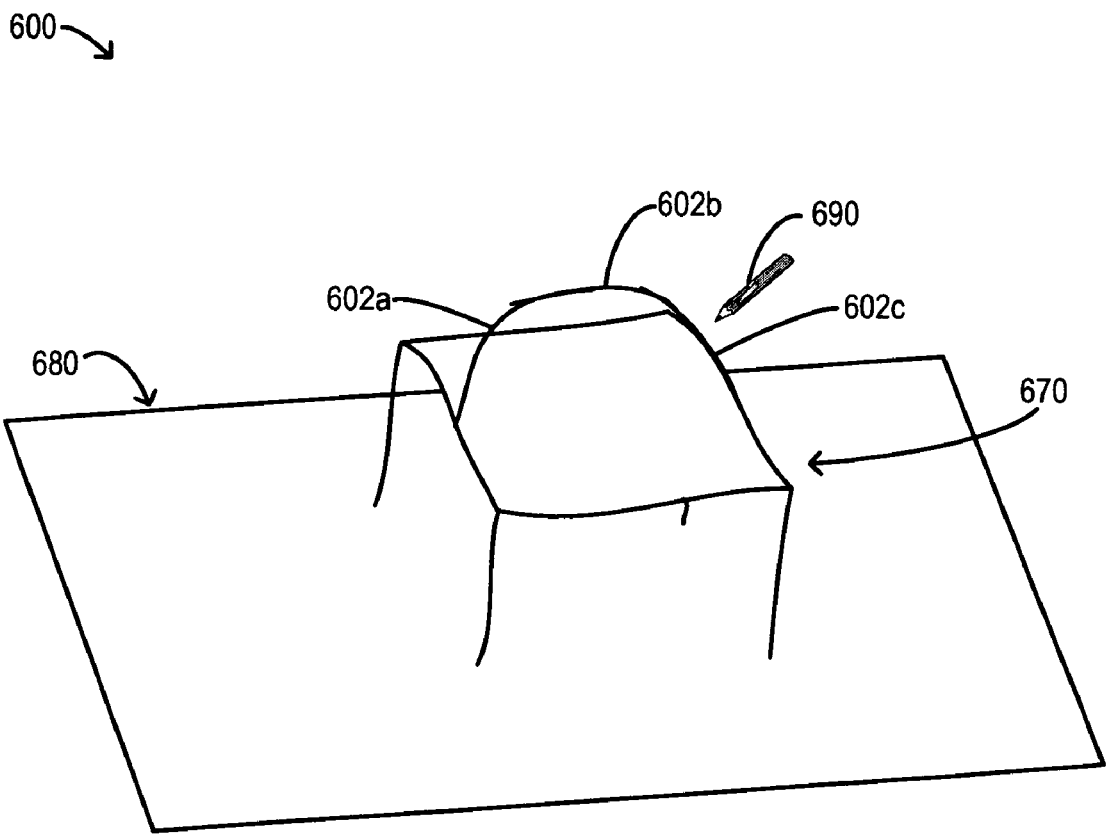

Turning to FIG. 6A and FIG. 6B, diagrams of an exemplary drawing 600 according to some embodiments are shown. The exemplary drawing 600 may, for example, be associated with the system 100 and/or with any of the methods 200, 300, 400, 500 described herein. In some embodiments, the exemplary drawing 600 may represent a three-dimensional sketch. The exemplary drawing 600 may comprise, for example, one or more input lines 602a-c associated with line input data received from a user. The exemplary drawing 600 may also or alternatively comprise, according to some embodiments, an existing drawing object 670 and/or an associated existing plane object 680. In some embodiments, the existing objects 670, 680 may be or include portions of an existing three-dimensional graphical model. The existing objects 670, 680 may, for example, be defined by various formulas, parameters, and/or values associated with a three-dimensional model that at least partially comprises and/or defines the exemplary drawing 600.

In some embodiments, the user may provide line input data such as by hand-drawing the input lines 602a-c. The user may utilize a sketching tool 690, for example, to facilitate the drawing of the input lines 602a-c. According to some embodiments, the sketching tool 690 may comprise a pointer such as a mouse and/or digitizer pointer. As show in FIG. 6B, the sketching tool 690 may, in some embodiments, resemble a pencil and/or other standard drawing device rendered for display to the user. The exemplary drawing 600 and the user's input lines 602a-c with respect thereto will be used hereinafter to provide an illustrative example of how some embodiments may process user input to create and/or edit a three-dimensional sketch.

In the example, the user may draw an input line 602 that resembles an arch shape. The input line 602 may, for example, arch over the top of an existing three-dimensional drawing object 670 such as the small table-like object shown in FIG. 6B. In some embodiments, such as shown in FIG. 6A, the user may draw the arched input line 602 as several input line strokes 602a-c. Together, the three input line strokes 602a-c in the example may, in some embodiments, span the upper surface of the existing table object 670 from one side to the other. According to some embodiments, these input line strokes 602*a-c* may be converted, by a graphical editing tool associated with the exemplary drawing 600, into three-dimensional lines. The input line strokes 602*a-c* may, for example, be added to the three-dimensional model that includes the existing table object 670 and/or the existing plane object 680 upon which the existing table object 670 sits.

Figure 7:
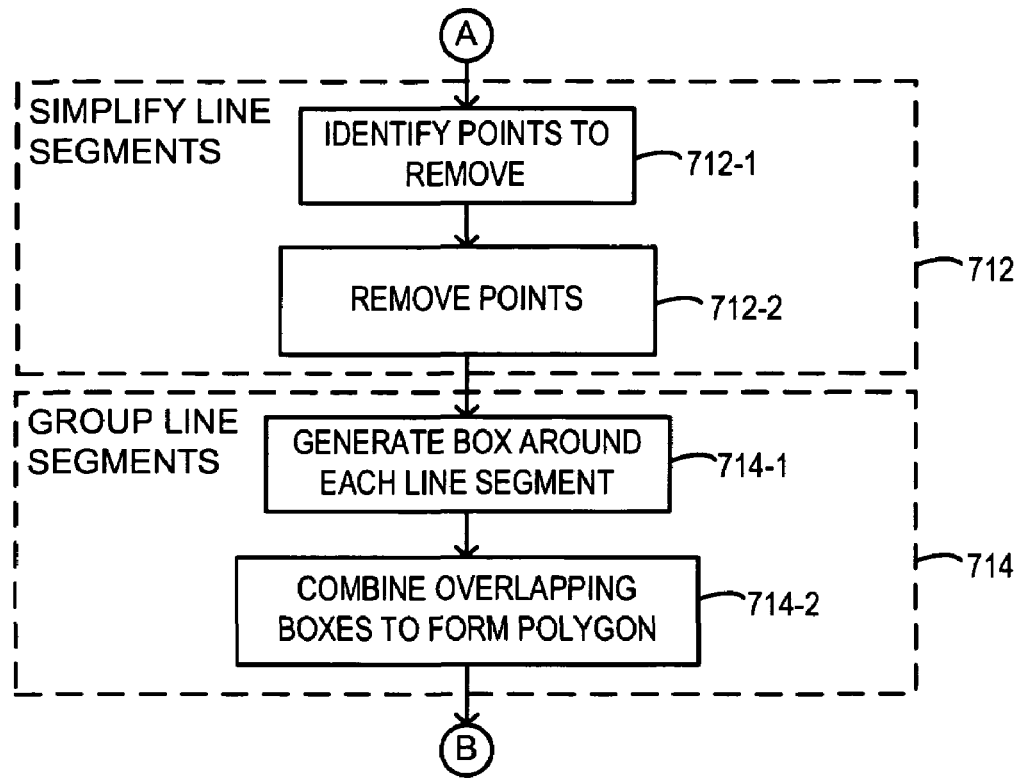
FIG. 7 is a flowchart of a method according to some embodiments.

Referring now to FIG. 7, a flowchart of a method 710 according to some embodiments is shown. The method 710 may, in some embodiments, be associated with the system 100 and/or any components thereof and/or may also or alternatively be associated with the methods 200, 300, 400, 500 described herein. The method 710 may, for example, be a portion and/or continuation of the method 400 described in conjunction with FIG. 4. The method 710 may, for example, be associated with the creation of the framework at 410. In some embodiments, the method 710 may also or alternatively be a continuation of the method 500. The method 710 may, for example, begin at A, where the method 500 left off. In some embodiments, the method 710 may also or alternatively be associated with the exemplary drawing 600 described in conjunction with FIG. 6A and FIG. 6B herein.

In some embodiments, the method 710 may continue from A to simplify input line segments at 712. The line segments input by the user (such as the input line strokes 602*a-c*) may, for example, be associated with many points defining the positions of the line segments. In the case that the user utilizes a digitizer, for example, each input line segment may be identified and/or defined by large numbers of points (e.g., as defined by the sampling rate of the digitizing device). According to some embodiments, this large number of points may not be desirable for converting the input line segments into three-dimensional lines. The amount of point data may, for example, be redundant and/or require large amounts of memory and/or processing power to compute.

Accordingly, the simplifying of the line segments 712 may begin, in some embodiments, to identify points to remove at 712-1. The graphical editing tool may, for example, parse the point data associated with the input line segments to determine which points are redundant, unnecessary, and/or otherwise should be removed. The simplifying of the line segments 712 may then continue, for example, to remove the points at 712-2. The points identified at 721-1 may, for example, be removed from the point data associated with the input line segments, deleted from the display, hidden, and/or otherwise removed. In some embodiments, the removed points and/or the raw point data (e.g., including the removed points) may also or alternatively be saved for future use.

In some embodiments, the method 710 may continue to group the line segments at 714. The grouping of the line segments 714 may, for example, begin to generate a box around each line segment, at 714-1. In some embodiments, the extents of each box may be offset from their associated line segment by a certain amount. According to some embodiments, the boxes may represent a fixed-distance from each line segment. The fixed-distance may, for example, be determined to be a distance within which any objects related to the line segments are likely to fall. Objects (such as other line segments) further from a line segment than the fixed-distance may, in some embodiments, be considered to be separate objects and/or otherwise not related to the line segment. In some embodiments, other methods of determining related objects may be utilized.

For example, instead of using boxes and/or fixed-distances to represent an area within which an object is likely to be related to a line segment, one or more statistical and/or probability areas may be used. Various parameters associated with the positioning of a line segment and/or how the line segment was drawn may, for example, be utilized to calculate a probability distribution area surrounding the line segment. In some embodiments, the probability area may not be uniform. The graphical editing tool may, for example, employ logic and/or rules that may be operable to identify various types and/or configurations of areas of probability surrounding line segments.

In some embodiments, the grouping of the line segments 714 may continue to combine overlapping boxes to form polygons at 714-2. It may be assumed, according to some embodiments, that any line segments having boxes (and/or probability distribution areas) that overlap and/or overlap to a certain extent may be related. Line segments that are substantially close, for example, may be different input strokes intended to be parts of the same input line segments. According to some embodiments, the combining of the boxes 714-2 may result in a polygon surrounding each group of related line segments. In the case that limited numbers of line segments are selected and/or drawn by the user at one time, the grouping of the line segments 714 may, according to some embodiments, be capable of identifying relationships between line segments while reducing the likelihood that false relationships are assumed. In some embodiments, the method 710 may continue and/or end at B.

Turning to FIG. 8A, FIG. 8B, FIG. 8C, and FIG. 8D, diagrams of a graphical analysis method 800 according to some embodiments are shown. The graphical analysis method 800 may, for example, be associated with the system 100 and/or with any of the methods 200, 300, 400, 500, 710 described herein. In some embodiments, the graphical analysis method 800 may be implemented with respect to the exemplary drawing 600 to produce a three-dimensional sketch. According to some embodiments, the graphical analysis method 800 may be an exemplary implementation of the method 710 described in conjunction with FIG. 7 herein. The graphical analysis method 800 may, for example, be associated with the simplifying of line segments at 712 and/or the grouping of line segments at 714.

Figure 8A:
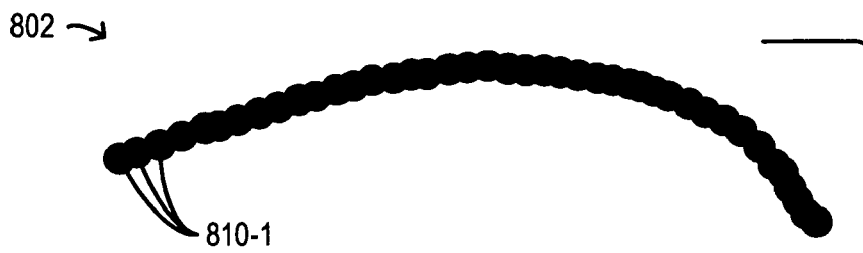
FIGS. 8A, 8B, 8C, & 8D are diagrams of a graphical analysis method according to some embodiments.
Figure 8B:
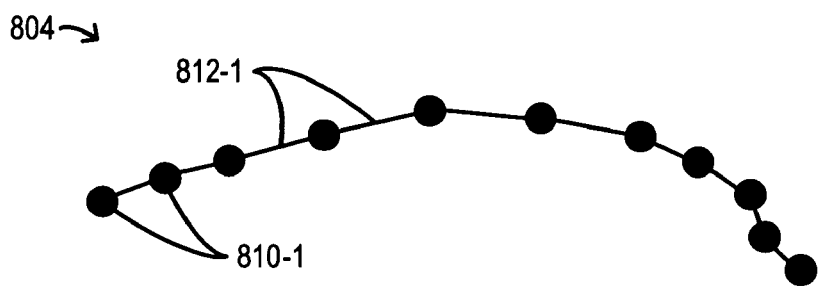

In FIG. 8A, for example, an input line 802 may be drawn by a user. In some embodiments, the input line 802 may be similar to the input line 602 and/or may be comprised by the input line strokes 602*a-c*. The input line 802 may, for example, be comprised of one or more line strokes input by the user. According to some embodiments, the input line 802 may be defined by a plurality of line points 810-1. The plurality of line points 810-1 may, for example, be points defined by a digitizing device utilized by the user. In some embodiments, the line points 810-1 of the input line 802 may be reduced to produce the simplified line 804, as shown in FIG. 8B. Any of the line points 810-1 deemed to be redundant and/or otherwise unnecessary may, for example, be removed. According to some embodiments, line segments 812-1 may be created and/or identified between any remaining line points 810-1.

Figure 8C:
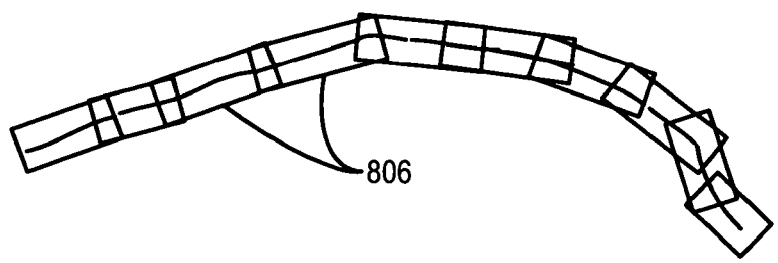
Figure 8D:
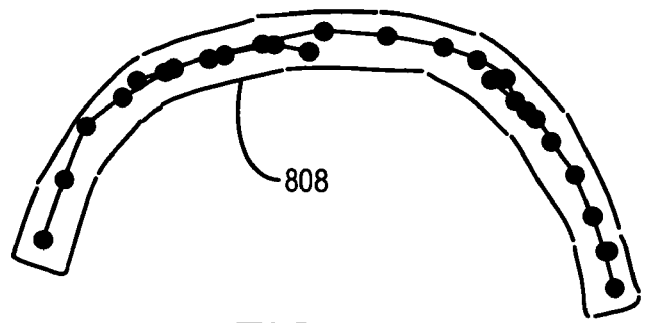

The line segments 812-1 of the simplified line 804 may then, for example, be compared to determine of any of the line segments 812-1 are related. Probability areas surrounding each line segment 812-1 may be created, in some embodiments, and the overlap of the probability areas may be utilized to group related line segments 812-1. Boxes 806 (and/or other forms of probability areas) may, according to some embodiments (such as shown in FIG. 8C), be drawn around each of the line segments 812-1 to represent an assumption about relationships of adjacent objects (such as other line segments 812-1). Overlapping boxes 806 may then, for example, be joined (e.g., via polygon union techniques) to create polygons surrounding each group of related line segments 812-1. As shown in FIG. 8D, for example, the three initial line input strokes (e.g., 602*a-c*) drawn by the user, and then converted into the simplified line 804, may be grouped to form the polygon 808. In such a manner, for example, the three-dimensional sketching tool may create a single grouping (e.g., represented by the polygon 808) representing the three input line strokes that the user likely intended to form a single sketched line.

Figure 9:
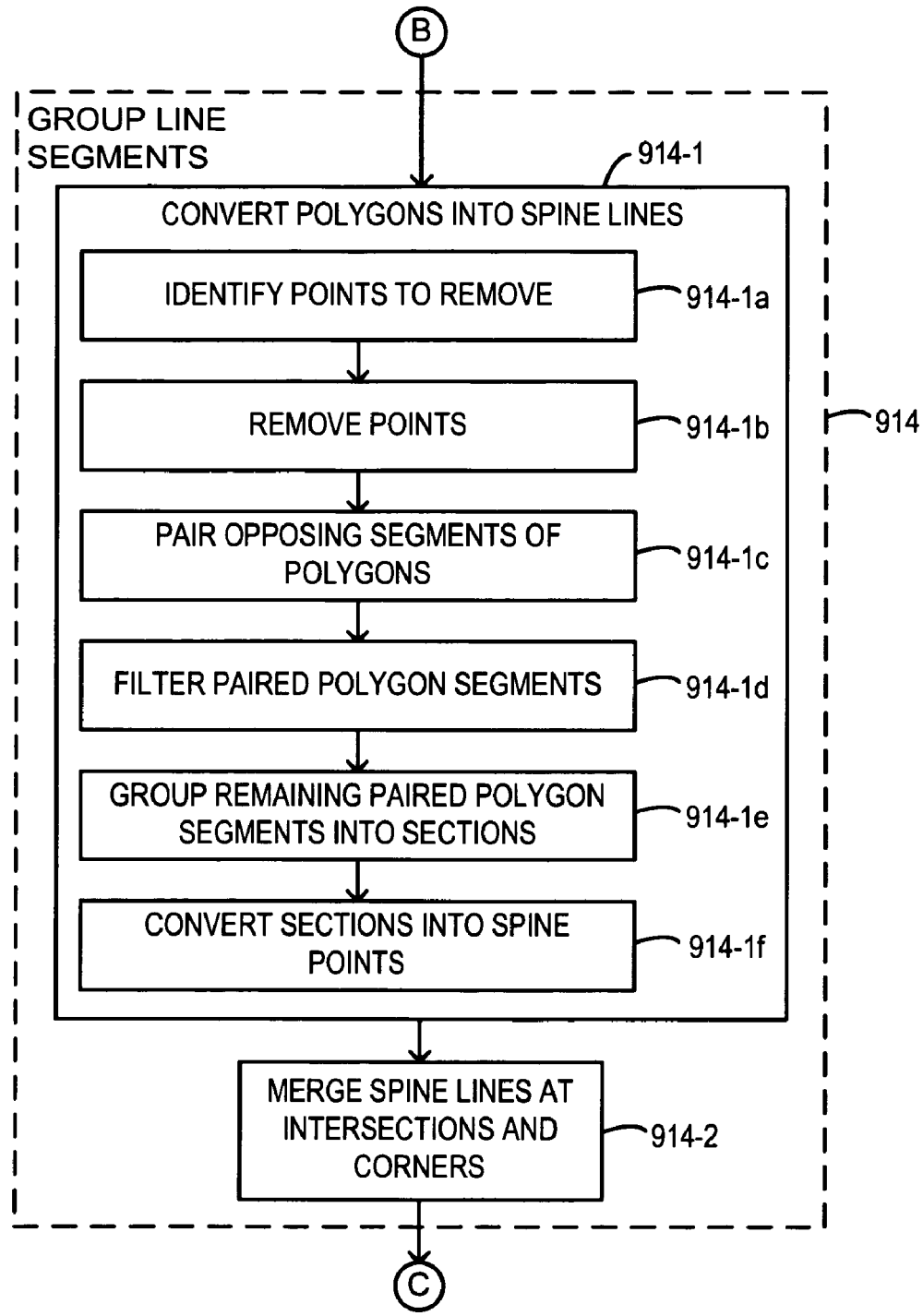
FIG. 9 is a flowchart of a method according to some embodiments.

Referring now to FIG. 9, a flowchart of a method 910 according to some embodiments is shown. The method 910 may, in some embodiments, be associated with the system 100 and/or any components thereof and/or may also or alternatively be associated with the methods 200, 300, 400, 500, 710 described herein. The method 910 may, for example, be a portion and/or continuation of the method 400 described in conjunction with FIG. 4. The method 910 may, according to some embodiments, be associated with the creation of the framework at 410. In some embodiments, the method 910 may also or alternatively be a continuation of the method 710. The method 910 may, for example, begin at B, where the method 710 left off. In some embodiments, the method 910 may also or alternatively be associated with the exemplary drawing 600 described in conjunction with FIG. 6A and FIG. 6B herein.

According to some embodiments, the method 910 may begin to group line segments at 914. The grouping of the line segments 914 may, for example, comprise continuing from B to convert polygons into spine lines, at 914-1. The polygon 808 formed in the graphical analysis method 800 may, for example, be utilized to define one or more spine lines for use in the continued analysis of the user's input. In some embodiments, the conversion of the polygons into spine lines 914-1 may begin to simplify the polygons. The conversion 914-1 may, for example, begin to identify points to remove at 914-1*a*. The conversion 914-1 may continue, according to some embodiments, to remove the identified points at 914-1*b*. The polygons may, for example, be simplified in a manner similar to that utilized to simplify the original input lines 602, 802 (e.g., at 712-1 and/or 712-2). Points of the polygons may be culled, filtered, and/or reduced, according to some embodiments, to simplify the polygon objects.

In some embodiments, the conversion of the polygons 914-1 may continue at 914-1*c* to pair opposing segments of the polygons. Polygon segments that are adjacent and point in the same direction, for example, may be paired to form more complete polygon segments. According to some embodiments, the conversion 914-1 may continue to filter the paired polygon segments at 914-1*d*. Any paired polygon segments determined to be redundant and/or otherwise unnecessary may, for example, be removed. In some embodiments, the conversion 914-1 may continue at 914-1*e* to group the remaining paired polygon segments into polygon sections. Shorter polygon pairs that are adjacent may, for example, be grouped to form a longer polygon section. According to some embodiments, the conversion 914-1 may conclude at 914-1*f* to convert the polygon sections into spine lines. Consecutive points on opposing sides of each polygon segment may, according to some embodiments, be connected by rung lines. In some embodiments, the midpoints of the rung lines may define points of the spine lines. The points may be connected by line segments, for example, to form the spine lines and/or complete the conversion of the polygons into the spine lines 914-1.

In some embodiments, the grouping of the line segments 914 may continue to merge spine lines at intersections and corners, at 914-2. Polygons joined at corners and/or intersections may, for example, leave gaps in the associated spine lines. According to some embodiments, these gaps may be closed by merging the spine lines. Corners, and/or intersections may, for example, be identified and/or analyzed to determine how the spine lines should be completed. The three-dimensional sketching tool may, for example, interpolate the spine lines to determine how they should be extended and/or competed to form corners and/or intersections as appropriate. In some embodiments, line segments may be added to the spine lines to form the corners and/or intersections. In some embodiments, the method 910 may continue and/or end by proceeding to C.

Figure 10:
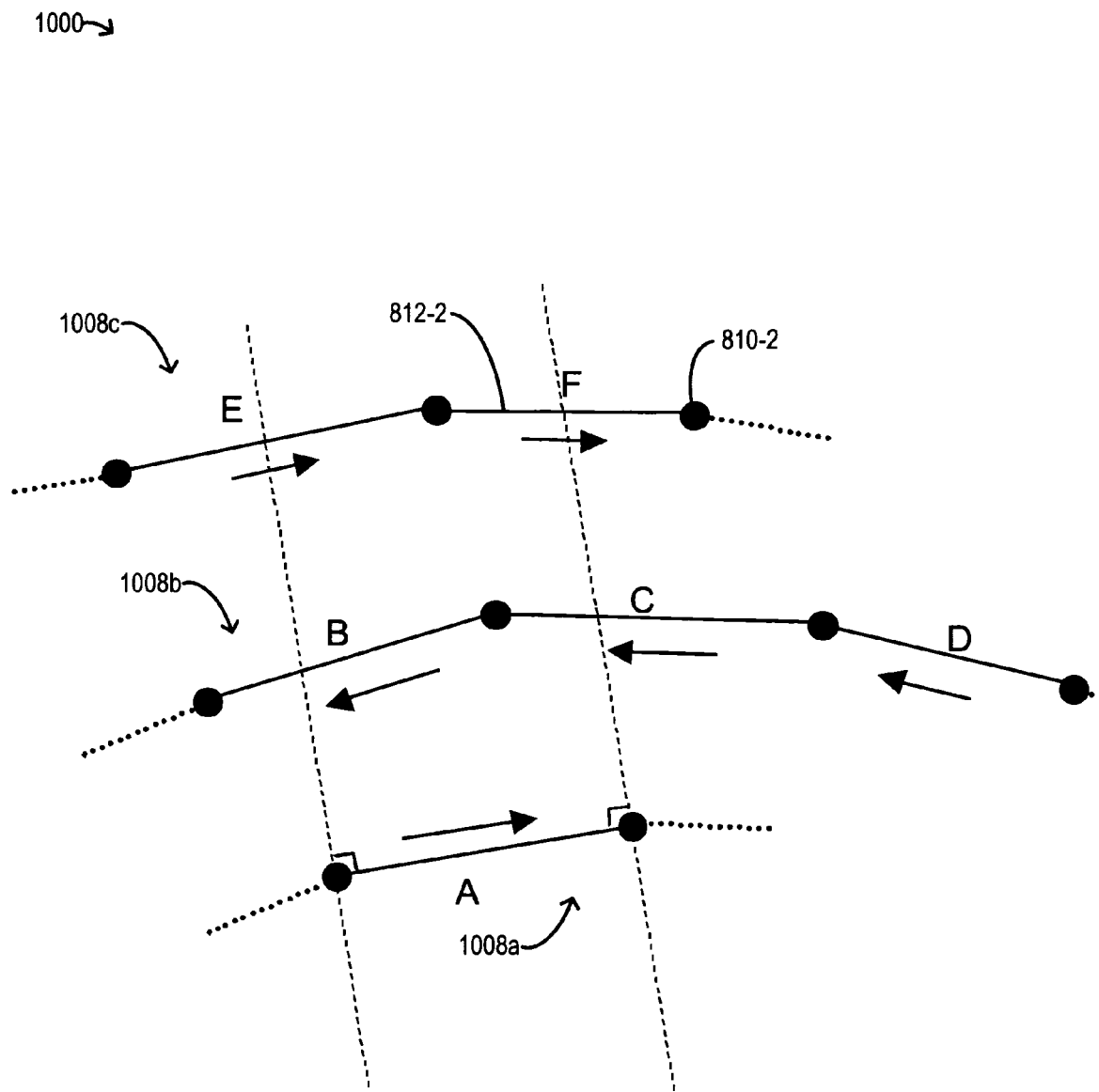
FIG. 10 is a diagram of a graphical analysis method according to some embodiments.

Referring to FIG. 10, for example, a diagram of a graphical analysis method 1000 according to some embodiments is shown. The graphical analysis method 1000 may, for example, be associated with the system 100 and/or with any of the methods 200, 300, 400, 500, 710, 910 described herein. In some embodiments, the graphical analysis method 1000 may be implemented with respect to the exemplary drawing 600 to produce a three-dimensional sketch. According to some embodiments, the graphical analysis method 1000 may be an exemplary implementation of the method 910 described in conjunction with FIG. 9. The graphical analysis method 1000 may, for example, be associated with pairing opposing line segments of polygons at 914-1*b*.

For example, various polygons 1008*a-c* may be analyzed to determine if they should be paired. Each polygon 1008*a-c* may, according to some embodiments, comprise any number of polygon points 810-2 connected by polygon line segments 812-2. As shown in FIG. 10, the first polygon 1008*a* (and/or portion thereof) may comprise one polygon line segment 812-2 identified as line segment "A". According to some embodiments, a convention may be assumed and/or utilized to analyze the polygons 1008*a-c*. Polygons 1008*a-c* may, for example, be analyzed by picking a polygon point 810-2 and proceeding along the polygon 1008*a-c* in a clockwise direction. In accordance with such a convention, the polygon line segment "A" may, for example, be determined to "point" toward and/or be directed toward the right (e.g., as indicated by the arrow in FIG. 10).

Similarly, the second polygon 1008*b* may comprise polygon line segments "B", "C", and "D", pointing toward the left, and/or the third polygon 1008*c* may comprise polygon line segments "E" and "F" pointing toward the right. In such a configuration, the polygons 1008*a-c* and their respective polygon line segments 812-2 may be analyzed in accordance with some embodiments. For example, polygon line segments 812-2 may be paired if they point in opposite directions and are "overlapped" by perpendicular extensions (e.g., the perpendicular dotted-lines shown in relation the polygon line segment "A"). In the example of FIG. 10, polygon line segments "B" and "C" may be paired with polygon line segment "A", for example, because polygon line segments "B" and "C" run in the opposite direction of polygon line segment "A" and are overlapped by the perpendicular extensions emanating from the polygon line segment "A". Polygon line segment "D" may not be paired, according to some embodiments, because polygon line segment "D" is not overlapped by the perpendicular extensions from polygon line segment "A".

According to some embodiments, polygon line segments "E" and "F" may be overlapped by the perpendicular extensions from polygon line segment "A", and may accordingly qualify to be paired with polygon line segment "A". Such a determination may depend upon the criteria established to analyze the polygons 1008*a-c* to determine if any polygon line segments 812-2 should be paired. The polygon line segments "E" and "F" may, according to some embodiments however, not be paired with polygon line segment "A" because they run in the same direction as polygon line segment "A".

Figure 11A:
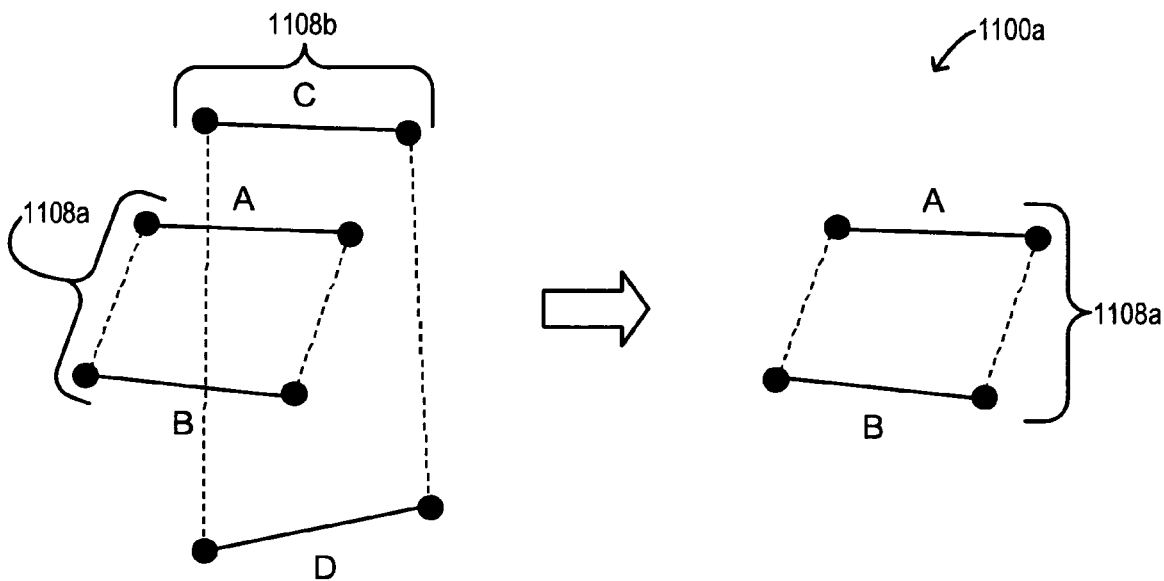
FIGS. 11A & 11B are diagrams of graphical analysis methods according to some embodiments.
Figure 11B:
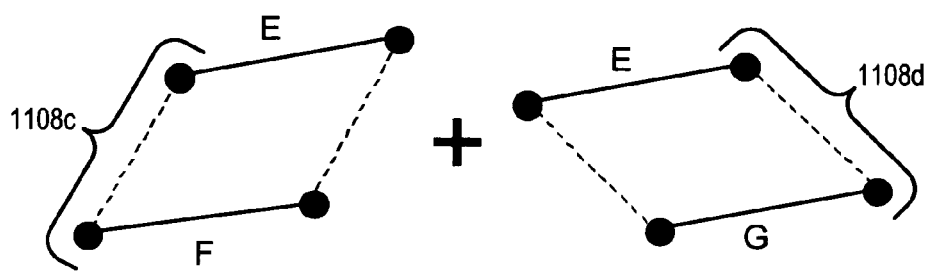
Figure 11B:
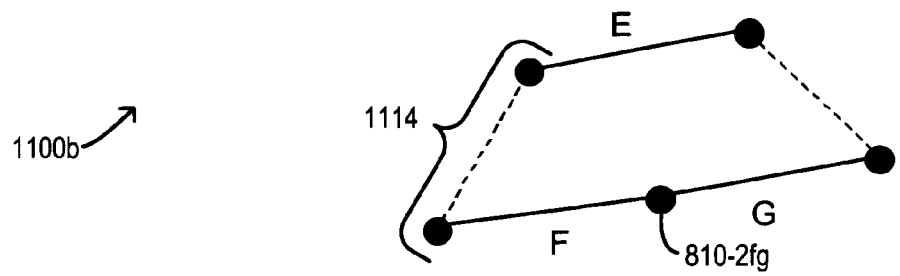

Turning to FIG. 11A and FIG. 11B, diagrams of graphical analysis methods 1100a-b according to some embodiments are shown. The graphical analysis methods 1100a-b may, for example, be associated with the system 100 and/or with any of the methods 200, 300, 400, 500, 710, 910 described herein. In some embodiments, the graphical analysis methods 1100a-b may be implemented with respect to the exemplary drawing 600 to produce a three-dimensional sketch. According to some embodiments, the graphical analysis methods 1100a-b may be exemplary implementations of the method 910 described in conjunction with FIG. 9. The graphical analysis methods 1100a-b may, for example, be associated with filtering paired polygon segments at 914-1c and/or grouping polygon segments at 914-1d.

In FIG. 11A, for example, the first graphical analysis method 1100a may be performed to filter first and second polygons 1108a-b and/or polygon line segments thereof. According to some embodiments, overlapping polygon segment pairs may be compared to determine if one of the overlapping pairs should be removed. The first polygon 1108a may, for example, comprise paired polygon line segments "A" and "B", while the second polygon 1108b may comprise paired polygon line segments "C" and "D". In some embodiments, the polygon line segments ("A", "B", "C", "D") may have been paired at 914-1b and/or utilizing the graphical analysis method 1000 described herein. According to some embodiments, the paired polygon line segments may otherwise be defined, created, and/or identified.

In some embodiments, in the case that the first and second polygons 1108a-b include overlapping paired polygon line segments (e.g., "A-B" and "C-D"), the paired polygon line segment that is closer together may be chosen to remain. In other words, in the case that first and second polygons 1108a-b have overlapping paired polygon line segments, the paired polygon line segment with the smallest distance between polygon line segments may be chosen. In some embodiments, the other paired polygon line segment may be removed. The paired polygon line segment in FIG. 11A with the smallest separation distance may be polygon line segment "A-B", for example, and the first polygon 1108a and/or the respective paired polygon line segment "A-B" may be kept, while the second polygon 1108b and/or the respective paired polygon line segment "C-D" may be removed. According to some embodiments, adjacent paired polygon line segments may not be removed in the filtering process. Adjacent paired polygon line segments may, for example, be utilized in other graphical analysis methods.

In FIG. 11B, for example, the second graphical analysis method 1100b may be performed to group third and fourth polygons 1108c-d and/or polygon line segments thereof. Adjacent paired polygon line segments not removed by the filtering process (e.g., the first graphical analysis method 1100a) may, for example, be grouped to form longer polygon sections. The third polygon 1108c may comprise paired polygon line segments "E" and "F", for example, and/or the fourth polygon 1108d may comprise the paired polygon line segments "E" and "G". In some embodiments, the sharing of polygon line segment "E" may define the third and fourth polygons 1108c-d as being adjacent. According to some embodiments, the adjacent polygons 1108c-d may be grouped to form a single combined polygon section 1114. The polygon section 1114 may, as shown in FIG. 11B for example, comprise the shared polygon line segment "E" and the two other polygon line segments "F" and "G". According to some embodiments, a point 810-2fg, as shown in FIG. 11B, may join the polygon line segments "F" and "G". In some embodiments, the point 810-2fg may already be shared by the polygon line segments "F" and "G" and the polygon section 1114 may simply be defined and/or identified to include the point 810-2fg.

Figure 12A:
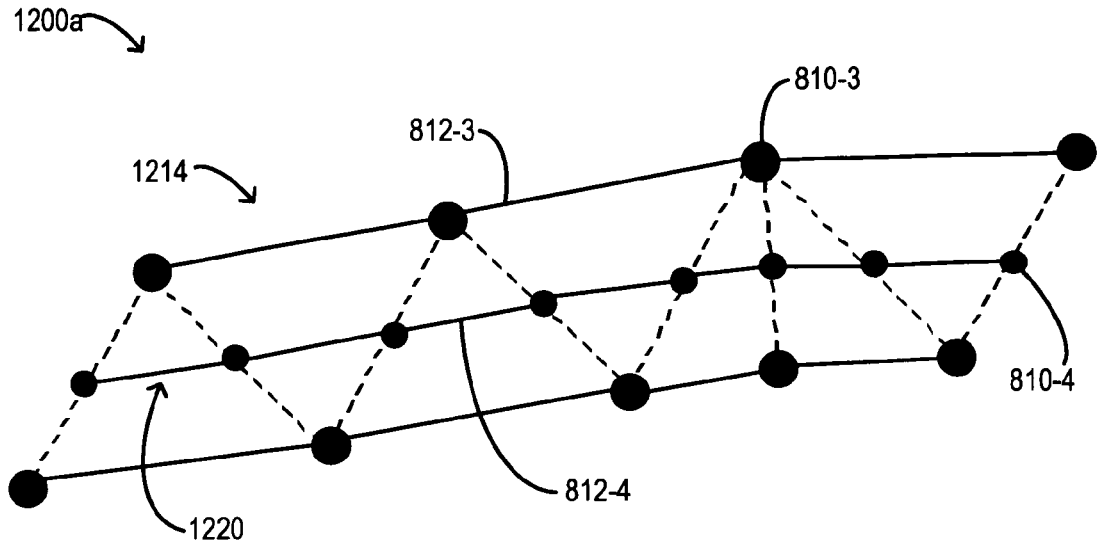
FIGS. 12A & 12B are diagrams of graphical analysis methods according to some embodiments.
Figure 12B:
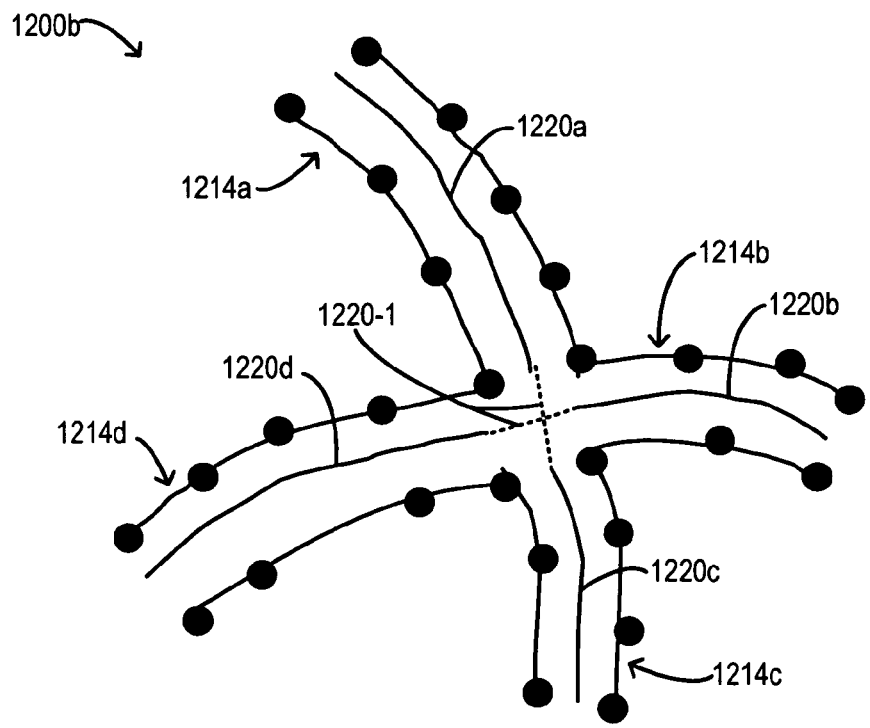

Turning to FIG. 12A and FIG. 12B, diagrams of graphical analysis methods 1200a-b according to some embodiments are shown. The graphical analysis methods 1200a-b may, for example, be associated with the system 100 and/or with any of the methods 200, 300, 400, 500, 710, 910 described herein. In some embodiments, the graphical analysis methods 1200a-b may be implemented with respect to the exemplary drawing 600 to produce a three-dimensional sketch. According to some embodiments, the graphical analysis methods 1200a-b may be exemplary implementations of the method 910 described in conjunction with FIG. 9. The graphical analysis methods 1200a-b may, for example, be associated with converting polygon sections into spine lines at 914-1e and/or merging spine lines at corners and intersections at 914-2.

Polygon sections 1214 may, for example, be analyzed in the first graphical analysis method 1200a to determine the structure of a spine line 1220 that represents the user's original line input data. As shown in FIG. 12A, the polygon section 1214 may comprise a number of polygon section points 810-3 with each set of polygon section points 810-3 being connected by a polygon section segment 812-3. In some embodiments, polygon section points 810-3 on opposing sides of the polygon section 1214 may be paired by a technique such as "zipping". Paired polygon section points 810-3 may, for example, be connected with rung lines (e.g., the dotted lines shown in FIG. 12A) that cross from one side of the polygon section 1214 to the other. The midpoints of each of these rung lines may, according to some embodiments, define a spine line point 810-4. In some embodiments, the resulting spine line points 810-4 may be connected with spine line segments 812-4 to form the spine line 1220.

In some embodiments, such as in the case that various polygon sections 1214a-d meet at an intersection or a corner, the resulting spine lines 1220a-d may not meet (e.g., as shown in FIG. 12B). According to some embodiments, any corners and/or intersections may be identified and/or analyzed by the second graphical analysis method 1200b to close any such gaps. The three-dimensional sketching tool may, for example, analyze the intersections and/or corners to determine if and/or how the various spine lines 1220a-d should be extended and/or connected. In some embodiments, one or more spine line extensions 1220-1 may be added to join the spine lines 1220a-d to bridge the gaps at corners and/or intersections.

Figure 13:
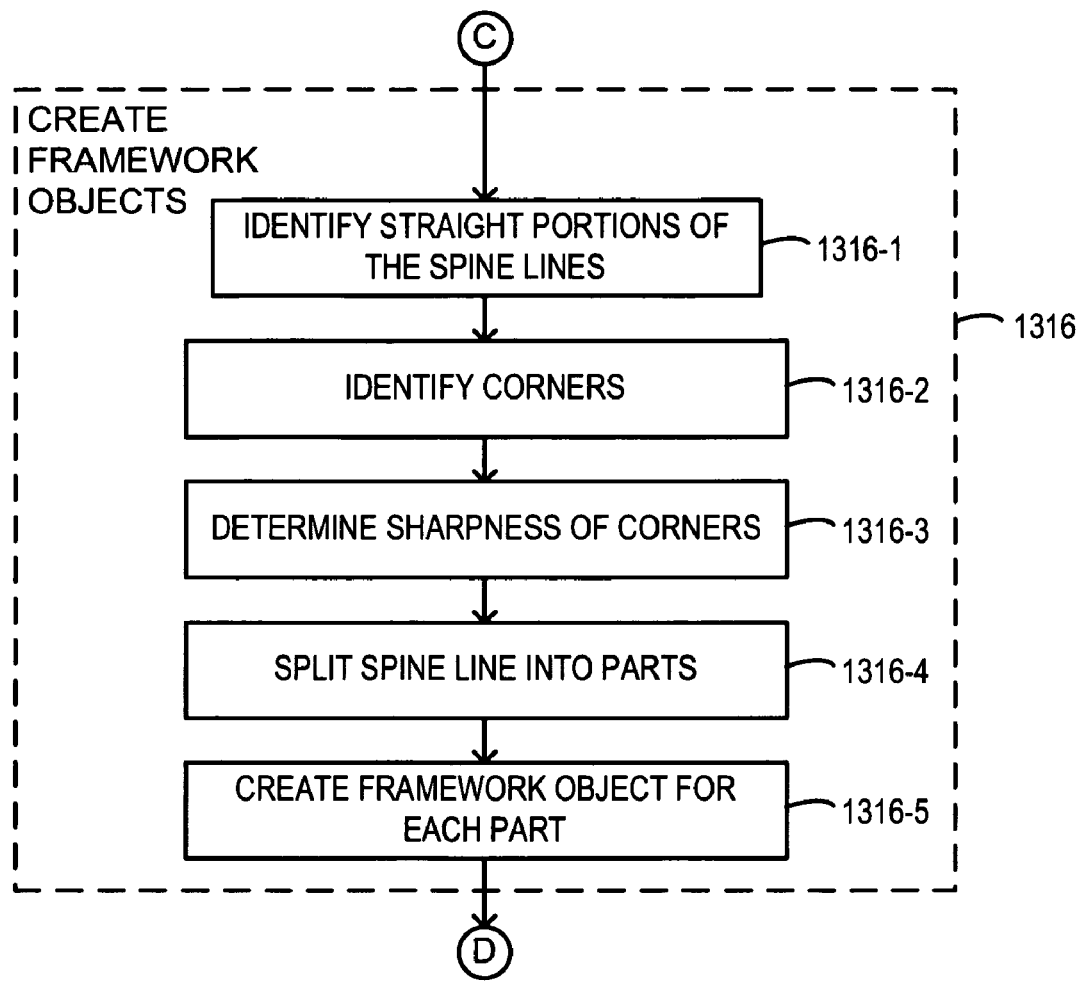
FIG. 13 is a flowchart of a method according to some embodiments.

Referring now to FIG. 13, a flowchart of a method 1310 according to some embodiments is shown. The method 1310 may, in some embodiments, be associated with the system 100 and/or any components thereof and/or may also or alternatively be associated with the methods 200, 300, 400, 500, 710, 910 described herein. The method 1310 may, for example, be a portion and/or continuation of the method 400 described in conjunction with FIG. 4. The method 1310 may, for example, be associated with the creation of the framework at 410. In some embodiments, the method 1310 may also or alternatively be a continuation of the method 910. The method 1310 may, for example, begin at C, where the method 910 left off. In some embodiments, the method 1310 may also or alternatively be associated with the exemplary drawing 600 described in conjunction with FIG. 6A and FIG. 6B herein.

In some embodiments, the method 1310 may continue from C to create framework objects at 1316. Framework objects may, according to some embodiments, be or include simplified graphical representations of a user's input line data and/or of other data associated with converting the user's input line data into a three-dimensional sketch. In some embodiments, the framework may comprise objects of a graphical language used to represent graphical data. Characteristics of some framework embodiments are described in more detail elsewhere herein and may otherwise become apparent upon further reading.

The method 1310 may, according to some embodiments, begin creating framework objects 1316 to identify straight portions of the spine lines, at 1316-1. A least squares and/or other mathematical and/or computational method may be utilized, for example, to determine portions of the spine lines that are substantially straight (and/or appear substantially straight). The creation of framework objects 1316 may continue, according to some embodiments, to identify corners at 1316-2. In some embodiments, various characteristics of the corners may be determined. At 1316-3, for example, the creation of the framework objects 1316 may continue to determine a sharpness of any identified corners.

In some embodiments, the sharpness analysis may utilize a concentric circle test to examine the sharpness characteristic of the corners. For example, the point of the corner may be determined and the maximum straight extents of each spine line proceeding away from the corner may be determined. In some embodiments, a circle may be created that is tangent to the identified maximum straight extents. A second and concentric circle may then, for example, be positioned to pass through the corner point. According to some embodiments, the distance between the two concentric circles (and/or the difference in radius of the two circles) may be utilized to determine the sharpness of the corner. According to some embodiments, other techniques and/or procedures may also or alternatively be utilized to determine and/or derive the sharpness of corners.

In some embodiments, the creation of the framework objects 1316 may continue at 1316-4 to split the spine lines into parts. The spine lines may be analyzed to determine various parts that comply with certain characteristics, for example. According to some embodiments, the spine lines may be split into various straight parts, curved parts, and/or point parts, as desired. The three-dimensional sketching tool may, for example, utilize various pre-determined rules to identify spine line parts and/or split the spine lines. According to some embodiments, the creation of the framework objects 1316 may conclude at 1316-5 to create framework objects for each of the spine line parts. Straight parts may be identified by a straight line part object, curved parts may be represented by a curve part object, and/or various types of points may be represented by different types of point objects. In some embodiments, the method 1310 may continue and/or end at D.

Figure 14:
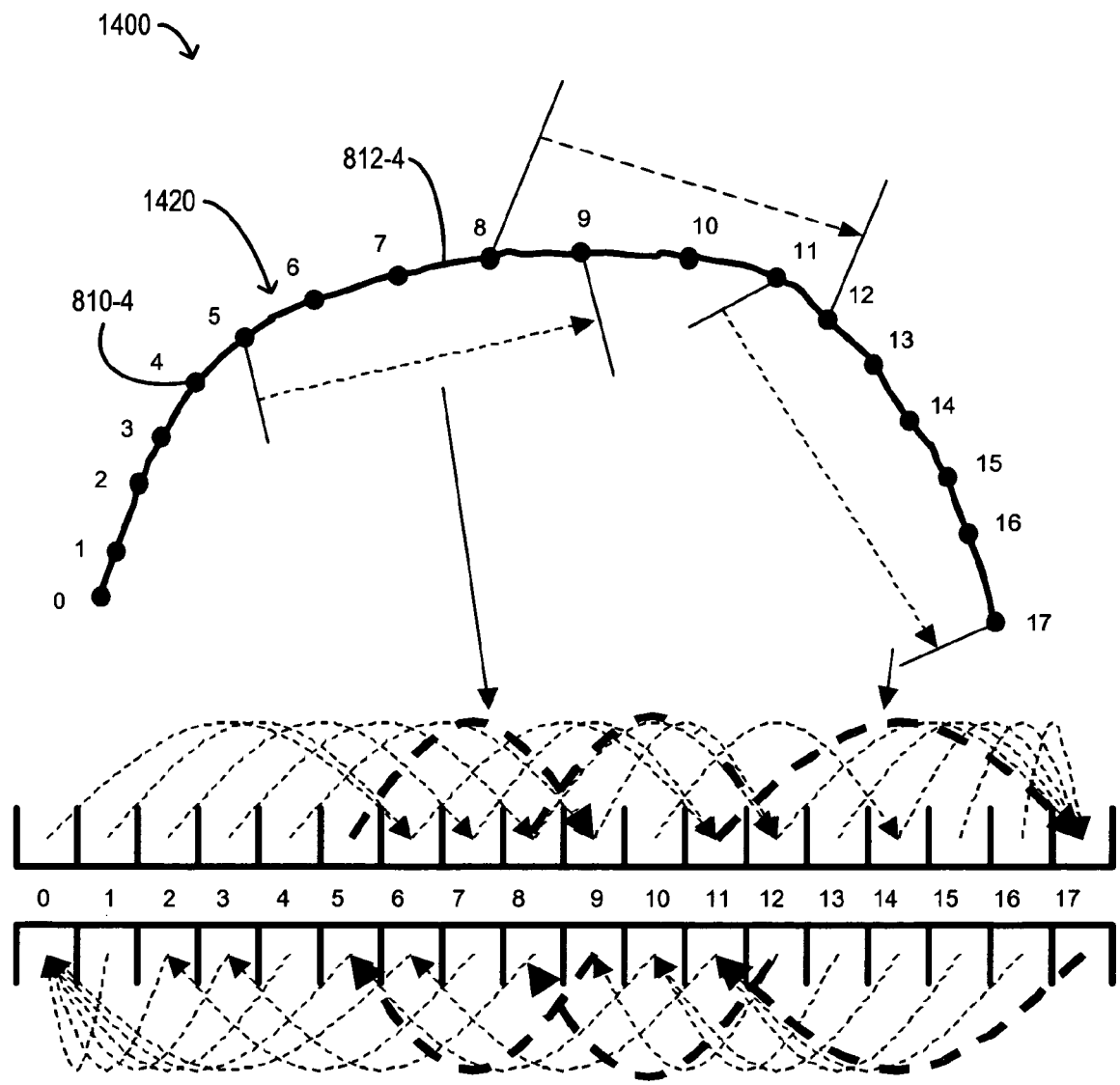
FIG. 14 is a diagram of a graphical analysis method according to some embodiments.

Turning to FIG. 14, a diagram of graphical analysis method 1400 according to some embodiments is shown. The graphical analysis method 1400 may, for example, be associated with the system 100 and/or with any of the methods 200, 300, 400, 500, 710, 910, 1310 described herein. In some embodiments, the graphical analysis method 1400 may be implemented with respect to the exemplary drawing 600 to produce a three-dimensional sketch. According to some embodiments, the graphical analysis method 1400 may be an exemplary implementation of the method 1310 described in conjunction with FIG. 13. The graphical analysis method 1400 may, for example, be associated with identifying straight portions of spine lines at 1316-1.

The graphical analysis method 1400 may, for example, operate upon a spine line 1420 comprised of various spine line points 810-4 connected by spine line segments 812-4. As shown in FIG. 14, the exemplary spine line 1420 may comprise eighteen spine line points 810-4 labeled numerically from zero to seventeen. In some embodiments, straight spans of the spine line 1420 may be identified by utilizing a least squares methodology. Each point may be compared, for example, with the following points along the spine line 1420 until the least squares (and/or other criterion) is no longer met. The test may, according to some embodiments, be performed in both directions along the spine line 1420. In the example of FIG. 14, straight spans of the spine line 1420 may be identified between points five and nine, between points eight and twelve, between points eleven and seventeen, and/or between other points (not shown). In some embodiments, any identified straight spans may also or alternatively be analyzed to determine which spans are likely to be straight portions of the spine line 1420. Straight spans may be compared, for example, to determine spans that overlap with adjacent spans. According to some embodiments, only straight spans that do not overlap with adjacent straight spans may be considered actual straight portions of the spine line 1420. All other spans may be considered curved portions. In FIG. 14, for example, each of the straight spans overlap with adjacent spans, so no straight portions of the spine line 1420 may be identified (which makes sense since the spine line 1420 represents an arch shape).

Figure 15:
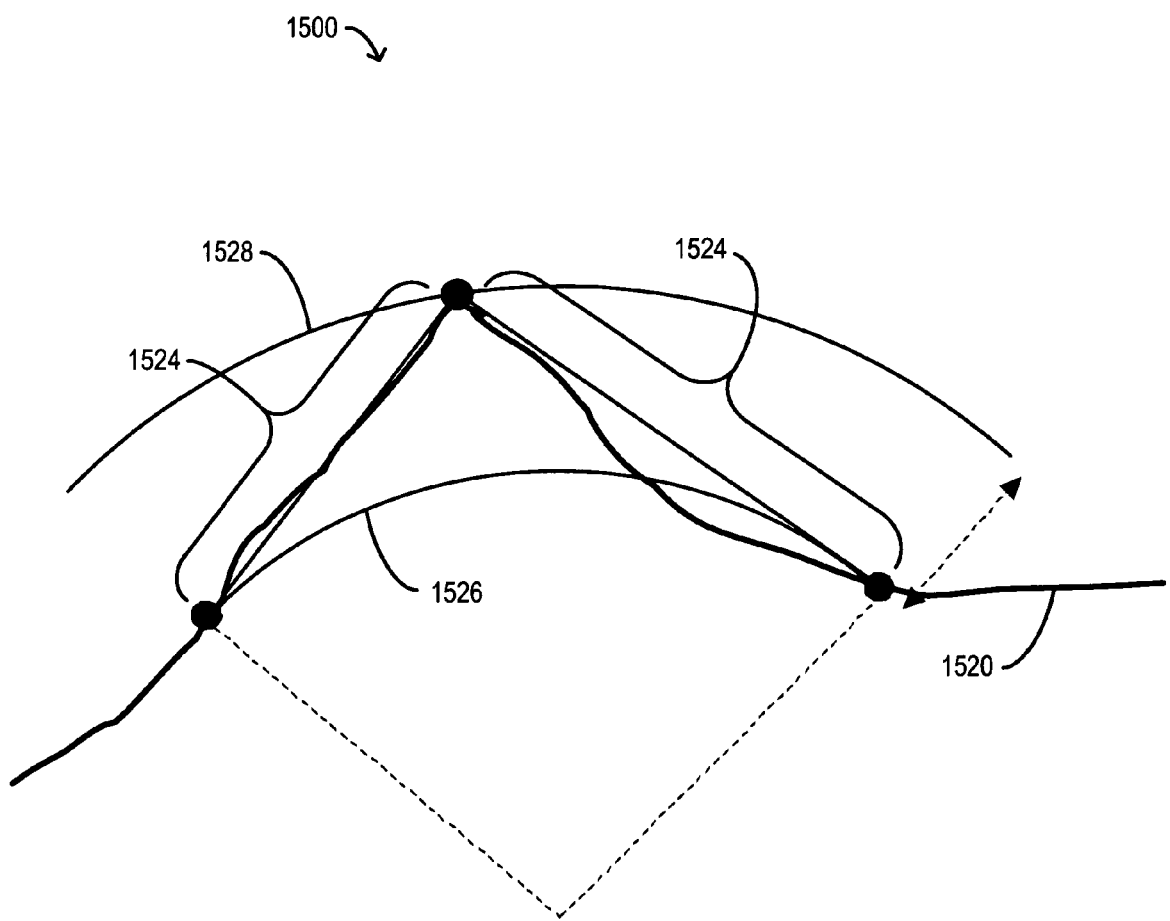
FIG. 15 is a diagram of a graphical analysis method according to some embodiments.

Referring now to FIG. 15, a diagram of graphical analysis method 1500 according to some embodiments is shown. The graphical analysis method 1500 may, for example, be associated with the system 100 and/or with any of the methods 200, 300, 400, 500, 710, 910, 1310 described herein. In some embodiments, the graphical analysis method 1500 may be implemented with respect to the exemplary drawing 600 to produce a three-dimensional sketch. According to some embodiments, the graphical analysis method 1500 may be an exemplary implementation of the method 1310 described in conjunction with FIG. 13. The graphical analysis method 1500 may, for example, be associated with identifying corners at 1316-2 and/or with determining the sharpness of corners at 1316-3.

For example, every point along a spine line (e.g., spine line 1520) may be analyzed to determine if the point is a corner. In some embodiments, the testing may comprise determining how straight the spine line 1520 is on each side of the point. The straight parts of the spine line 1520 emanating from the point may, for example, be the maximum straight extents 1524 of the spine line 1520 surrounding the point. In some embodiments, the end points of the maximum straight extents 1524 and the point may form a triangle. According to some embodiments, the triangle may be inscribed into a pair of concentric circles 1526, 1528. The radius of the inner concentric circle 1526 may, for example, be set to a value that causes the maximum straight extents 1524 (e.g., two legs of the triangle) to be tangent to the inner concentric circle 1526. In some embodiments, the radius of the outer concentric circle 1528 may be set to a value that causes the outer concentric circle 1528 to pass through the point.

According to some embodiments, the difference between the values of the radii of the concentric circles 1526, 1528 may define a "gap" (e.g., as indicated by the double-arrowed line in FIG. 15). In some embodiments, a threshold and/or pre-defined value associated with the gap may be determined. If the size of the gap is larger than the threshold value, for example, then the point may be considered "sharp". In some embodiments, different ranges of the gap value may be associated with different descriptions and/or classifications of the sharpness of the point. In some embodiments, points determined to be "sharp" may be considered corners, while other points may be considered to be smooth and/or not to be corners.

Referring to FIG. 16A, FIG. 16B, FIG. 16C, and FIG. 16D, diagrams of a graphical analysis method 1600 according to some embodiments are shown. The graphical analysis method 1600 may, for example, be associated with the system 100 and/or with any of the methods 200, 300, 400, 500, 710, 910, 1310 described herein. In some embodiments, the graphical analysis method 1600 may be implemented with respect to the exemplary drawing 600 to produce a three-dimensional sketch. According to some embodiments, the graphical analysis method 1600 may be an exemplary implementation of the method 1310 described in conjunction with FIG. 13. The graphical analysis method 1600 may, for example, be associated with splitting the spine lines into parts at 1316-4 and/or with creating framework objects for each of the parts at 1316-5.

Figure 16A:
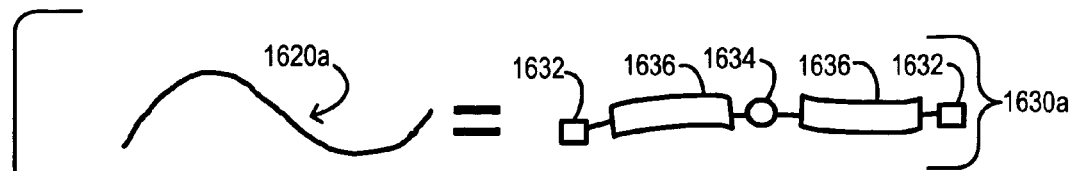
FIGS. 16A, 16B, 16C, & 16D are diagrams of a graphical analysis method according to some embodiments.

In FIG. 16A, for example, a first spine line 1620a may be split into various parts represented by a first framework 1630a. The open curve of the first spine line 1620a may, for example, be split at the point where it changes direction. According to some embodiments, the first spine line 1620a may accordingly be split into two endpoint parts, two curved portion parts, and a midpoint part. The parts of the first spine line 1620a may, in some embodiments, be represented by an endpoint object 1632 for each endpoint, a midpoint object 1634 to represent the point of direction change, and/or curve part objects 1636 for each curved part. The first framework 1630a may, for example, comprise a shorthand, simplified, and/or object-oriented representation of the various parts of the first spine line 1620a.

Figure 16B:
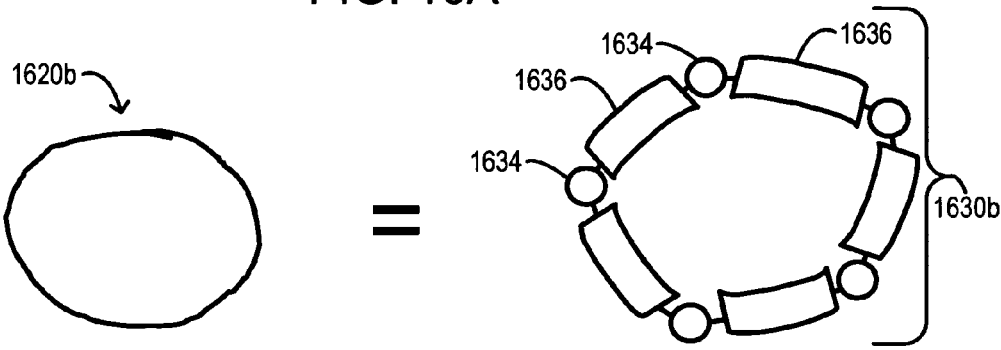

In some embodiments, such as shown in FIG. 16B, the second spine line 1620b may define a circular shape that may be represented by the second framework 1630b. The closed-curve of the second spine line 1620b may, according to some embodiments, be split into several curve parts that turn less than ninety degrees. In some embodiments, other rules and/or benchmarks may be utilized to determine how to split the closed-curve of the second spine line 1620b. According to some embodiments, the second spine line 1620b may be split into five curve parts connected by "midpoints". The "midpoints" may, for example, not necessarily represent true geometric midpoints, but may represent any non-endpoint associated with the second spine line 1620b (such as points where curves change direction). In some embodiments, the parts of the second spine line 1620b may be represented in the second framework 1630b by several midpoint objects 1634 connecting the various curve part objects 1636.

Figure 16C:
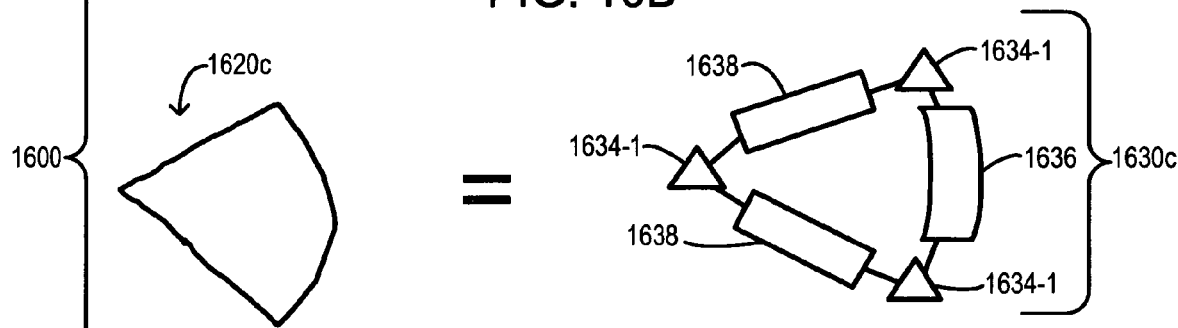

In FIG. 16C, the third spine line 1620c may, according to some embodiments, define a wedge-type shape represented by the third framework 1630c. The closed-curve of the third spine line 1620c may, for example, be split into parts that meet at sharp corners. As shown in FIG. 16C, for example, the third spine line 1620c may be split into two straight parts and one curve part, all connected by sharp corners. The parts of the third spine line 1620c may, according to some embodiments, be represented in the third framework 1630c by three sharp midpoint objects 1634-1, one curve part object 1636, and/or two straight part objects 1638.

Figure 16D:
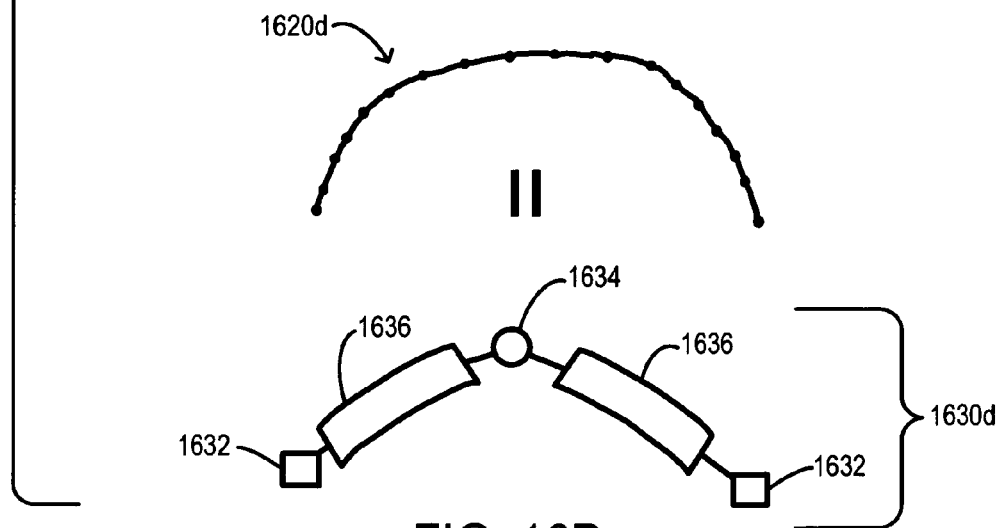

According to some embodiments, various strategies, methods, and/or rules may be applied in splitting the spine lines 1620a-d into parts. In FIG. 16D, an example of how the spine line 1620d representing the exemplary input line data of the user may be split is shown. The exemplary spine line 1620d, may be tested to determine straight parts and curve parts. These parts may, for example, be split from one another and/or separated by midpoints. In some embodiments, parts may be split that meet at sharp corners and/or that meet at a point where direction changes. As described in conjunction with FIG. 16B, curve parts that turn more than ninety degrees may, in some embodiments, be split into separate parts. The split parts of the exemplary spine line 1620d may, for example, be represented by the exemplary fourth framework 1630d. The exemplary fourth framework 1630d may, according to some embodiments, comprise an endpoint object 1632 to represent each end of the exemplary spine line 1620d, and/or a smooth midpoint object 1634 to represent where the two curve part objects 1636 meet.

Figure 17:
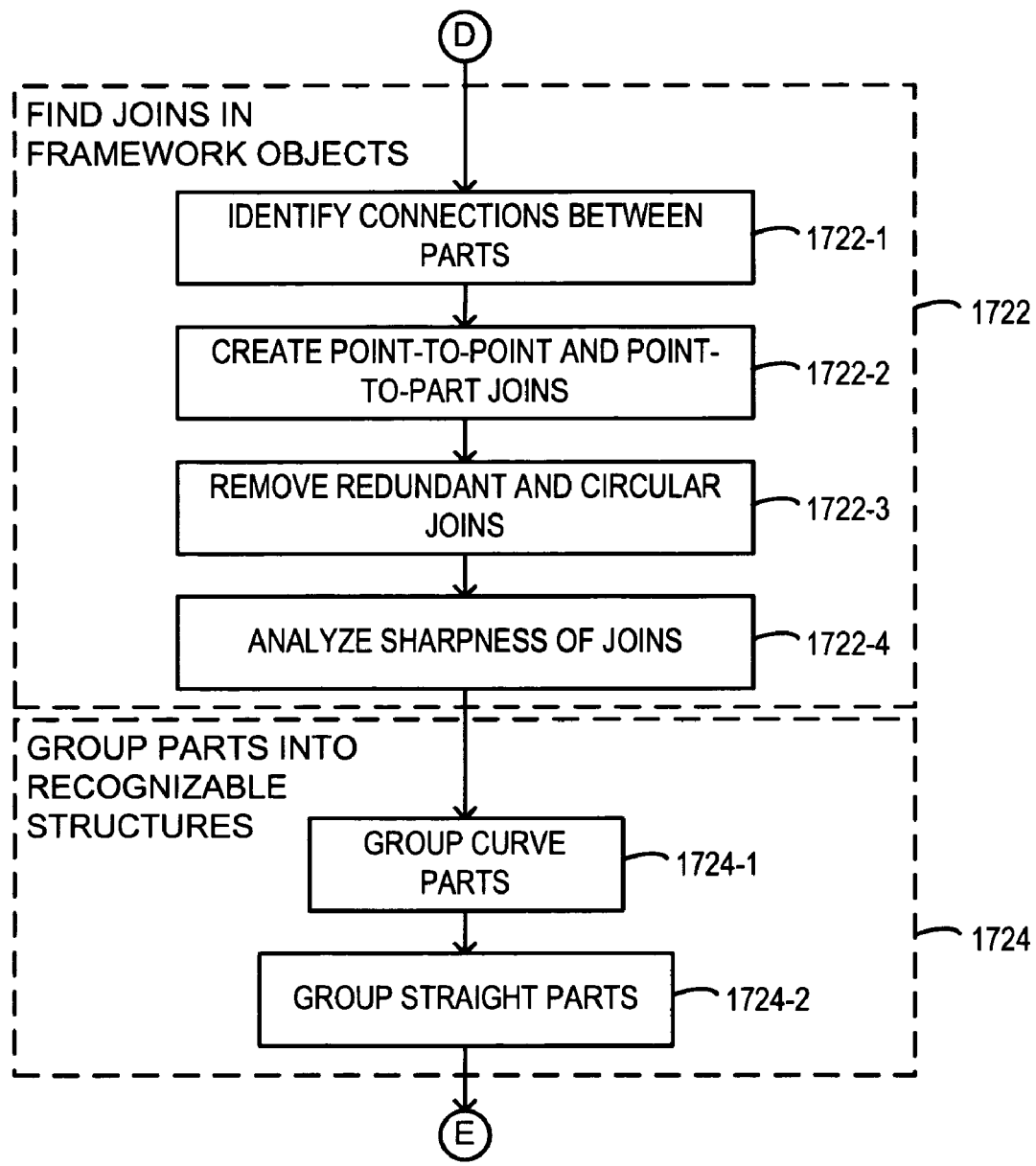
FIG. 17 is a flowchart of a method according to some embodiments.

Referring now to FIG. 17, a flowchart of a method 1720 according to some embodiments is shown. The method 1720 may, in some embodiments, be associated with the system 100 and/or any components thereof and/or may also or alternatively be associated with the methods 200, 300, 400, 500, 710, 910, 1310 described herein. The method 1720 may, for example, be a portion and/or continuation of the method 400 described in conjunction with FIG. 4. The method 1720 may, for example, be associated with the grouping of the structures at 420. In some embodiments, the method 1720 may also or alternatively be a continuation of the method 1310. The method 1720 may, for example, begin at D, where the method 1310 left off. In some embodiments, the method 1720 may also or alternatively be associated with the exemplary drawing 600 described in conjunction with FIG. 6A and FIG. 6B herein.

In some embodiments, the method 1720 may continue from D to find joins in the framework objects at 1722. Finding joins in the framework 1722 may, for example, begin to identify connections between framework objects at 1722-1. In some embodiments, the connections may be categorized. Connections between two or more point objects may be signified with point-to-point joins, for example, while connections between point objects and other objects may be signified by point-to-part joins. The finding of the joins in the framework 1722 may continue, for example, to create point-to-point and point-to-part joins at 1722-2.

According to some embodiments, the joins may then be filtered. The finding of the joins between framework objects 1722 may continue, for example, to remove redundant and circular joins at 1722-3. In some embodiments, the finding of the joins between framework objects 1722 may also or alternatively continue at 1722-4 to analyze the sharpness of joins. Any point-to-point and/or point-to-part joins created at 1722-2, for example, may be analyzed for sharpness. In some embodiments, the sharpness analysis may be conducted in a manner similar to the concentric circle test described in relation to determining the sharpness of corners at 1316-3 and/or as described in conjunction with the graphical analysis method 1500 herein.

According to some embodiments, the method 1720 may continue to group parts into recognizable structures, at 1724. Any number of various recognizable structures and/or shapes, for example, may be compared to parts of the spine lines to determine any resemblance and/or relationship. The grouping 1724 may, for example, group curve parts at 1724-1. Any adjacent and/or otherwise attached curve parts may, for example, be grouped into one or more recognizable curve structures. Similarly, the grouping 1724 may also or alternatively group straight parts at 1724-2. In some embodiments, the method 1720 may then continue and/or end at E. According to some embodiments, the grouping 1724 may also or alternatively involve various sub-procedures.

Figure 18:
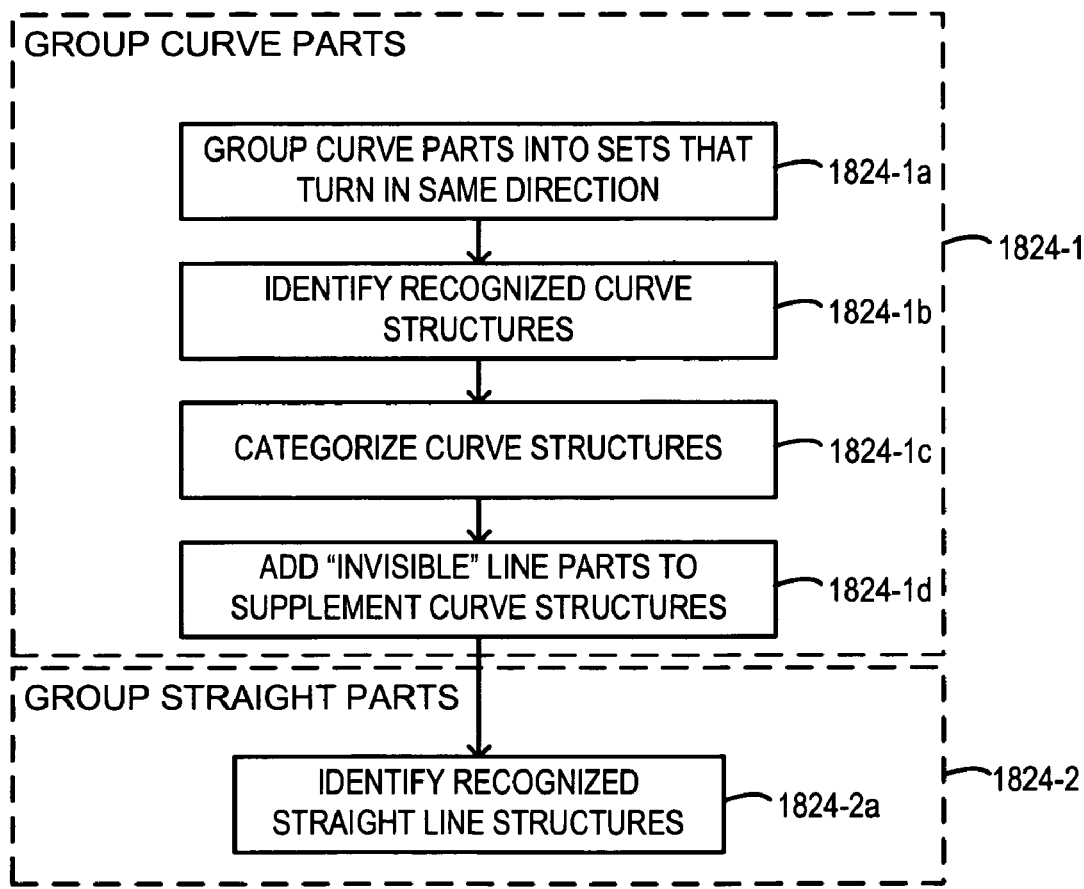
FIG. 18 is a flowchart of a method according to some embodiments.

Referring to FIG. 18, for example, a flowchart of a method 1824 according to some embodiments is shown. In some embodiments, the method 1824 may be associated with the method 1724 described in conjunction with FIG. 17. The method 1824 may, for example, comprise various sub-procedures to group curve parts 1824-1 and/or to group straight parts 1824-2. In some embodiments, the method 1824 may begin to group curve parts at 1824-1. The grouping of the curve parts 1824-1 may, for example, initiate to group curve parts into sets that turn in the same direction, at 1824-1*a*. Curve parts that turn in the same direction may, according to some embodiments, be likely to comprise a recognizable curve structure such as an oval, bend, and/or arch.

In some embodiments, the curve parts may be further analyzed to identify recognized curve structures at 1824-1*b*. Any identified curve parts and/or sets of curve parts (e.g., created at 1824-1*a*) may, for example, be compared to a store of recognizable curve structures to determine if any resemblances and/or relationships may exist. According to some embodiments, the grouping 1824-1 may continue to categorize the identified curve structures, at 1824-1*c*. Any number of identified curve structures within the curve parts of a spine line may, for example, be categorized based upon the type and/or configuration of associated curve structure. In some embodiments, the grouping 1824-1 may continue to add group component line parts to supplement the identified curve structures. Based on the category, type, and/or configuration of identified curve structures, for example, one or more "invisible" (e.g., to the user), temporary, supplementary, construction, and/or other lines parts may be added to facilitate the description of the curve structures. In some embodiments, these new group component line parts may be utilized for computational and/or analysis purposes and/or may not be made visible to the user.

According to some embodiments, the method 1824 may continue to group straight parts at 1824-2. In some embodiments, the grouping of the straight parts 1824-2 may simply proceed to identify any recognized straight line structures, at 1824-2*a*. Similar to the grouping of the curve parts at 1824-1, for example, the identified straight line parts of the spine lines may be compared to a list and/or other store of recognizable straight line structures to determine if any resemblances and/or relationships may exist.

Figure 19:
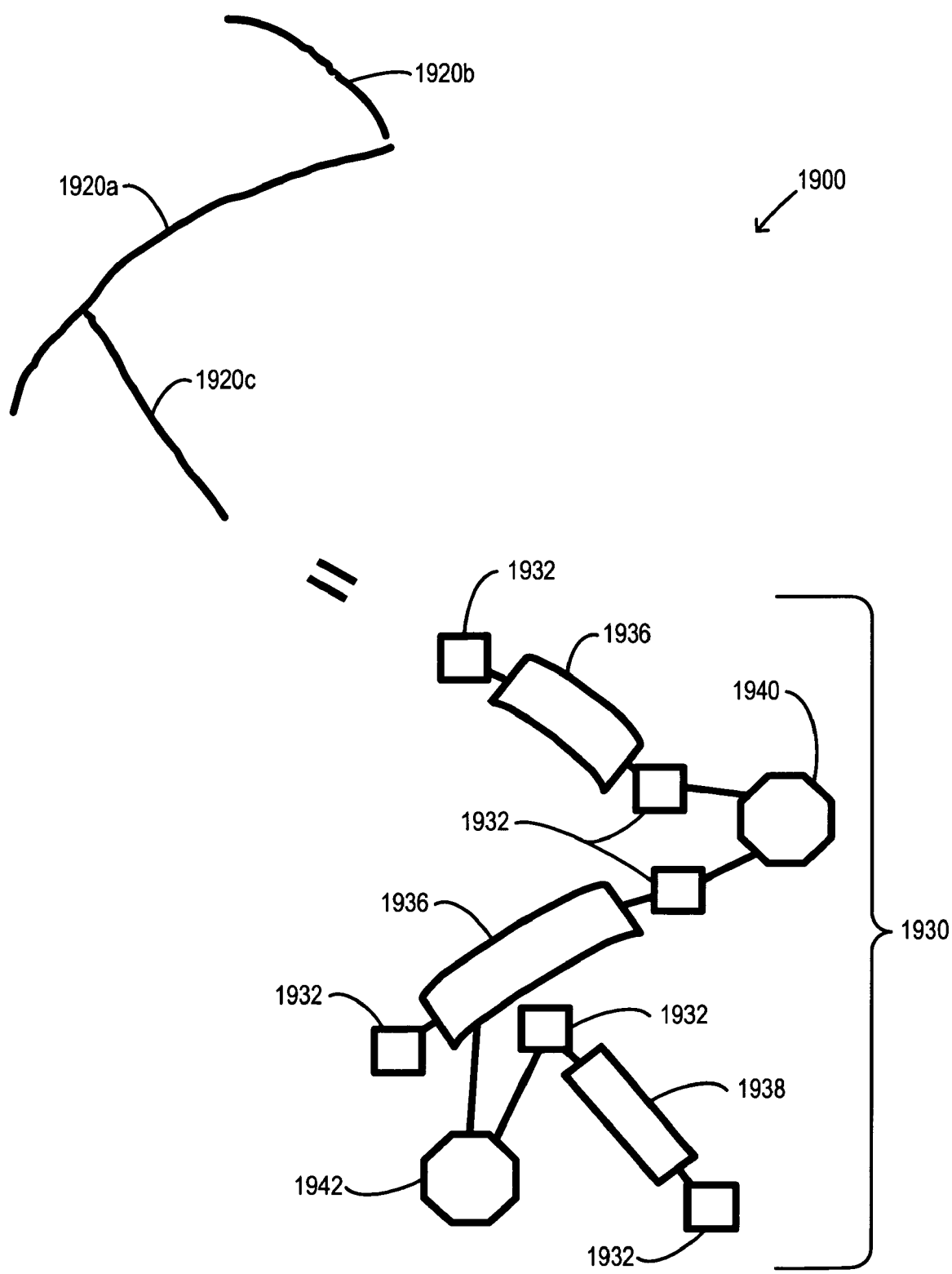
FIG. 19 is a diagram of a graphical analysis method according to some embodiments.

Referring to FIG. 19, for example, a diagram of graphical analysis method 1900 according to some embodiments is shown. The graphical analysis method 1900 may, for example, be associated with the system 100 and/or with any of the methods 200, 300, 400, 500, 710, 910, 1310, 1720, 1824 described herein. In some embodiments, the graphical analysis method 1900 may be implemented with respect to the exemplary drawing 600 to produce a three-dimensional sketch. According to some embodiments, the graphical analysis method 1900 may be an exemplary implementation of the methods 1720, 1824 described in conjunction with any of FIG. 17 and/or FIG. 18. The graphical analysis method 1900 may, for example, be associated with identifying connections between parts at 1722-1 and/or with creating point-to-point and/or point-to-part joins at 1722-2.

The graphical analysis method 1900 may, according to some embodiments, process items associated with a user's hand-drawn input, such as the spine lines 1920*a-c* shown in FIG. 19. The spine lines 1920*a-c* may, for example, be created and/or processed based upon original line input data received from the user. In some embodiments, the spine lines 1920*a-c* may be represented by the framework 1930. The framework 1930 may, for example, be created via various methods 410, 710, 910, 1310 described elsewhere herein. In some embodiments, the framework may comprise one or more endpoint objects 1932, one or more curve part objects 1936, and/or one or more straight line part objects 1938, as shown in FIG. 19, to represent the spine lines 1920*a-c* and/or parts thereof.

According to some embodiments, the framework 1930 may be analyzed to determine if any joins should be added between the various objects 1932, 1936, 1938. Endpoint objects 1932 that are located in proximity to each other may, for example, be determined to be associated with a point-to-point join. In some embodiments, a point-to-point join object 1940 may be added to connect and/or relate the two closely-positioned endpoint objects 1932 of the first and second spine lines 1920*a-b*. According to some embodiments, any endpoint objects 1932 situated closely to any other type of object 1936, 1938 may be determined to be associated with a point-to-part join. A point-to-part join object 1942 may, for example, be added between an endpoint object 1932 of the third spine line 1920*c* and the curve part object 1936 of the first spine line 1920*a*.

In some embodiments, any number of logical and/or other rules or conditions may be utilized to test the spine lines 1920*a-c* and/or the associated framework 1930 to determine if any joins should be added. According to some embodiments, the "closeness" parameter that is used to determine if two objects 1932, 1936, 1938 are "close" for purposes of defining joins may be set to various values as desired. In some embodiments, the parameter (and/or other parameters) may be changed on an ad-hoc and/or real-time basis based at least in part on information associated with the spine lines 1920*a-c* and/or the associated framework 1930. In such a manner, for example, different line input strokes created by the user may be joined and/or related in a manner likely to be similar to the intent of the user.

Figure 20:
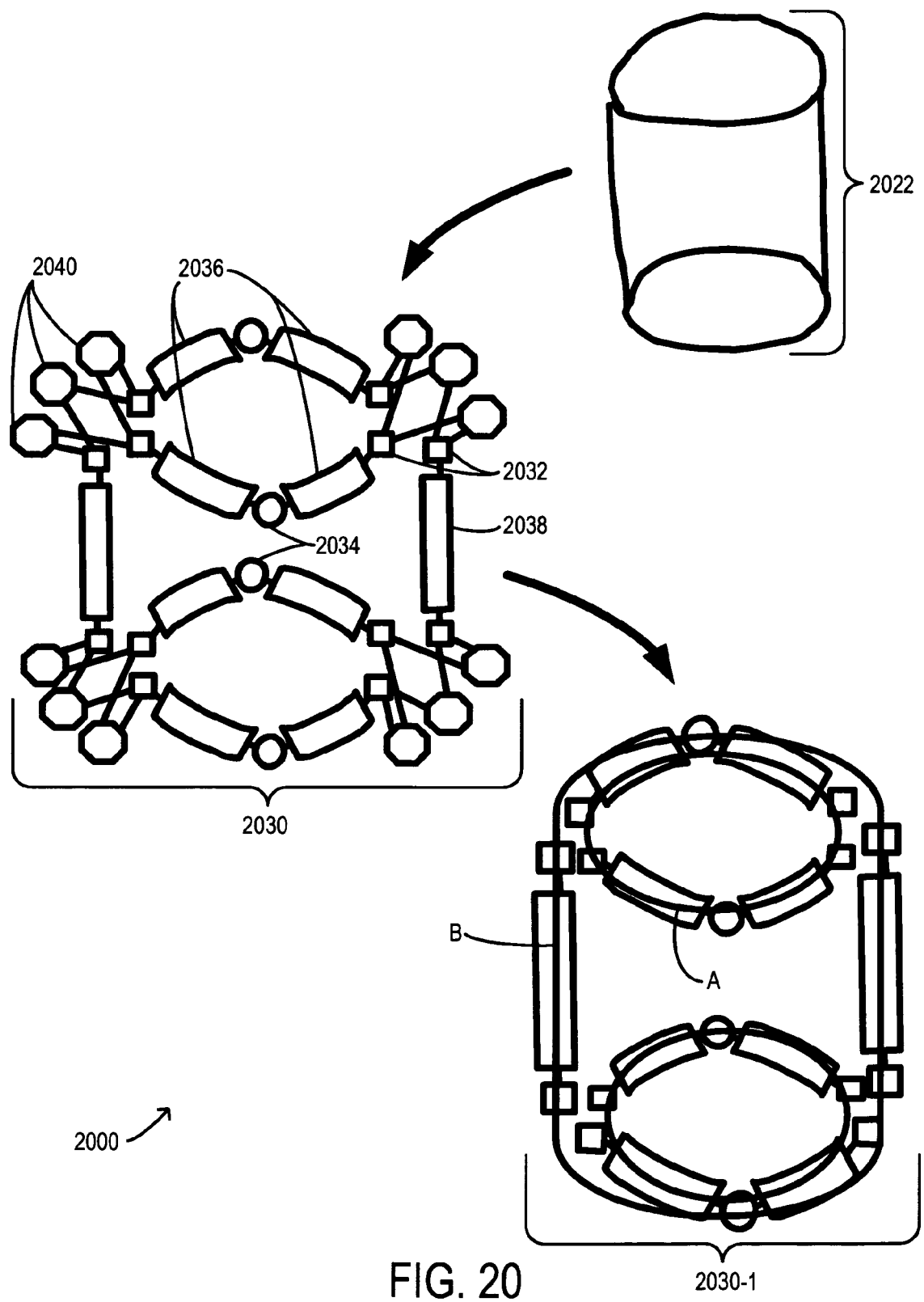
FIG. 20 is a diagram of a graphical analysis method according to some embodiments.

Turning to FIG. 20, a diagram of graphical analysis method 2000 according to some embodiments is shown. The graphical analysis method 2000 may, for example, be associated with the system 100 and/or with any of the methods 200, 300, 400, 500, 710, 910, 1310, 1720, 1824 described herein. In some embodiments, the graphical analysis method 2000 may be implemented with respect to the exemplary drawing 600 to produce a three-dimensional sketch. According to some embodiments, the graphical analysis method 2000 may be an exemplary implementation of the methods 1720, 1824 described in conjunction with any of FIG. 17 and/or FIG. 18. The graphical analysis method 2000 may, for example, be associated with grouping curve parts at 1724-1 and/or 1824-1.

As shown in FIG. 20, for example, a set of spine lines 2022 associated with a user's cylindrical-type drawing object may be represented by the framework 2030. The framework 2030 may comprise, for example, any number of endpoint objects 2032, midpoint objects 2034, part objects 2036, straight line part objects 2038, and/or point-to-point join objects 2040. In some embodiments, the point-to-point join objects 2040 of the framework 2030 may have been added to the framework 2030 in accordance with the graphical analysis method 1900 described in conjunction with FIG. 19. In the case that any curve parts within the set of spine lines 2022 are desired to be grouped, the analysis of the framework 2030 (and/or the set of spine lines 2022) may, according to some embodiments, result in one or more interpretations and/or may provide ambiguous results.

For example, identifying curve part objects 2036 of the framework 2030 that turn in the same direction (e.g., in accordance with one possible method of grouping curve parts into recognizable structures) may result in multiple possible interpretations. As shown in an enhanced framework 2030-1, for example, the upper curve part objects 2036 of the cylindrical shape may be considered parts of the smaller curve group "A" or the larger curve group "B". In some embodiments, predefined rules may be utilized to make logical assumptions and/or otherwise choose between the possible interpretations. According to some embodiments for example, the three-dimensional sketching tool may choose the smaller of the shared curve groups (e.g., the smaller curve group "A") as the correct curve group 2050a-b with which to associate the ambiguously interpreted upper curve part objects 2036.

Figure 21A:
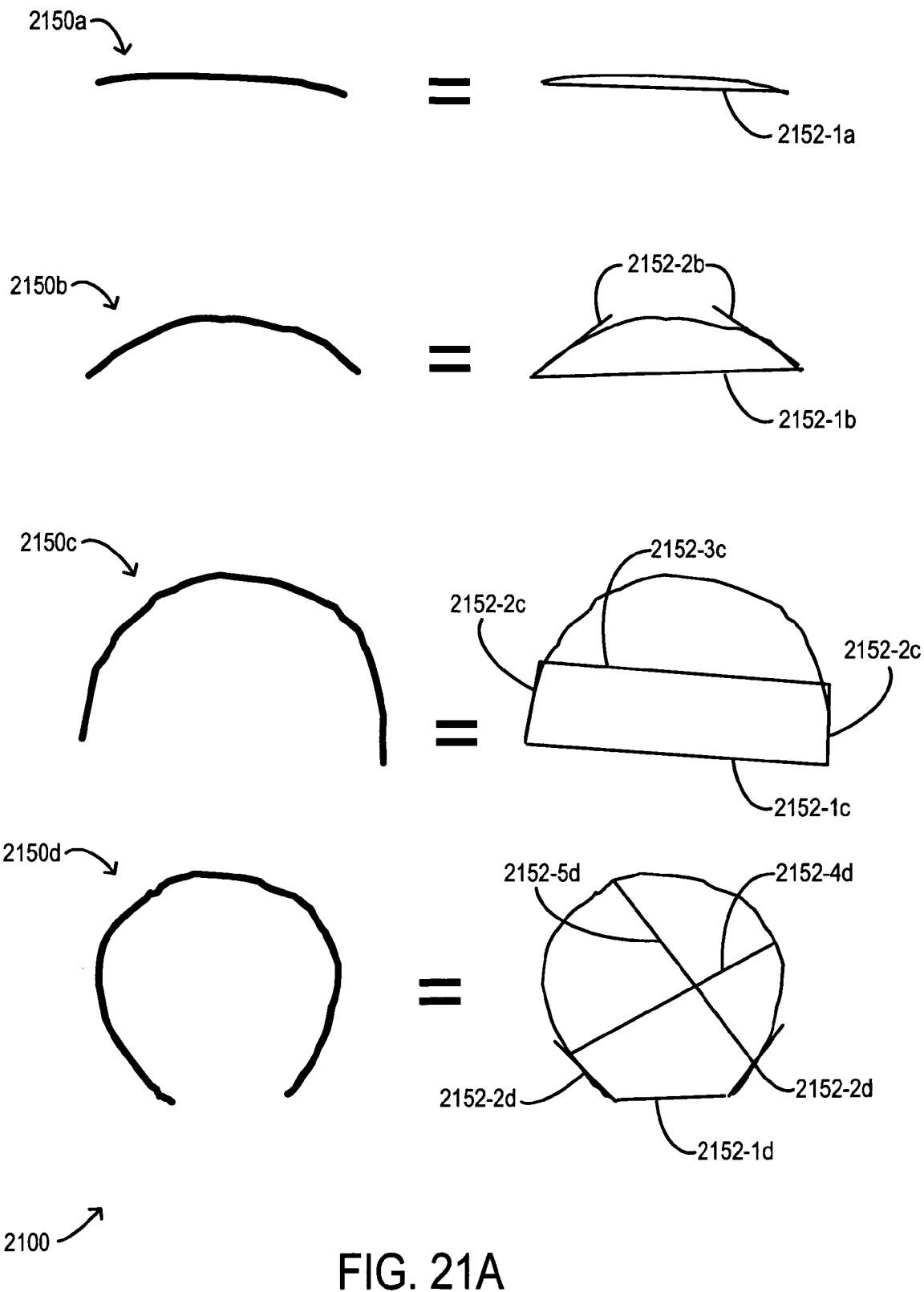
FIGS. 21A, 21B, & 21C are diagrams of a graphical analysis method according to some embodiments.
Figure 21B:
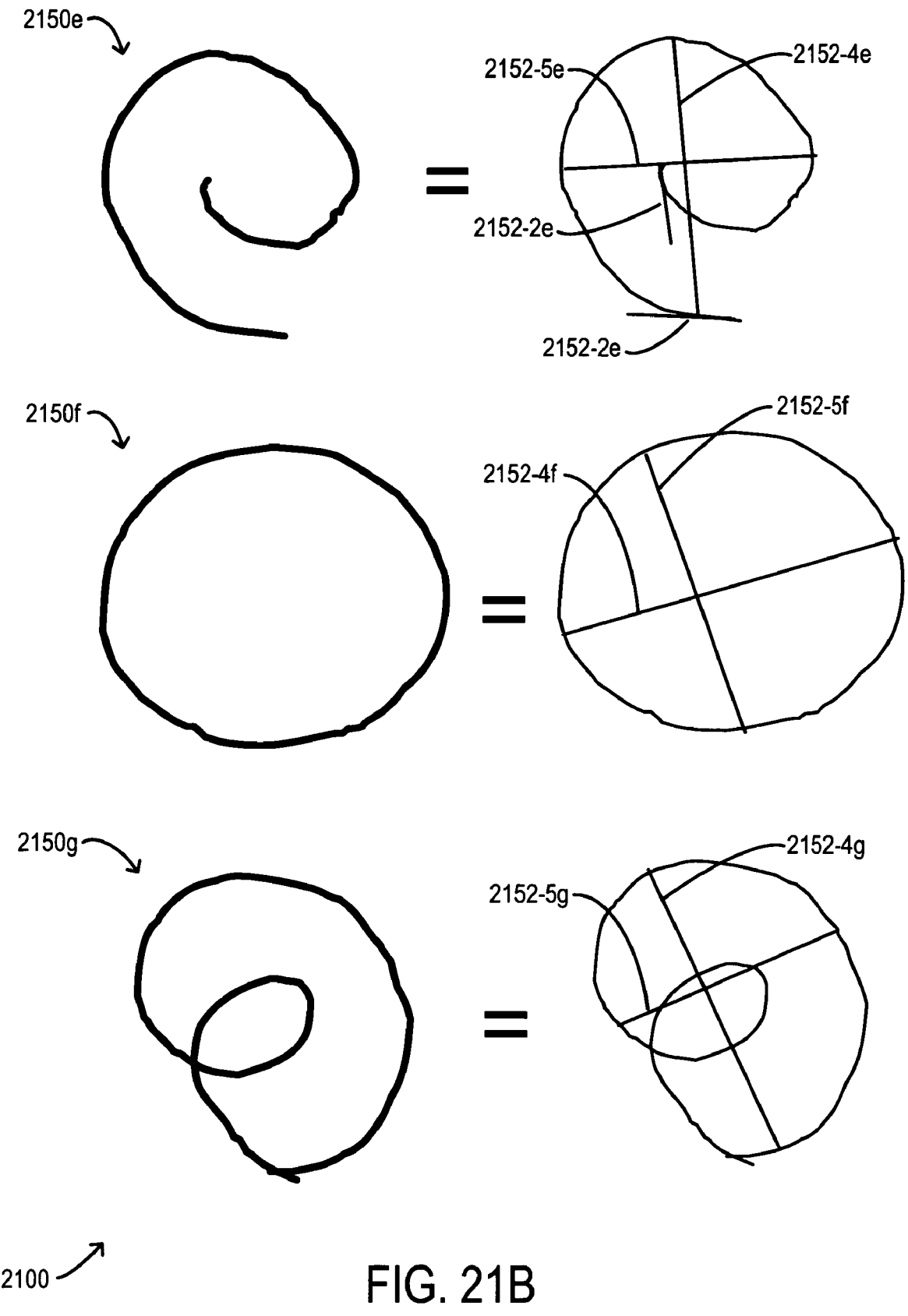
Figure 21C:
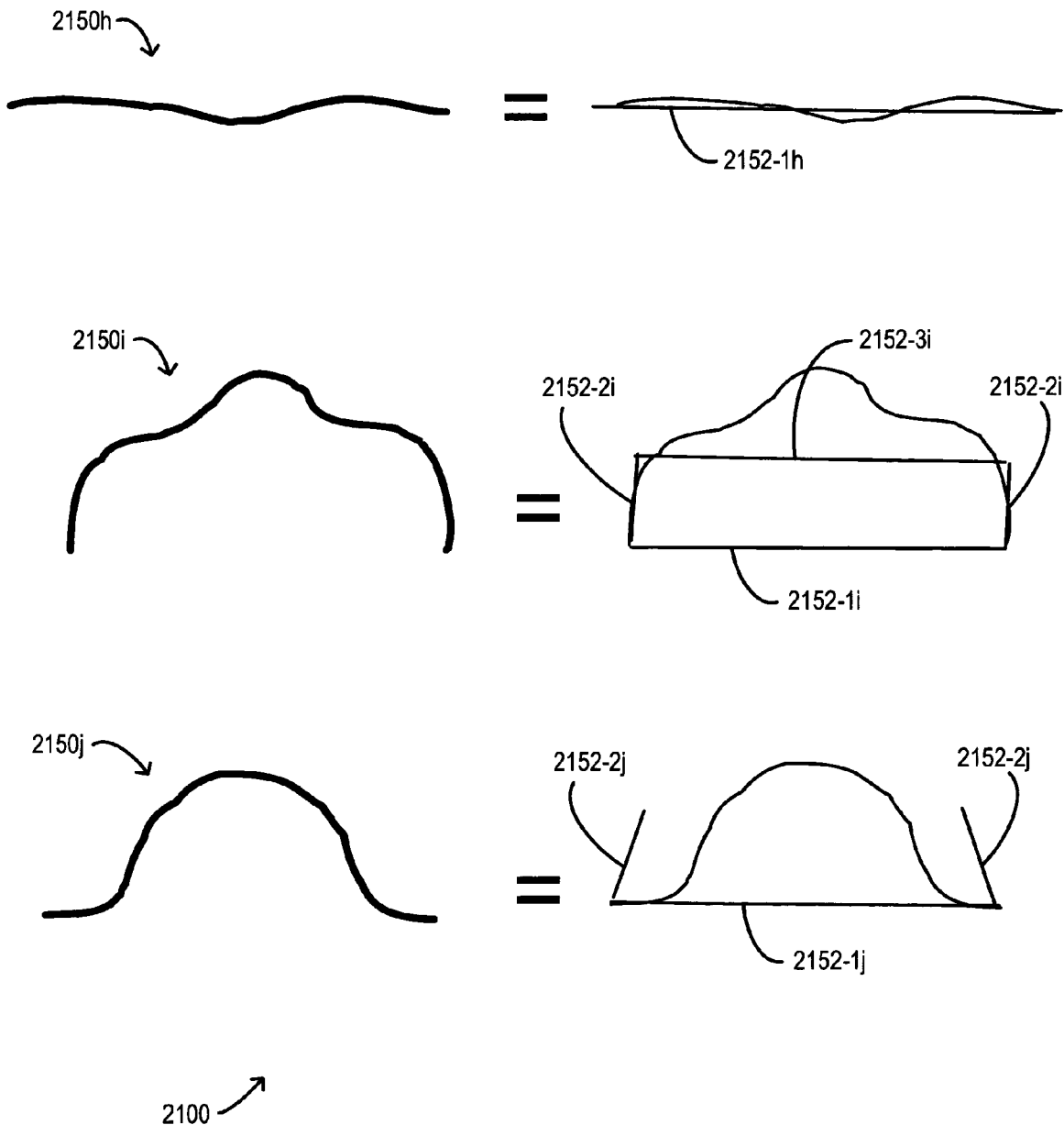

Referring to FIG. 21A, FIG. 21B, and FIG. 21C, diagrams of a graphical analysis method 2100 according to some embodiments are shown. The graphical analysis method 2100 may, for example, be associated with the system 100 and/or with any of the methods 200, 300, 400, 500, 710, 910, 1310, 1720, 1824 described herein. In some embodiments, the graphical analysis method 2100 may be implemented with respect to the exemplary drawing 600 to produce a three-dimensional sketch. According to some embodiments, the graphical analysis method 2100 may be an exemplary implementation of the methods 1720, 1824 described in conjunction with any of FIG. 17 and/or FIG. 18. The graphical analysis method 2100 may, for example, be associated with grouping parts into recognizable structures at 1724 and/or 1824.

In some embodiments, the graphical analysis method 2100 may comprise determining how various spine lines, sets of spine lines, and/or framework objects may be grouped into recognizable structures. The recognizable structures may include, for example, the curve groups 2150a-j shown in FIG. 21A, FIG. 21B, and/or FIG. 21C. In some embodiments, the some or all of the curve groups 2150a-j may be determined from lines that curve in the same direction. Such curve groups 2150a-j may include, for example, a simple straight group 2150a, a bend group 2150b, a simple arch group 2150c, a round group 2150d, a twist group 2150e, an oval group 2150f, and/or a looping group 2150g. According to some embodiments, some or all of the curve groups 2150a-j may also or alternatively be determined from lines that curve in mixed directions. Such curve groups 2150a-j may include, for example, a complex straight group 2150h, a complex arch group 2150i, and/or a big curve group 2150j.

According to some embodiments, the curve groups 2150a-j may comprise one or more components. The curve groups 2150a-j may, for example, be associated with various "invisible" and/or supplemental component lines 2152, as shown in FIG. 21A, FIG. 21B, and FIG. 21C. In some embodiments, the component lines 2152 associated with a curve group 2150a-j may be added to a drawing and/or analysis data in the case that the curve group 2150a-j is recognized within one or more spine lines and/or sets of spine lines. The component lines 2152 may be added, created, identified, defined, and/or determined, for example, at 1824-1d in the method 1824. In some embodiments, the component lines 2152 may facilitate and/or simplify processing of the identified curve groups 2150a-j.

The straight groups 2150a, 2150h may, according to some embodiments, be the considered the same curve group 2150. In some embodiments, the straight groups 2150a, 2150h may alternatively be considered separate types of curve groups 2150 for processing purposes. In either case, the straight groups 2150a, 2150h may, according to some embodiments, comprise base lines 2152-1a, 2152-1h. In some embodiments, the bend group 2150b and/or the big curve group 2150j may comprise base lines 2152-1b, 2152-1j and/or wand lines 2152-2b, 2152-2j. According to some embodiments, the arch groups 2150c, 2150i may be considered to be either the same type of curve group 2150 or different types of curve groups 2150, as desired. In either case, the arch groups 2150c, 2150i the may comprise, according to some embodiments, base lines 2152-1c, 2152-1i, wand lines 2152-2c, 2152-2i, and/or mantel lines 2152-3c, 2152-3i. In some embodiments, the round group 2150d may comprise a base line 2152-1d, wand lines 2152-2d, a diameter line 2152-4d, and/or a width line 2152-5d. The twist group 2150e may, for example, comprise wand lines 2152-2e, a diameter line 2152-4e, and/or a width line 2152-5e. In some embodiments, the oval group 2150f and/or the looping group 2150g may comprise diameter lines 2152-4f, 2152-4g and/or width lines 2152-5f, 2152-5g.

Figure 22:
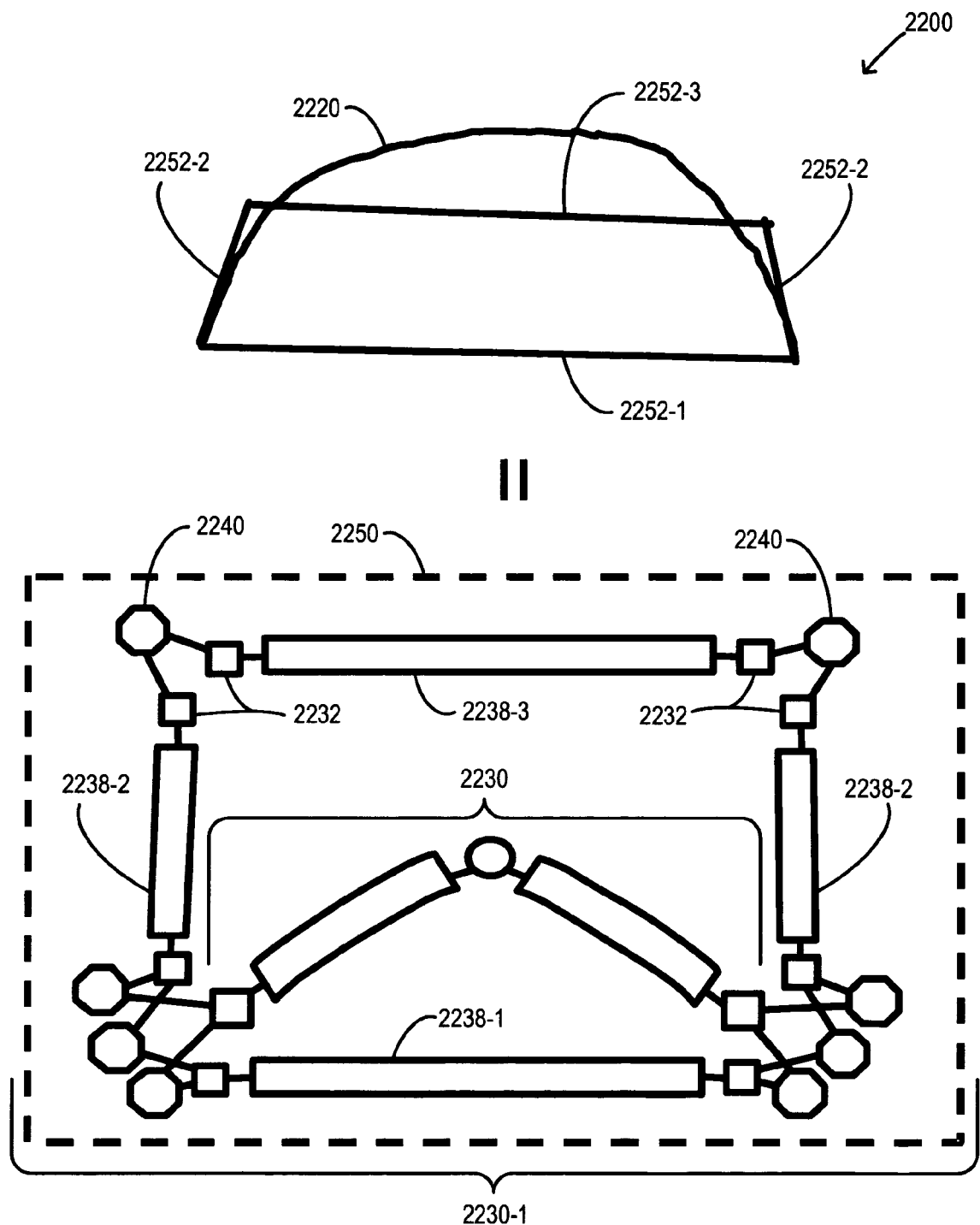
FIG. 22 is a diagram of a graphical analysis method according to some embodiments.

Turning to FIG. 22, a diagram of graphical analysis method 2200 according to some embodiments is shown. The graphical analysis method 2200 may, for example, be associated with the system 100 and/or with any of the methods 200, 300, 400, 500, 710, 910, 1310, 1720, 1824 described herein. In some embodiments, the graphical analysis method 2200 may be implemented with respect to the exemplary drawing 600 to produce a three-dimensional sketch. According to some embodiments, the graphical analysis method 2200 may be an exemplary implementation of the methods 1720, 1824 described in conjunction with any of FIG. 17 and/or FIG. 18. The graphical analysis method 2200 may, for example, be associated with grouping parts into recognizable structures at 1724 and/or 1824.

The exemplary spine line 2220 may, for example, represent the original line input data received from the user in relation to the exemplary drawing 600. The exemplary spine line 2220 may, in other words, have been created based upon the original input lines 602 and/or input line strokes 602a-c received from the user. In some embodiments, the three-dimensional sketching tool may analyze the exemplary spine line 2220 to determine if the exemplary spine line 2220 may be associated with any recognizable structures (such a the curve groups 2150a-j of the graphical analysis method 2100). In some embodiments, the exemplary spine line 2220 may be determined to resemble and/or otherwise be related to a recognizable curve group such as a simple arch (e.g., the simple arch curve group 2150c).

According to some embodiments, the identification of the exemplary spine line 2220 as a simple arch may cause components associated with the simple arch structure (such as group components 2152) to be added to the exemplary spine line 2220. Various "invisible" and/or other non-drawing lines such as a base line 2252-1, wand lines 2252-2, and/or a mantel line 2252-3 may, for example, be added to and/or associated with the exemplary spine line 2220 (e.g., as shown in FIG. 22). In some embodiments, a framework 2230 representing the exemplary spine line 2220 may also or alternatively be augmented and/or converted to an enhanced framework 2230-1.

For example, the original framework 2030 may be assigned to and/or associated with a curve group object 2250 (such as an arch group). The curve group object 2250 may comprise, according to some embodiments, straight line part objects representing the various group components (e.g., the group component lines 2252-1, 2252-2, 2252-3) added to the exemplary spine line 2220. The base line 2252-1 may, for example, be represented by the base line object 2238-1, the wand lines 2252-2 may be represented by the wand line objects 2238-2, and/or the mantel line 2252-3 may be represented by the mantel line object 2238-3. In some embodiments, endpoint objects 2232 may also or alternatively represent the locations where the group component lines 2252-1, 2252-2, 2252-3 terminate. According to some embodiments, the endpoint objects 2232 may be joined, where appropriate, to form point-to-point join objects 2240. In such a manner, for example, the exemplary spine line 2220 may be represented by an enhanced framework 2230-1 representing the basic structure, type, configuration, and/or other characteristics (such as group characteristics) associated with the exemplary spine line 2220.

Figure 23:
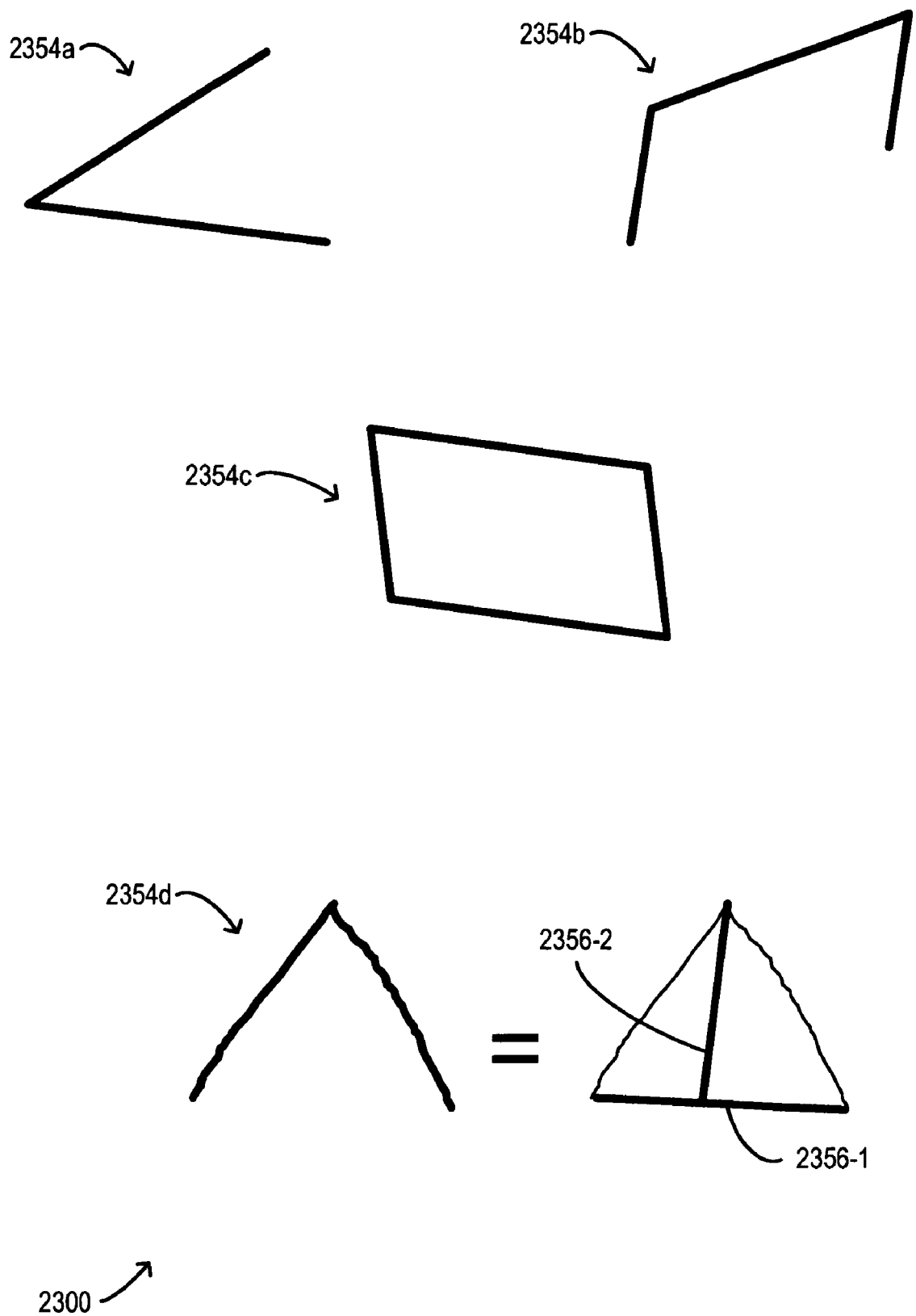
FIG. 23 is a diagram of a graphical analysis method according to some embodiments.

Referring to FIG. 23, a diagram of a graphical analysis method 2300 according to some embodiments is shown. The graphical analysis method 2300 may, for example, be associated with the system 100 and/or with any of the methods 200, 300, 400, 500, 710, 910, 1310, 1720, 1824 described herein. In some embodiments, the graphical analysis method 2300 may be implemented with respect to the exemplary drawing 600 to produce a three-dimensional sketch. According to some embodiments, the graphical analysis method 2300 may be an exemplary implementation of the methods 1720, 1824 described in conjunction with any of FIG. 17 and/or FIG. 18. The graphical analysis method 2300 may, for example, be associated with grouping parts into recognizable structures at 1724 and/or 1824 and/or with grouping straight parts at 1724-2 and/or 1824-2.

In some embodiments, the graphical analysis method 2300 may comprise determining how various spine lines and/or framework objects may be grouped into recognizable structures. The recognizable structures may include, for example, one or more straight line groups 2354*a-d* shown in FIG. 23. According to some embodiments, straight line parts of a spine line may be determined to be associated with and/or resemble various recognizable structures such as the straight line groups 2354*a-d*. Two straight line parts that meet sharply at a point may, for example, be considered to be a corner group 2354*a*. In some embodiments, straight line parts comprising substantially parallel opposing sides may be considered to be an edge group 2354*b* (e.g., if the parts form an open structure) and/or a rectangle group 2354*c* (e.g., if the parts form a closed structure and/or if two or more pairs of substantially parallel opposing sides exist). According to some embodiments, a corner group 2354*a* may, under some circumstances, comprise a triangle group 2354*d*. As with the curve groups described elsewhere herein, the straight line groups 2354 may be associated with various components such as hidden and/or "invisible" lines. The triangle group 2354*d* may, for example, comprise a base line 2356-1 and/or a height line 2356-2. In some embodiments, recognizable structures such as the straight line groups 2354 may overlap and/or share straight line parts.

Figure 24:
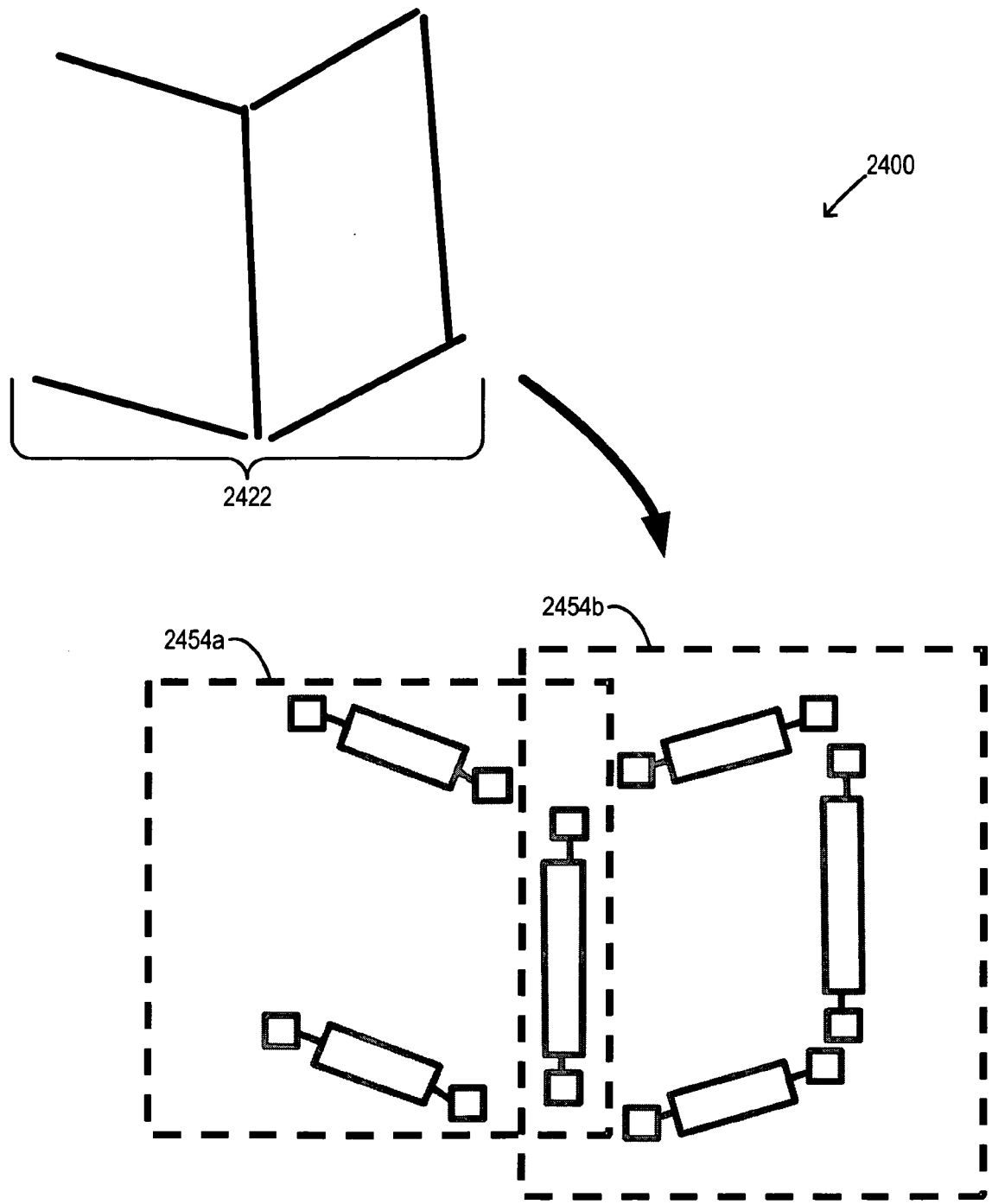
FIG. 24 is a diagram of a graphical analysis method according to some embodiments.

Turning to FIG. 24, for example, a diagram of a graphical analysis method 2400 according to some embodiments is shown. The graphical analysis method 2400 may, for example, be associated with the system 100 and/or with any of the methods 200, 300, 400, 500, 710, 910, 1310, 1720, 1824 described herein. According to some embodiments, the graphical analysis method 2400 may be an exemplary implementation of the methods 1720, 1824 described in conjunction with any of FIG. 17 and/or FIG. 18. The graphical analysis method 2400 may, for example, be associated with grouping parts into recognizable structures at 1724 and/or 1824 and/or with grouping straight parts at 1724-2 and/or 1824-2.

Given the exemplary set of spine lines 2422, for example, any straight line parts of the exemplary set pf spine lines 2422 may be analyzed to determine if they relate to any recognizable straight line structures (such as the straight line structures 2354*a-d*). In some embodiments, the pseudo book-shape defined by the exemplary set of spine lines 2422 may be determined to comprise an edge group 2454*a* and/or a rectangle group 2454*b* (both shown in framework notation, minus any possible joins). As shown in FIG. 24, the two straight line groups 2454*a-b* may share a straight line part of the exemplary set of spine lines 2422. In some embodiments, the exemplary set of spine lines 2422 may therefore be defined by the two straight line groups 2454*a-b* and the shared straight line part.

Figure 25:
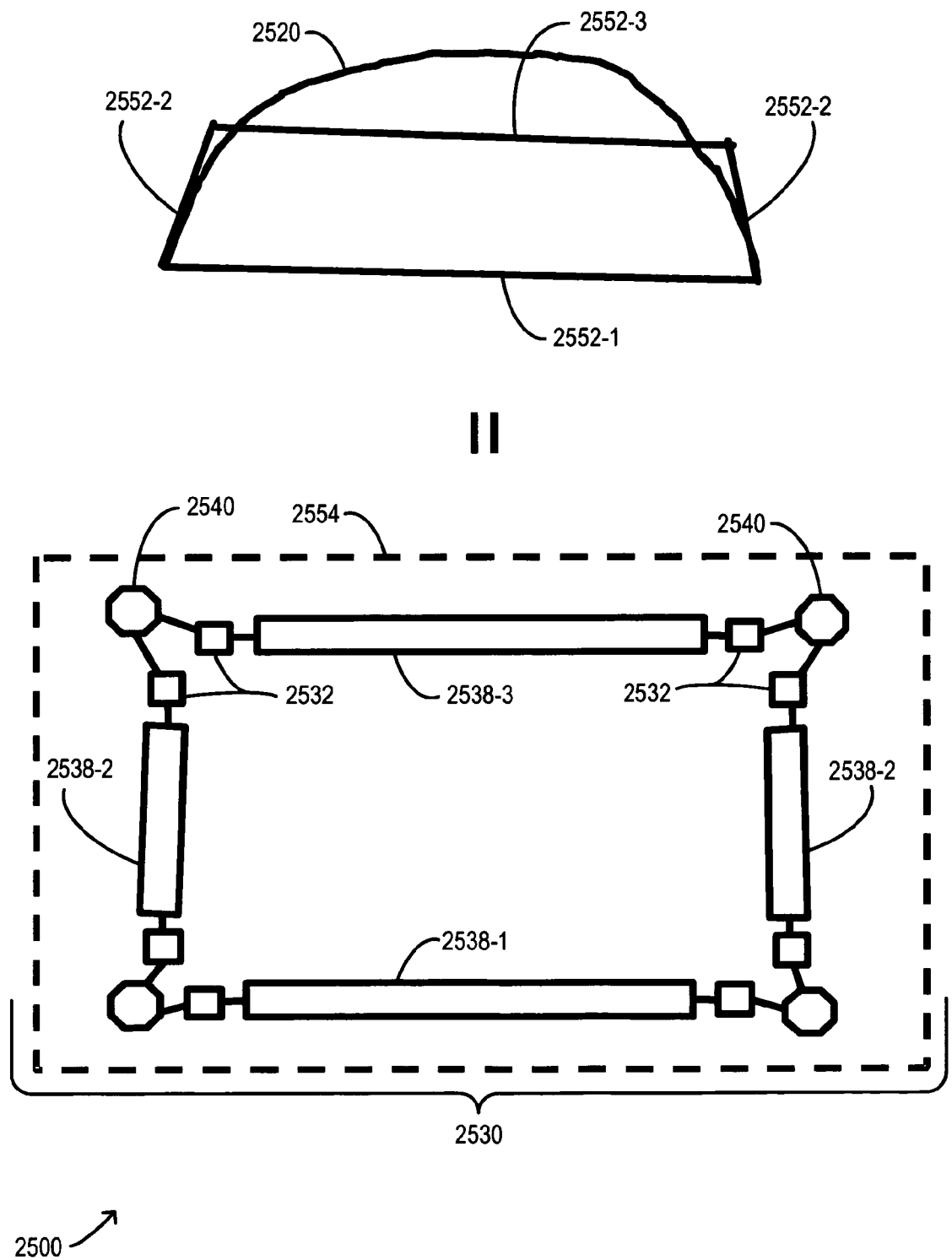
FIG. 25 is a diagram of a graphical analysis method according to some embodiments.

Referring now to FIG. 25, a diagram of a graphical analysis method 2500 according to some embodiments is shown. The graphical analysis method 2500 may, for example, be associated with the system 100 and/or with any of the methods 200, 300, 400, 500, 710, 910, 1310, 1720, 1824 described herein. In some embodiments, the graphical analysis method 2500 may be implemented with respect to the exemplary drawing 600 to produce a three-dimensional sketch. According to some embodiments, the graphical analysis method 2400 may be an exemplary implementation of the methods 1720, 1824 described in conjunction with any of FIG. 17 and/or FIG. 18. The graphical analysis method 2500 may, for example, be associated with grouping parts into recognizable structures at 1724 and/or 1824 and/or with grouping straight parts at 1724-2 and/or 1824-2.

In some embodiments, the graphical analysis method 2500 may include analyzing an exemplary spine line 2520 to determine if one or more parts of the exemplary spine line 2520 may be grouped into one or more recognizable structures (such as the curve groups 2050*a-j*, 2150 and/or the straight line groups 2354*a-d*). In some embodiments, the exemplary spine line 2520 may be similar to the exemplary spine lines 1420, 1620*d*, 2220 described elsewhere herein as being associated with input from a user. According to some embodiments, the exemplary spine line 2520 may be identified as an arch, for example, and corresponding group components such as a base line 2552-1, wand lines 2552-2, and/or a mantel line 2552-3 may be added to the exemplary spine line 2520. In some embodiments, the added group components 2552-1, 2552-2, 2552-3 may also or alternatively be considered during the grouping of parts.

The added group components 2552-1, 2552-2, 2552-3 associated with identifying the exemplary spine line 2520 as an arch, for example, may themselves be determined to form a straight line group. The partial enhanced framework 2530-1 may, according to some embodiments, represent the grouping of the added group components 2552-1, 2552-2, 2552-3. The partial enhanced framework 2530-1 may comprise, for example, a straight line group object 2554 (such as a rectangle group), that may further comprise a base line object 2538-1, wand line objects 2538-2, a mantel line object 2538-3, endpoint objects 2532, and/or point-to-point join objects 2540. The straight line group object 2554 associated with the group components 2552-1, 2552-2, 2552-3 may, according to some embodiments, be utilized in further processing of the exemplary spine line 2520 and/or the original line input data represented thereby.

Figure 26:
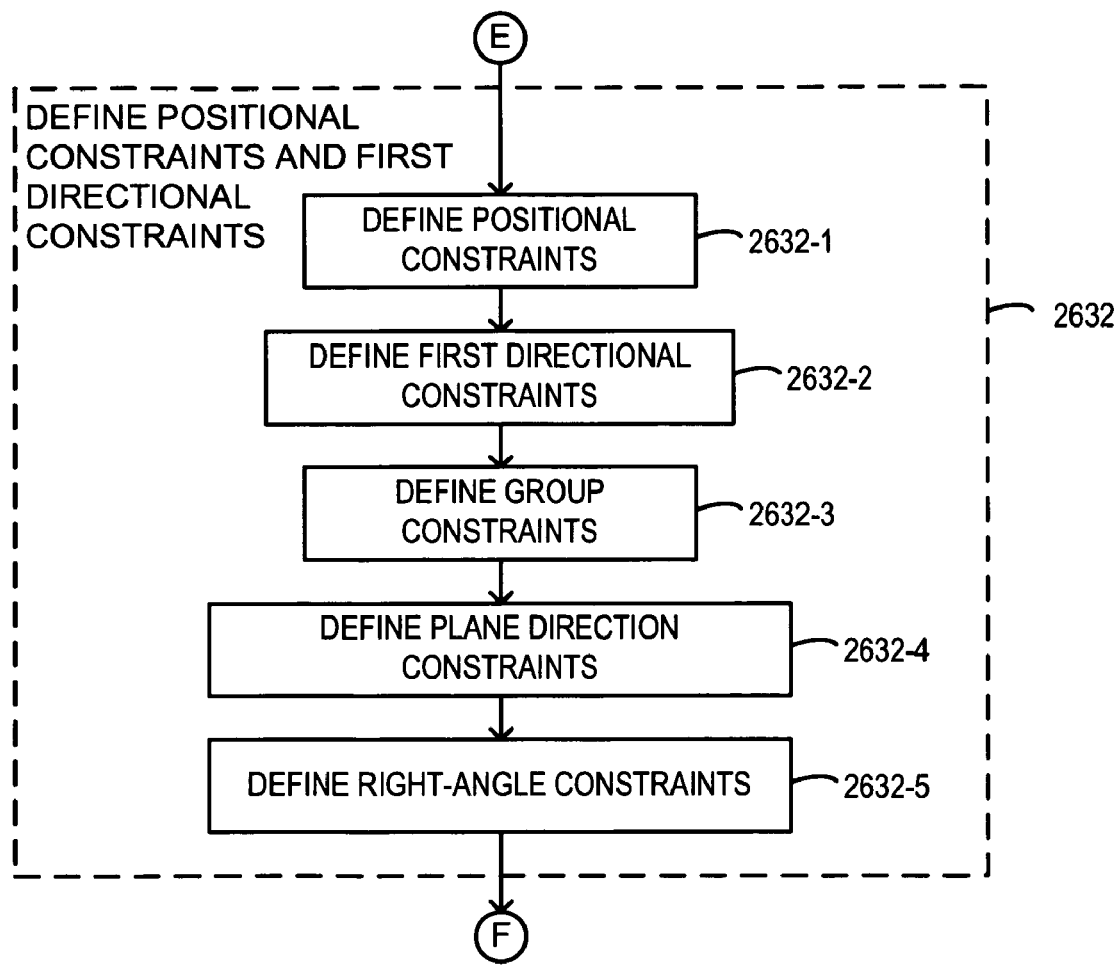
FIG. 26 is a flowchart of a method according to some embodiments.

Referring now to FIG. 26, a flowchart of a method 2630 according to some embodiments is shown. The method 2630 may, in some embodiments, be associated with the system 100 and/or any components thereof and/or may also or alternatively be associated with the methods 200, 300, 400, 500, 710, 910, 1310, 1720, 1824 described herein. The method 2630 may, for example, be a portion and/or continuation of the method 400 described in conjunction with FIG. 4. The method 2630 may, for example, be associated with generating and solving constraints at 430. In some embodiments, the method 2630 may also or alternatively be a continuation of the method 1720. The method 2630 may, for example, begin at E, where the method 1720 left off. In some embodiments, the method 2630 may also or alternatively be associated with the exemplary drawing 600 described in conjunction with FIG. 6A and FIG. 6B herein.

In some embodiments, the method 2630 may define positional constraints and/or first directional constraints at 2632. Positional constraints may, for example, be spatial and/or location relationships associated with various spine lines and/or parts thereof. In some embodiments, positional constraints may comprise and/or otherwise be associated with joins such as point-to-point, point-to-part, and/or part-to-part joins. According to some embodiments, spine lines and or other objects may be examined to determine and/or define positional constraints, at 2632-1. Directional constraints may be or include relationships associated with orientations and/or other characteristics of spine lines and/or other objects. In some embodiments, spine lines may be analyzed to define a first set of directional constraints, at 2632-2. According to some embodiments, any spine lines and/or parts that have been identified as being associated with a group may also or alternatively be subject to constraints of the group. The defining of constraints may continue, for example, to define such group constraints at 2632-3.

According to some embodiments, other types of constraints may also or alternatively be defined. Certain types of constraints may be defined to facilitate processing of the spine line data and/or conversion of the original line input data into three-dimensions. The three-dimensional sketching tool may, for example, define plane direction constraints at 2632-4 and/or defined right-angle constraints at 2632-5. In some embodiments, the definition of the positional constraints at 2632-1 may involve various sub-procedures and/or routines.

Figure 27:
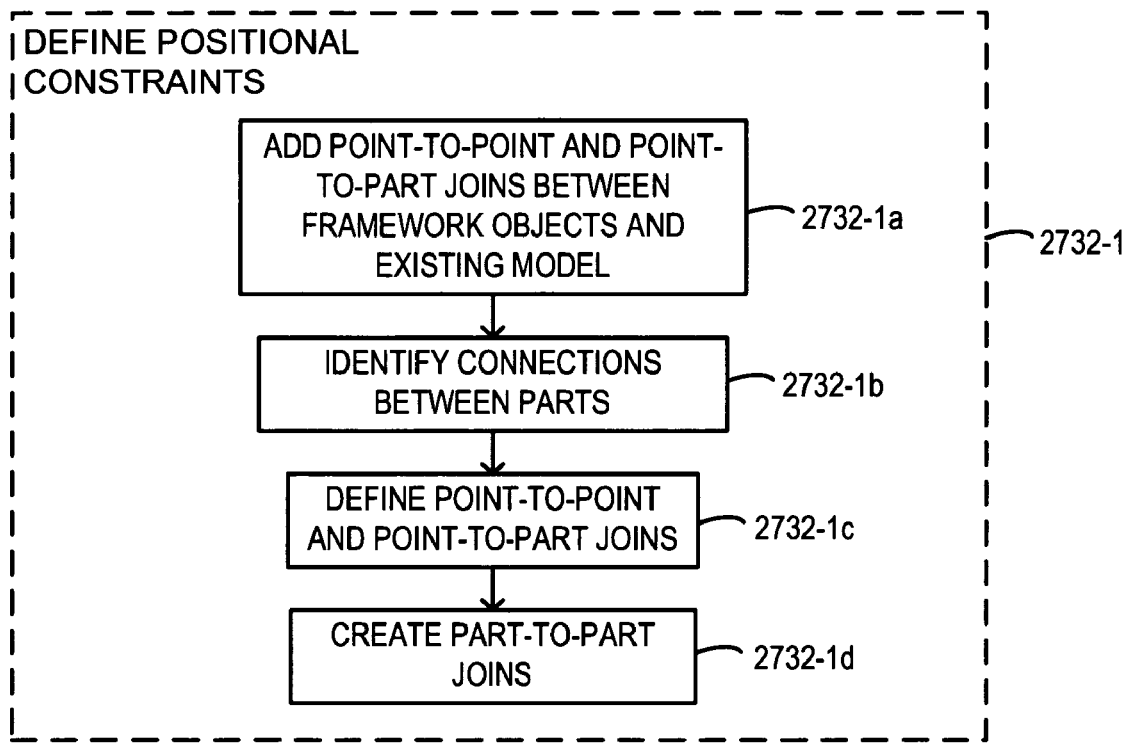
FIG. 27 is a flowchart of a method according to some embodiments.

Referring to FIG. 27, for example, a flowchart of a method 2732 according to some embodiments is shown. In some embodiments, the method 2732 may be associated with the method 2630 described in conjunction with FIG. 26. The method 2732 may, for example, comprise various sub-procedures to define positional constraints 2732-1. According to some embodiments, the method 2732 may add additional and/or second positional constraints. Initial and/or first positional constraints may, for example, have already been added and/or defined as joins between framework objects at 1722 and/or 1722-2. In some embodiments, the method 2732 and/or the definition of the positional constraints 2732-1 may begin to add point-to-point and point-to-part joins between framework objects and the existing model, at 2731-1a. Framework objects created to represent spine lines may, for example, be tested against positions of objects in an existing three-dimensional model to determine if the new input should be joined to any pre-existing three-dimensional structures.

In some embodiments, the definition of the positional constraints 2732-1 may continue to identify connections between parts at 2732-1b. The definition of the positional constraints 2732-1 may also or alternatively define point-to-point and point-to-part joins at 2732-1c. According to some embodiments, the framework may be analyzed to create part-to-part joins, at 2732-1d. Parts of spine lines that overlap other parts (such as parts of the existing three-dimensional model) may, for example, be joined at intersecting points.

Figure 28:
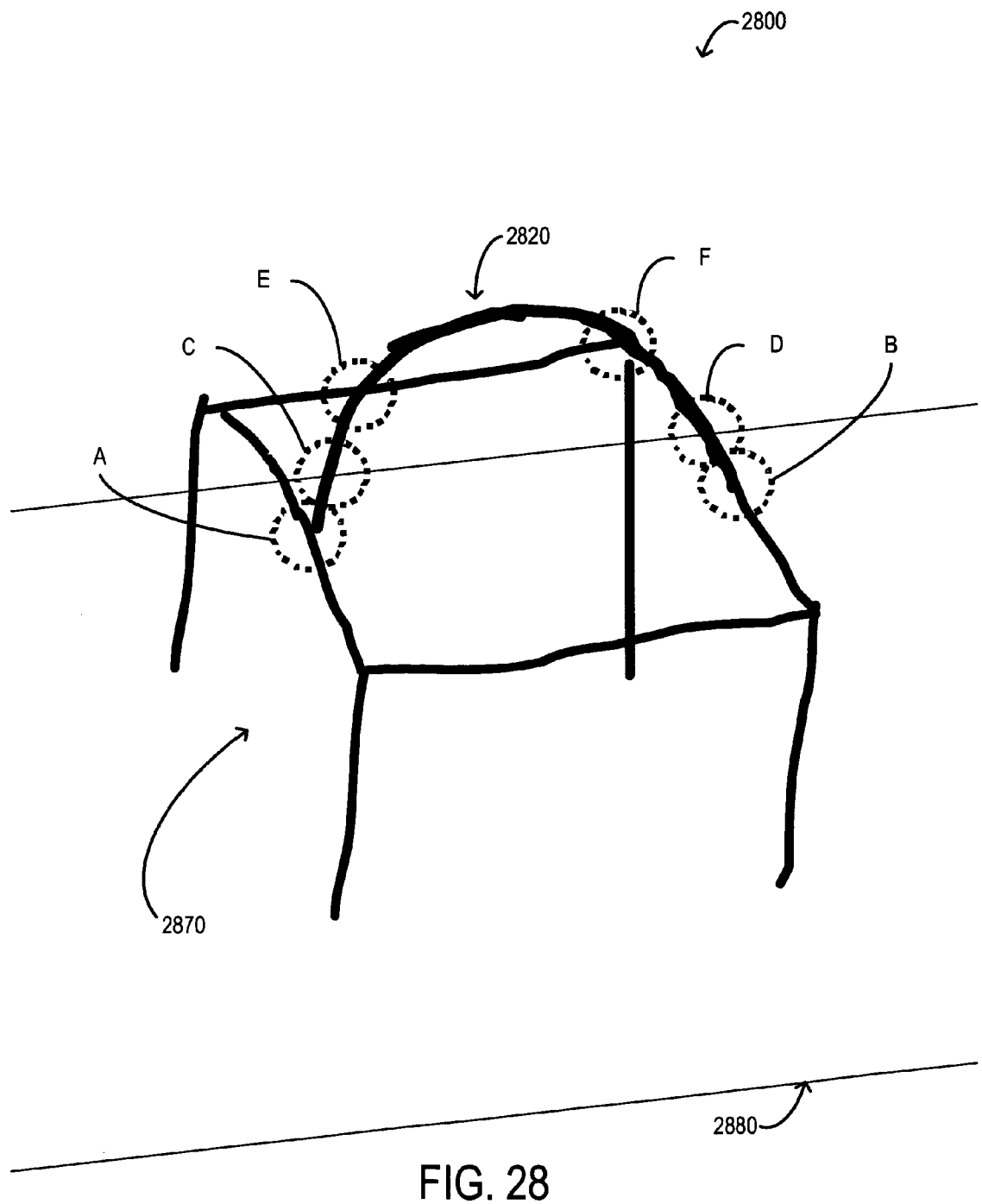
FIG. 28 is a diagram of an exemplary drawing according to some embodiments.

Turning to FIG. 28, a diagram of an exemplary drawing 2800 according to some embodiments is shown. The exemplary drawing 2800 may, for example, be associated with the system 100 and/or with any of the methods 200, 300, 400, 500, 710, 910, 1310, 1720, 1824, 2630, 2732 described herein. In some embodiments, the exemplary drawing 2800 may represent a three-dimensional sketch. The exemplary drawing 2800 may, according to some embodiments, be similar to the exemplary drawing 600 described in conjunction with FIG. 6A and/or FIG. 6B herein. The exemplary drawing 2800 may comprise, for example, an exemplary spine line 2820 that may be similar to the exemplary spine lines 1420, 1620d, 2220, 2520 described elsewhere herein and/or that may otherwise represent the original line input data received from the user. The exemplary spine line 2820 may, according to some embodiments for example, arch over the top of an existing table-like object 2870 that already exists in the exemplary drawing 2800. The exemplary drawing 2800 may also or alternatively comprise an existing ground plane object 2880 defined within the existing three-dimensional model.

In some embodiments, the exemplary spine line 2820 may be analyzed (e.g., in accordance with any of the methods 2630, 2732) to determine where joins may be added between the newly input data (e.g., as represented by the spine line 2820) and the existing objects 2870, 2880. According to some embodiments, such as in the case that no existing objects 2870, 2880 are within the three-dimensional model and/or in the case that the newly drawn lines are not near and/or overlapping any existing objects 2870, 2880, no joins may be necessary, desirable, and/or practicable. In some embodiments, such as in the exemplary drawing 2800, multiple joins may be identified and/or created.

The locations where the exemplary spine line 2820 terminates on and/or near the edges of the existing table object 2870 may, according to some embodiments, be identified as locations where joins may occur. The relationship of the exemplary spine line 2820 to the existing table object 2870 may, for example, be analyzed to determine if joins are appropriate at those locations. In some embodiments, such as in the case that it is determined that joins are appropriate, joins may be created between the exemplary spine line 2820 and the existing table object 2870. According to some embodiments, point-to-part joins (e.g., "A" and "B") may be created, for example, at the points where the endpoints of the exemplary spine line 2820 meet the existing table object 2870. The joins may be created as point-to-part joins (e.g., "A" and "B"), for example, because the endpoints are being joined along non-point portions of parts (e.g., straight line parts and/or curve parts) of the existing table object 2870.

Other joins may also or alternatively be created. Part-to-part joins (e.g., "C", "D", "E", and "F") may, for example, be created to connect parts of the exemplary spine line 2820 to parts of the existing objects 2870, 2880. In some embodiments, the two points where the exemplary spine line 2820 crosses and/or intersects with the existing ground plane object 2880 may, for example, be chosen as locations for the first two part-to-part joins (e.g., "C" and "D"). The second two part-to-part joins (e.g., "E" and "F") may, according to some embodiments, be created at the points where the exemplary spine line 2820 crosses and/or intersects with the back edge of the existing table object 2870. In such a manner, for example, various types of joins may be created to relate and/or connect the newly drawn lines with existing objects 2870, 2880.

Figure 29:
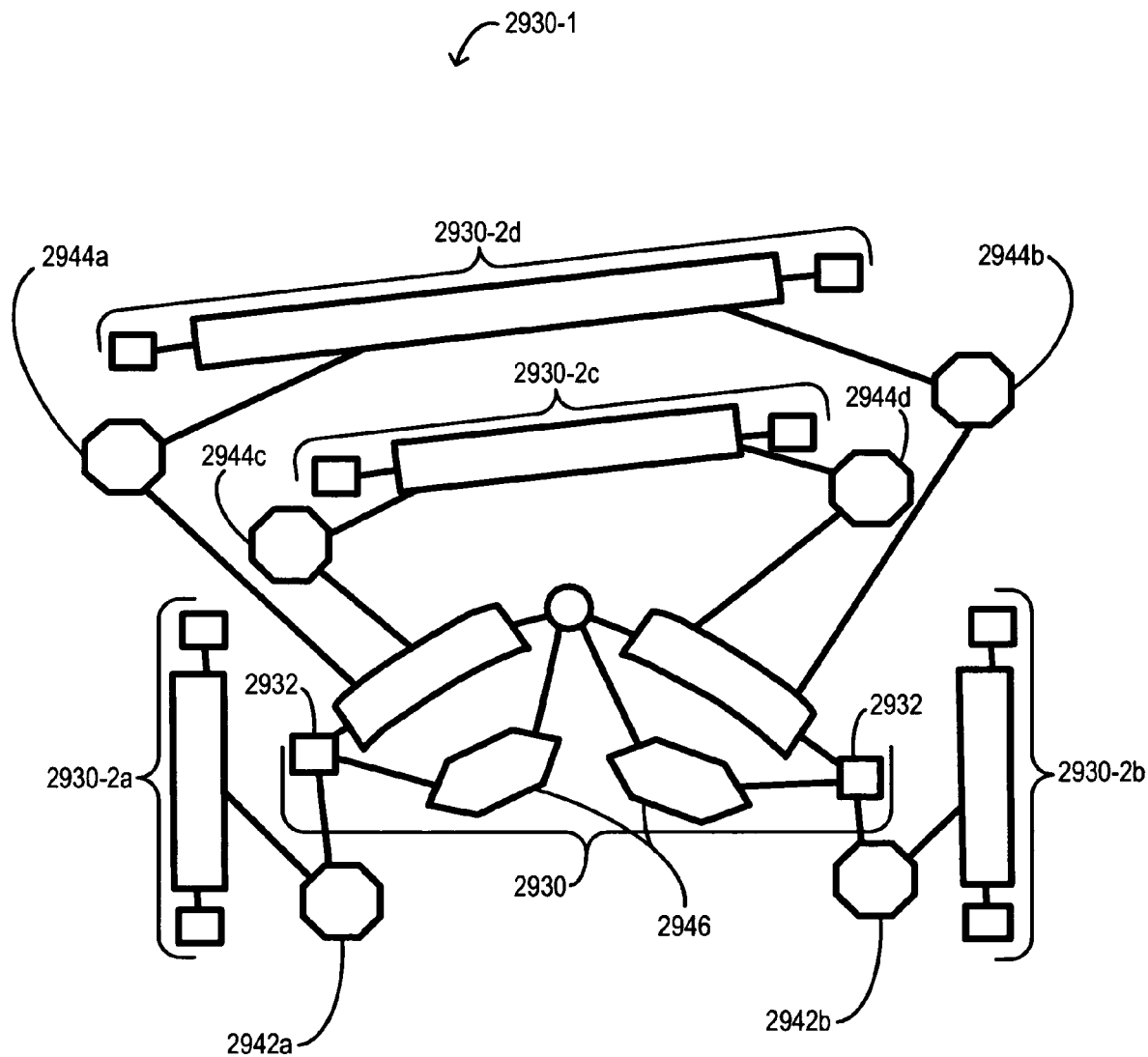
FIG. 29 is a diagram of a graphical framework according to some embodiments.

Turning to FIG. 29, a diagram of an enhanced graphical framework 2930-1 according to some embodiments is shown. The enhanced graphical framework 2930-1 may, for example, be representative of any of the exemplary spine lines 1420, 1620d, 2220, 2520, 2820 created from the original line input data received by the user. According to some embodiments, the enhanced graphical framework 2930-1 may represent the exemplary drawings 600, 2800 and/or the joins described in conjunction therewith. The enhanced graphical framework 2930-1 may, for example, comprise an original framework 2930 representing the spine line created from the user's input and/or one or more existing frameworks 2930-2. The existing frameworks 2930-2 may, according to some embodiments, comprise a first existing framework portion 2930-2a representing the left edge of the existing table object 2870, a second existing framework portion 2930-2b representing the right edge of the existing table object 2870, a third existing framework portion 2930-2c representing the back side of the existing table object 2870, and/or a fourth existing framework portion 2930-2d representing the back side of the existing ground plane object 2880.

According to some embodiments, the original framework 2930 may be joined to the existing frameworks 2930-2 to represent the various locations that the exemplary spine line overlaps and/or intersects with the existing objects (e.g., points and/or joins "A", "B", "C", "D", "E", and/or "F" from FIG. 28). Point-to-point join objects 2942a-b may be created to link the endpoint objects 2932 of the original framework 2030 (e.g., the endpoints of the spine line) to the existing frameworks 2930-2a, 2930-2b representing the sides of the existing table object. Similarly, part-to-part join objects 2944a-b may be created to link the parts of the original framework 2030 and the parts of the existing frameworks 2930-2c, 2930-2d that intersect. In some embodiments, other joins and/or types of joins may also or alternatively be created. End-of-part join objects 2946 may, for example, be added to identify the bounds of the original framework 2030 and/or the spine line represented thereby.

Figure 30A:
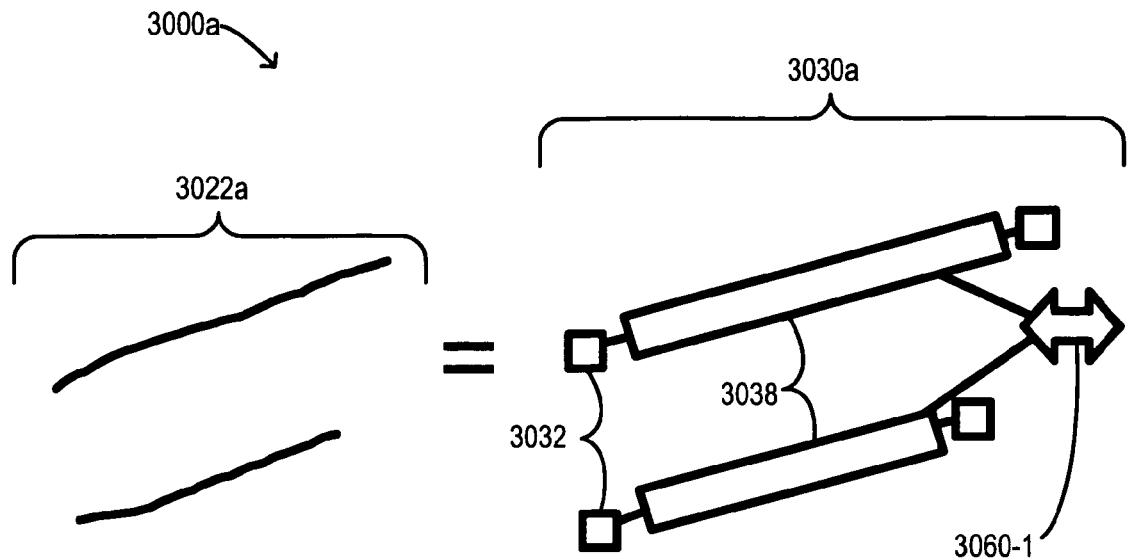
FIGS. 30A & 30B are diagrams of graphical analysis methods according to some embodiments.
Figure 30B:
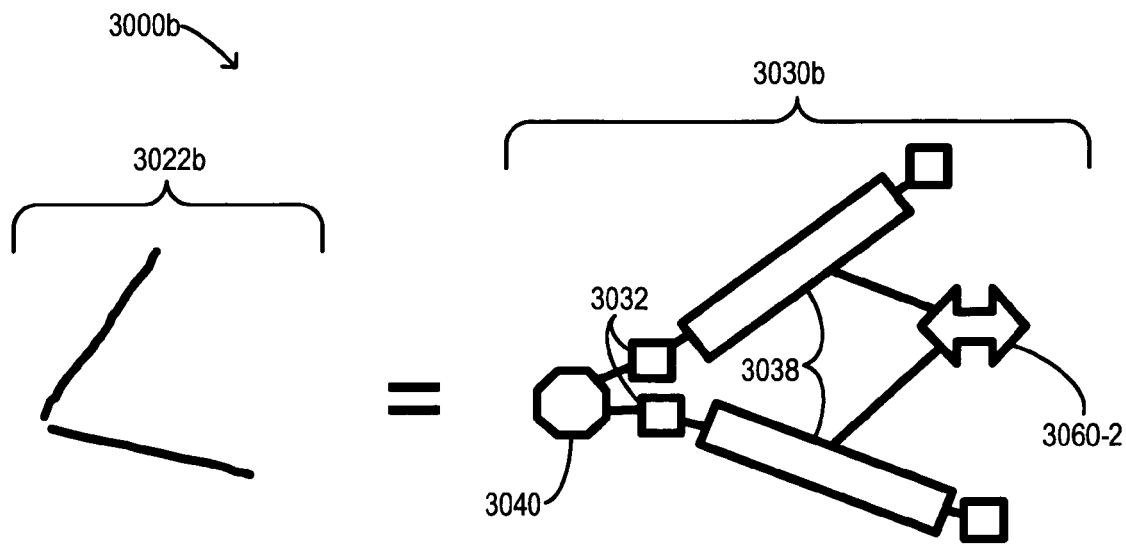

Referring now to FIG. 30A and FIG. 30B, diagrams of graphical analysis methods 3000a-b according to some embodiments are shown. The graphical analysis methods 3000a-b may, for example, be associated with the system 100 and/or with any of the methods 200, 300, 400, 500, 710, 910, 1310, 1720, 1824, 2630, 2732 described herein. In some embodiments, the graphical analysis methods 3000a-b may be implemented with respect to the exemplary drawings 600, 2800 to produce a three-dimensional sketch. According to some embodiments, the graphical analysis methods 3000a-b may be exemplary implementations of the method 2630 described in conjunction with FIG. 26. The graphical analysis methods 3000a-b may, for example, be associated with defining constraints at 2632.

In some embodiments, constraints may be associated with strengths that may, for example, represent pre-defined strength categories. Constraint strength values may, for example, represent an assumed accuracy and/or a probability associated with the existence of the constraint. According to some embodiments, such as shown in Table 1 below, the strength value may range from "Impossible" (e.g., zero) to "Essential" (e.g., six). Other strength values, in order of least powerful may comprise, for example, "Force" (e.g., one), "Orient" (e.g., two), "Okay" (e.g., three), "Useful" (e.g., four), and/or "Better" (e.g., five).

TABLE 1

Constraint Strengths

| Constraint Strength | Strength Value | Description |
| --- | --- | --- |
| Essential | 6 | Constraint should be used if at all possible |
| Better | 5 | Constraint is better than usual. |
| Useful | 4 | Constraint is a good choice. |
| Okay | 3 | Constraint is available |
| Orient | 2 | Constraint is used to orient a planar object |
| Force | 1 | Constraint should be used as a last resort to position a part |
| Impossible | 0 | Constraint is currently not valid and must not be used |

In some embodiments, the stronger the value associated with a constraint, the more likely it will be that the constraint is used to convert the user's line input data into three-dimensional lines. Relationships with the existing three-dimensional model may, for example, be strongest, while relationships associated with newly drawn objects may be weaker. Some constraints (such as those set to the "Impossible" strength) may be created based on little or no knowledge and may therefore become active and/or inactive as is necessary during three-dimensional processing. Specific constraint strengths are shown and described in conjunction with other figures herein.

In FIG. 30A, the first graphical analysis method 3000a may analyze a first set of spine lines 3022a that may comprise two separate line parts. According to some embodiments, a first framework 3030a may represent the first set of spine lines 3022a and may comprise endpoint objects 3032 and straight line part objects 3038 representing the first set of spine lines 3022a. In some embodiments, the line parts of the first set of spine lines 3022a may be analyzed to determine if any directional constraints may link the two line parts. In the case that the two line parts are not members of the same group, are not connected, and/or appear substantially parallel (e.g., as shown in FIG. 30A), for example, a parallel constraint object 3060-1 may be created to relate the two line parts. The parallel constraint object 3060-1 may, according to some embodiments, be a directional constraint (e.g., not dependent upon the location of the two line parts) utilized to identify an expected and/or inferred relationship between the two line parts of the first set of spine lines 3022a.

According to some embodiments, such as shown in FIG. 30B, the second graphical analysis method 3000b may also or alternatively process other types of constraints and/or directional constraints. The second set of spine lines 3022b of FIG. 30B may, for example, comprise two line parts that are connected and/or joined, and do not appear to be substantially parallel. In some embodiments, a second framework 3030b may represent the second set of spine lines 3022b and may comprise, for example, endpoint objects 3032, straight line objects 3038, and/or a point-to-point join object 3040. According to some embodiments, the line parts of the second set of spine lines 3022b may be assumed to be related as a right angle. The second framework 3030b may be edited and/or augmented, for example, to add a right-angle constraint object 3060-2 to identify and/or signify such a relationship.

Figure 31A:
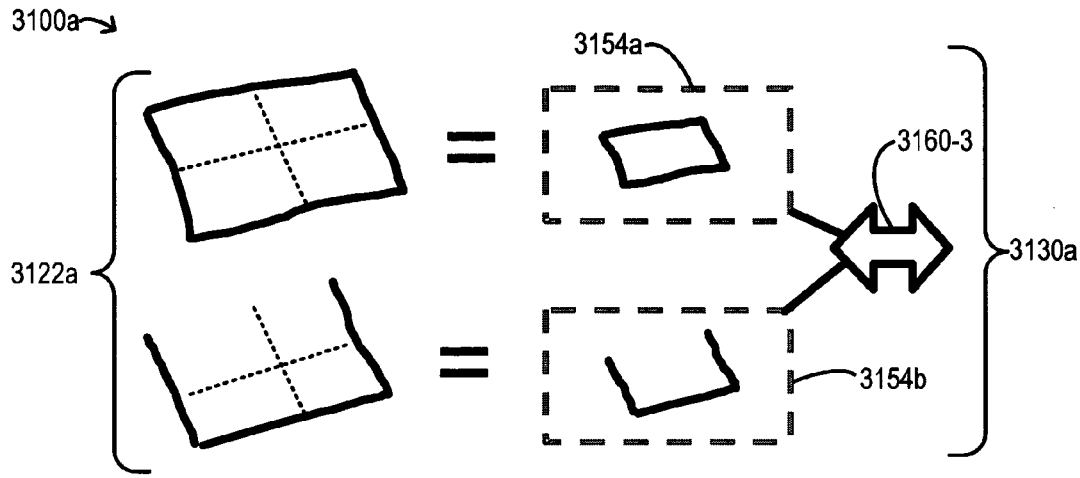
FIGS. 31A, 31B, & 31C are diagrams of graphical analysis methods according to some embodiments.
Figure 31B:
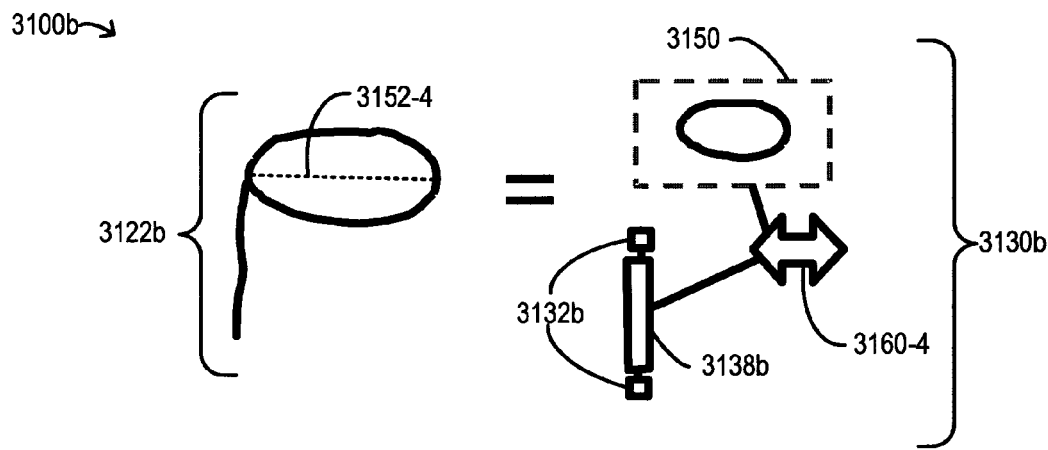
Figure 31C:
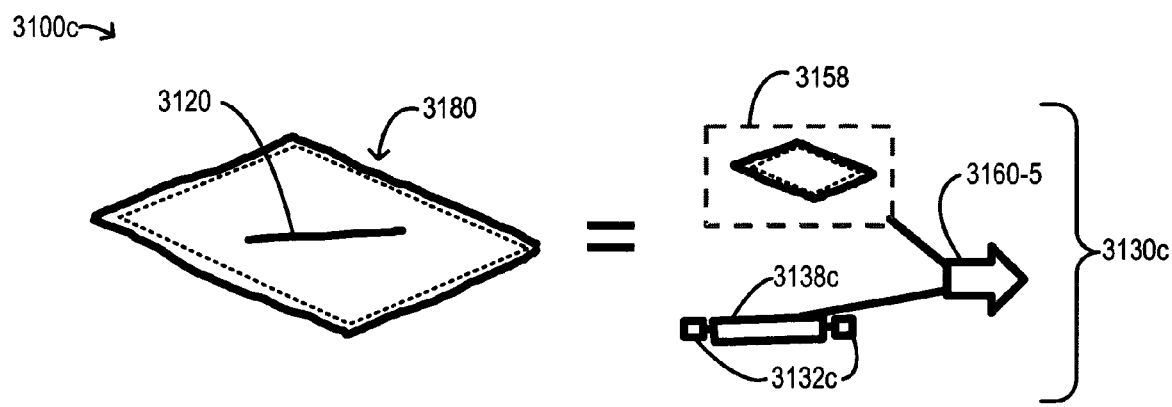

Turning to FIG. 31A, FIG. 31B, and FIG. 31C, diagrams of graphical analysis methods 3100a-c according to some embodiments are shown. The graphical analysis methods 3100a-c may, for example, be associated with the system 100 and/or with any of the methods 200, 300, 400, 500, 710, 910, 1310, 1720, 1824, 2630, 2732 described herein. In some embodiments, the graphical analysis methods 3100a-c may be implemented with respect to the exemplary drawings 600, 2800 to produce a three-dimensional sketch. According to some embodiments, the graphical analysis methods 3100a-c may be exemplary implementations of the method 2630 described in conjunction with FIG. 26. The graphical analysis methods 3100a-c may, for example, be associated with defining constraints at 2632.

The first graphical analysis method 3100a in FIG. 31A, for example, may comprise a method of defining a relationship between and/or within a first set of spine lines 3122a. In some embodiments, a first framework 3130a may represent the first set of spine lines 3122a. The first set of spine lines 3122a may, for example, be identified as and/or represented by a first straight line group 3154a such as a rectangle group and/or a second straight line group 3154*b* such as an edge group. In some embodiments, in the case that the two straight line groups 3154*a*-*b* comprise edges that appear substantially parallel (such as shown in FIG. 31A), the two straight line groups 3154*a*-*b* may be considered to be related as parallel planes (and/or as being associated with parallel planes). A parallel planes constraint object 3160-3 may, for example, be added to the first framework 3130*a* to relate the two straight line groups 3154*a*-*b* and/or to define the identified and/or assumed parallel planes relationship there between.

As shown in FIG. 31B, the second graphical analysis method 3100*b* may analyze a second set of spine lines 3122*b* that may be represented and/or defined by a second framework 3130*b*. The second framework 3130*b* may, for example, comprise a curve group object 3150 such as an oval group, a straight line part object 3138*b*, and/or endpoint objects 3132*b*. In some embodiments, a perpendicular-to-plane constraint object 3160-4 may be created to join the straight line part object 3138*b* to the curve group object 3150. In the case that the straight line part object 3138*b* is connected to an edge of the curve group object 3150 and appears to be substantially perpendicular to the diameter line 3152-4, for example, the perpendicular-to-plane relationship may be identified and/or assumed.

The third graphical analysis method 3100*c* may, according to some embodiments, analyze a spine line 3120 positioned on an existing plane object 3180. The spine line 3120 and the existing plane object 3180 may, for example, be represented and/or defined by a third framework 3130*c*. The third framework 3130*c* may, in some embodiments, comprise a plane group object 3158 and a straight line part object 3138*c* with endpoint objects 3132*c*. According to some embodiments, in the case that the spine line 3120 is substantially parallel to the existing plane 3180 (and/or to an object that is a member of the plane group object 3158) but the relationship is ambiguous because of a foreshortening of the existing plane 3180, a parallel-to-plane constraint object 3160-5 may be created to join the spine line 3120 and the existing plane 3180.

Figure 32A:
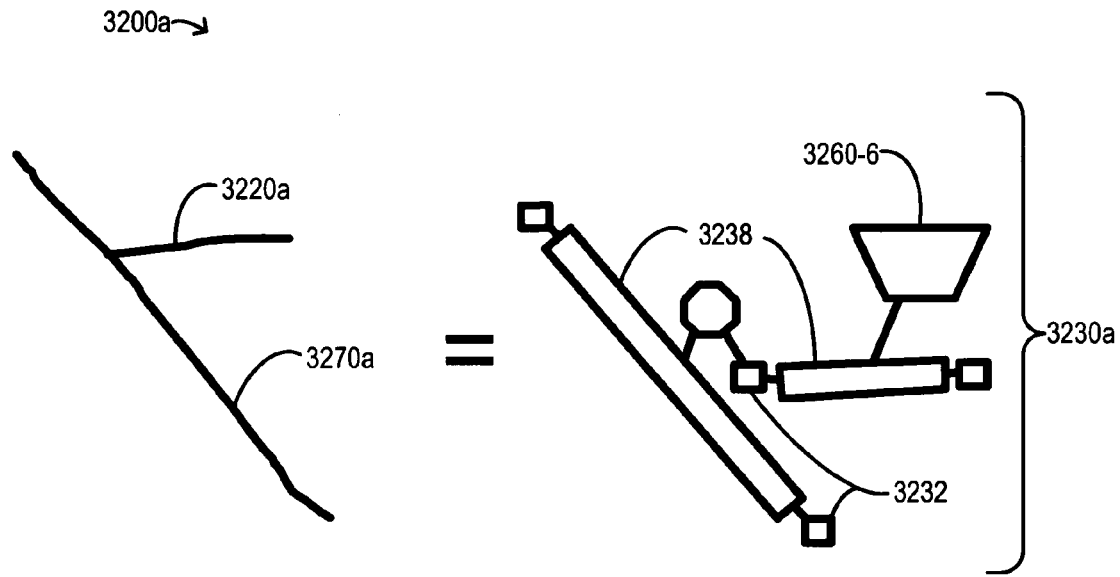
FIGS. 32A & 32B are diagrams of graphical analysis methods according to some embodiments.
Figure 32B:
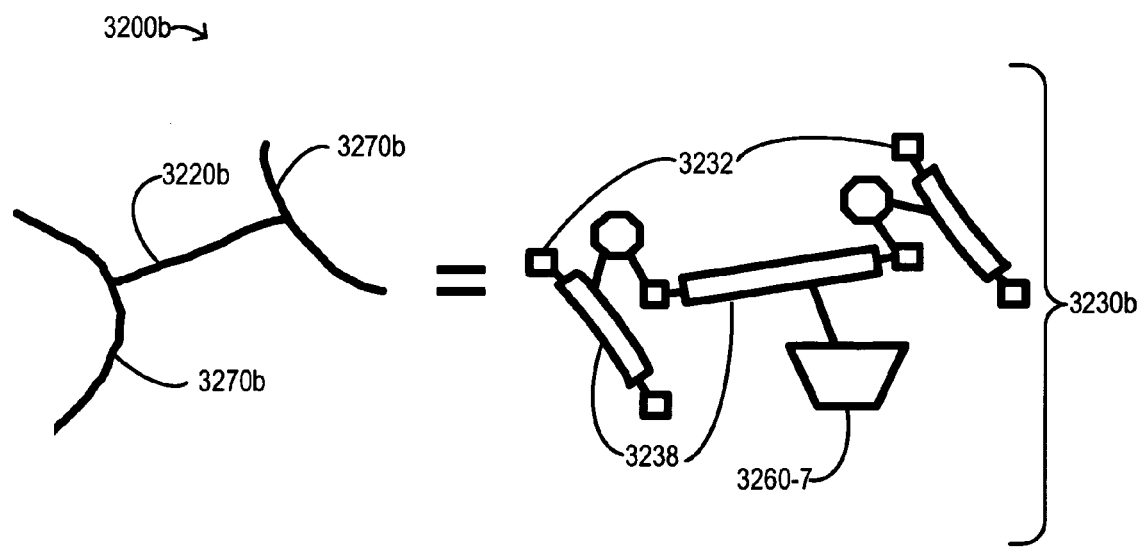

Turning to FIG. 32A, and FIG. 32B, diagrams of graphical analysis methods 3200*a*-*b* according to some embodiments are shown. The graphical analysis methods 3200*a*-*b* may, for example, be associated with the system 100 and/or with any of the methods 200, 300, 400, 500, 710, 910, 1310, 1720, 1824, 2630, 2732 described herein. In some embodiments, the graphical analysis methods 3200*a*-*b* may be implemented with respect to the exemplary drawings 600, 2800 to produce a three-dimensional sketch. According to some embodiments, the graphical analysis methods 3200*a*-*b* may be exemplary implementations of the method 2630 described in conjunction with FIG. 26. The graphical analysis methods 3200*a*-*b* may, for example, be associated with defining constraints at 2632.

In some embodiments, a rung-direction constraint may be determined to exist in the case that a line part is connected on one end to an existing drawing object and also appear to be substantially perpendicular to the existing object. As shown in FIG. 32A, for example, the first graphical analysis method 3200*a* may analyze a first spine line 3220*a* connected on one end to an existing line 3270*a*. The first spine line 3220*a* and the existing line 3270*a* may, according to some embodiments, be represented by a first framework 3230*a*. The first framework 3230*a* may, for example, comprise endpoint objects 3232 and/or straight line part objects 3238 to represent the first spine line 3220*a* and the existing line 3270*a*. In some embodiments, if a rung-direction constraint is determined to be appropriate, a rung-direction constraint object 3260-6 may be created to define (at least partially) the relationship of the first spine line 3220*a* to the existing line 3270*a*.

According to some embodiments, in the case that a line part is connected on both ends to existing drawing objects, a fixed-line constraint may be determined to exist. As shown in FIG. 32B, for example, the second graphical analysis method 3200*b* may analyze a second spine line 3220*b* that may be connected between two existing lines 3270*b*. The second spine line 3220*b* and the existing lines 3270*b* may, according to some embodiments, be represented by a second framework 3230*b*. The second framework 3230*b* may, for example, comprise endpoint objects 3232 and/or straight line part objects 3238 to represent the second spine line 3220*b* and/or the existing lines 3270*b*. In some embodiments, if a fixed-line constraint is determined to be appropriate, a fixed-line constraint object 3260-7 may be created to define (at least partially) the relationship of the second spine line 3220*b* to the existing lines 3270*b*.

Turning to FIG. 33A, FIG. 33B, FIG. 33C, and FIG. 33D, diagrams of a drawing 3300 and an enhanced graphical framework 3330-1 according to some embodiments are shown. The drawing 3300 and/or the enhanced graphical framework 3330-1 may, for example, be associated with the system 100 and/or with any of the methods 200, 300, 400, 500, 710, 910, 1310, 1720, 1824, 2630, 2732 described herein. In some embodiments, the drawing 3300 and/or the enhanced graphical framework 3330-1 may be implemented with respect to the exemplary drawings 600, 2800 to produce a three-dimensional sketch. According to some embodiments, the drawing 3300 and/or the enhanced graphical framework 3330-1 may represent an exemplary implementation of the method 2630 described in conjunction with FIG. 26. The drawing 3300 and/or the enhanced graphical framework 3330-1 may, for example, be associated with defining constraints at 2632.

In some embodiments, the drawing 3300 may be described in relation to three different views 3300*a*-*c*. According to some embodiments, a front view 3300*a* (e.g., as drawn by a user), a top view 3300*b*, and/or a side view 3300*c*, such as shown in FIG. 33A, FIG. 33B, and FIG. 33C, respectively, may be used to describe the drawing 3300. The drawing 3300 may comprise, for example, four lines drawn by the user. The four lines may, in some embodiments, be represented by and/or associated with, for example, the spine lines 3320*a*, 3320*b*-1, 3320*b*-2, 3320*c* shown in FIG. 33A, FIG. 33B, and/or FIG. 33C. In some embodiments, the spine lines 3320*a*, 3320*b*-1, 3320*b*-2, 3320*c* as seen by the user in the front view 3300*a* may be analyzed to apply line-direction constraints to determine how the spine lines 3320*a*, 3320*b*-1, 3320*b*-2, 3320*c* should look in other views (e.g., in the top view 3300*b* and/or in the side view 3300*c*).

For example, the first spine line 3320*a* may be a horizontal line in the front view 3300*a*. Because horizontal lines such as the first spine line 3320*a* may be ambiguous and/or not easily interpreted, the first spine line 3320*a* may be assigned a line-direction constraint that makes the first spine line 3320*a* "flat" to the user. As shown in the top view 3300*b* and the side view 3300*c*, for example, the first spine line 3320*a* may be assigned to a default orientation in the two views 3300*b*-*c* that makes the first spine line 3320*a* appear to be horizontal.

Other lines, such as the second spine lines 3320*b*-1, 3320*b*-2 may be interpreted differently. Lines may, for example, be assigned default three-dimensional orientations (e.g., line-direction constraints) based upon the angle the lines form in the front view 3300*a*. The second spine lines 3320*b*-1, 3320*b*-2, for example, are angled upwardly away from the center of the front view 3300*a*. In some embodiments, angled lines such as the second spine lines 3320*b*-1, 3320*b*-2 may be interpreted such that the highest portions of the second spine lines 3320*b*-1, 3320*b*-2 in the front view 3300*a* are tipped away from the user (e.g., away from the plane of the front view 3300*a*). This effect may be seen, for example, in the top and side views 3300*b*-*c*.

According to some embodiments, vertical lines such as the third spine line 3320*c* may be interpreted as tipping toward the user (e.g., toward the plane of the front view 3300*a*). The vertical orientation of the third spine line 3320*c* in the front view 3300*a*, for example, may cause a line-direction constraint to be associated with the third spine line 3320*c* that orients the third spine line 3320*c* as shown in the top and side views 3300*b*-*c*. In some embodiments, the orientation of the spine lines 3320*a*-*c* in the third dimension (e.g., utilized to create the top and side views 3300*b*-*c*) may also or alternatively be given default and/or other applied values.

Figure 33D:
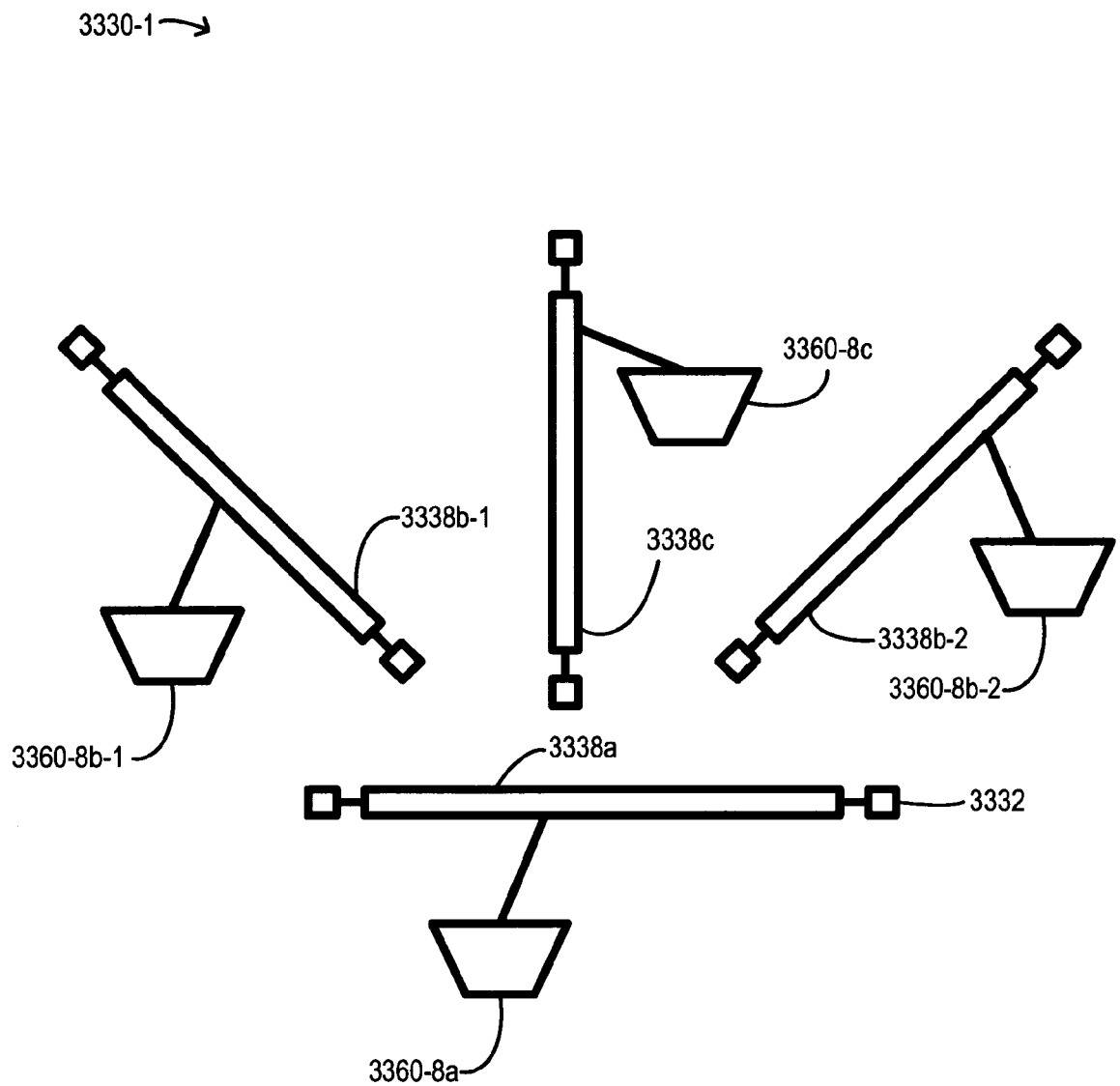
FIG. 33D is a diagram of an enhanced graphical framework according to some embodiments.

In some embodiments, the spine lines 3320 and/or the line-direction constraints associated therewith may be represented in the enhanced graphical framework 3330-1 shown in FIG. 33D. The enhanced graphical framework 3330-1 may, for example, comprise straight line part objects 3338*a*, 3338*b*-1, 3338*b*-2, 3338*c* representing the spine lines 3320*a*, 3320*b*-1, 3320*b*-2, 3320*c*, respectively. The enhanced graphical framework 3330-1 may also or alternatively comprise, for example, one or more endpoint objects 3332 representing the endpoints of the spine lines 3320. According to some embodiments, the enhanced graphical framework 3330-1 may also or alternatively comprise line-direction constraint objects 3360-8*a*, 3360-8*b*-1, 3360-8*b*-2, 3360-8*c* representing the line-direction constraint applied to the spine lines 3320.

Figure 34A:
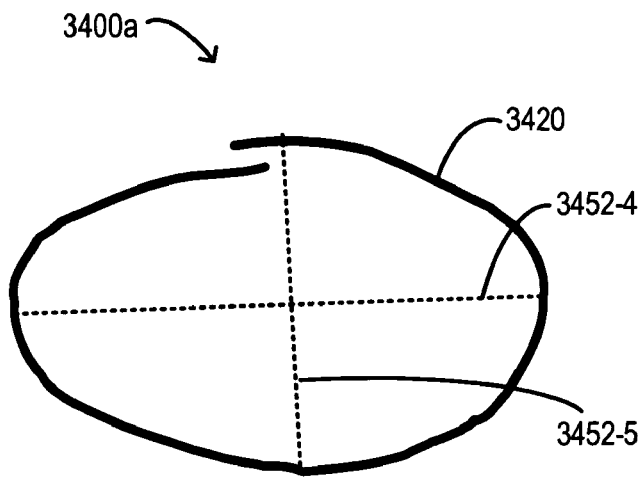
FIGS. 34A & 34B are diagrams of a drawing according to some embodiments.
Figure 34B:
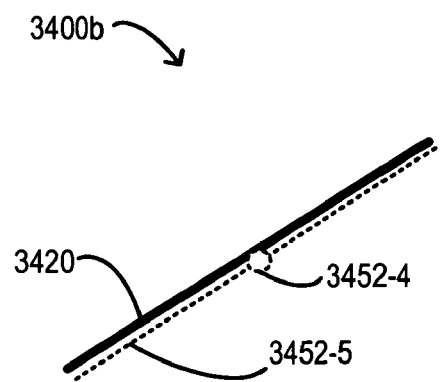
Figure 34C:
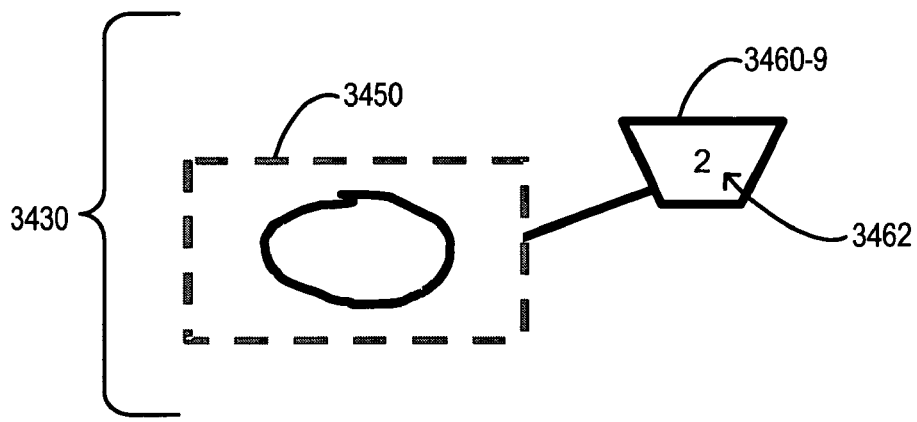
FIG. 34C is a diagram of a graphical framework according to some embodiments.

Turning to FIG. 34A, FIG. 34B, and FIG. 34C, diagrams of a drawing 3400 and of a graphical framework 3430 according to some embodiments are shown. The drawing 3400 may, for example, be associated with the system 100 and/or with any of the methods 200, 300, 400, 500, 710, 910, 1310, 1720, 1824, 2630, 2732 described herein. In some embodiments, the drawing 3400 may be implemented with respect to the exemplary drawings 600, 2800 to produce a three-dimensional sketch. According to some embodiments, the drawing 3400 may be an exemplary implementation of the method 2630 described in conjunction with FIG. 26. The drawing 3400 may, for example, be associated with defining constraints at 2632. The graphical framework 3430 may, according to some embodiments, represent the objects within the drawing 3400 and/or the relations there between.

In some embodiments, the drawing 3400 may be described in relation to two different views 3400*a*-*b*. According to some embodiments, a front view 3400*a* (e.g., as drawn and/or seen by a user) and/or a side view 3400*b*, such as shown in FIG. 34A and FIG. 34B, respectively, may be used to describe the drawing 3400. The drawing 3400 may comprise, for example, an oval shape drawn by the user. The oval shape may, in some embodiments, be represented by and/or associated with, for example, the spine line 3420 shown in FIG. 34A and/or FIG. 34B. In some embodiments, the spine line 3420 seen by the user in the front view 3400*a* may be analyzed to apply plane-direction constraints to determine how the spine line 3420 should look in other views (e.g., in the side view 3400*b*).

According to some embodiments, the spine line 3420 may supplemented by the group components 3450-4, 3450-5. In the case that the spine line 3420 is determined to resemble a curve group such as an oval group, for example, the diameter line 3450-4 and/or the width line 3450-5 may be added to the drawing 3400. In some embodiments, the plane-direction constraint applied to the spine line 3420 may be associated with the group components 3450-4, 3450-5. The three-dimensional position of the spine line 3420 may, for example, be calculated and/or adjusted such that the length of the width line 3540-5 in the side view 3400*b* is substantially equivalent to the length of the diameter line 3450-4 in the front view 3400*a*.

In some embodiments, the spine line 3420 and/or the plane-direction constraint may be represented in the graphical framework 3430 shown in FIG. 34C. The framework 3430 may, for example, comprise a curve group object 3450 representing the spine line 3420 and the group components 3450-4, 3450-5. According to some embodiments, the framework 3430 may also or alternatively comprise a plane-direction constraint object 3460-9 representing the plane-direction constraint applied to the spine line 3420. In some embodiments, the plane-direction constraint object 3460-9 may comprise a constraint strength indicator 3462. The constraint strength indicator 3462 may, for example, indicate a strength associated with the plane-direction constraint (such as the constraint strengths shown in and/or described in relation Table 1 herein).

Figure 35A:
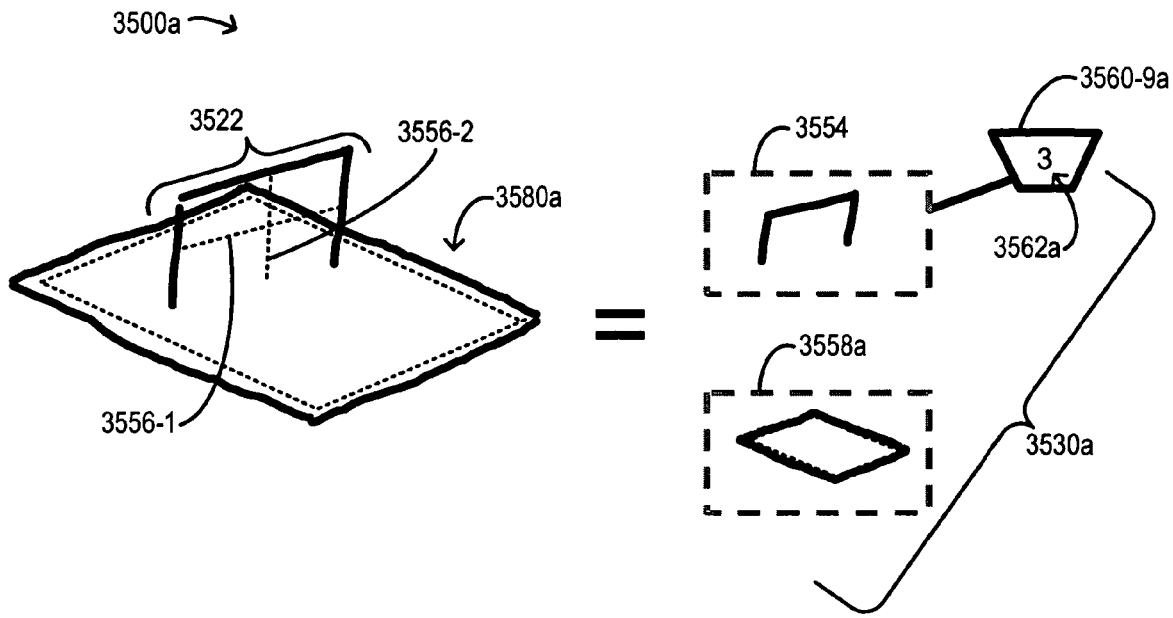
FIGS. 35A & 35B are diagrams of graphical analysis methods according to some embodiments.
Figure 35B:
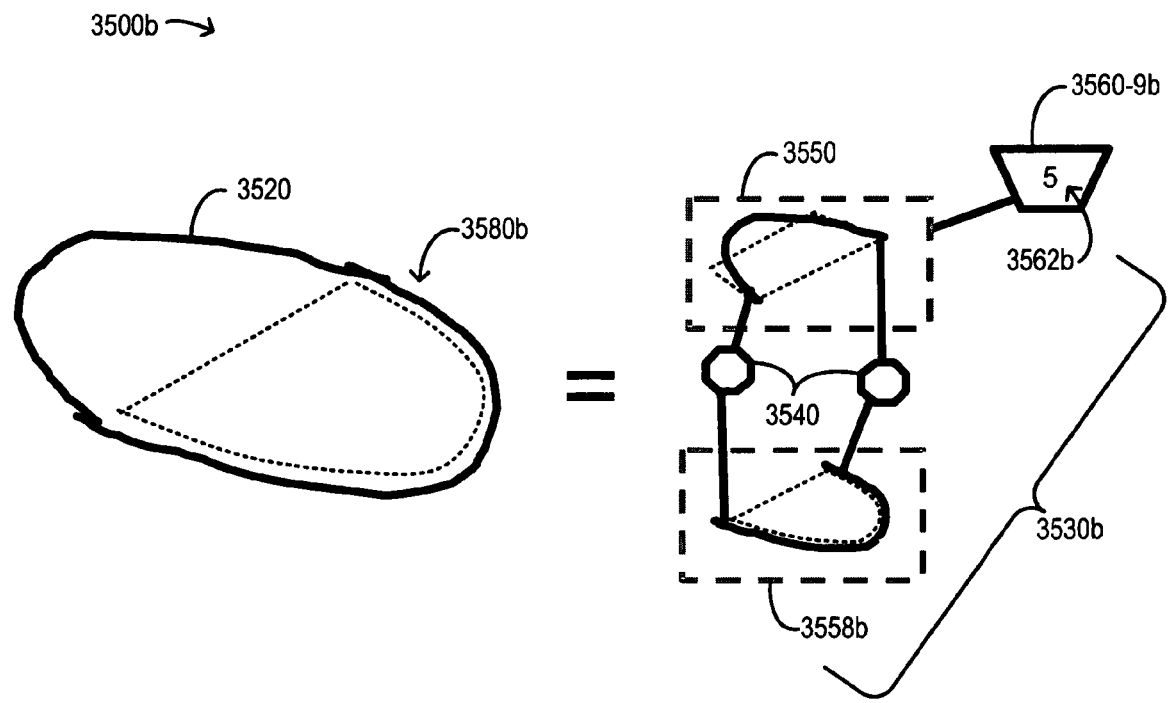

Turning to FIG. 35A and FIG. 35B, diagrams of graphical analysis methods 3500*a*-*b* according to some embodiments are shown. The graphical analysis methods 3500*a*-*b* may, for example, be associated with the system 100 and/or with any of the methods 200, 300, 400, 500, 710, 910, 1310, 1720, 1824, 2630, 2732 described herein. According to some embodiments, the graphical analysis methods 3500*a*-*b* may be exemplary implementations of the method 2630 described in conjunction with FIG. 26. The graphical analysis methods 3500*a*-*b* may, for example, be associated with defining constraints at 2632.

In some embodiments, a plane-direction constraint may be determined to exist in the case that line parts of a straight line group appear to be substantially perpendicular to an existing plane group. As shown in FIG. 35A, for example, the first graphical analysis method 3500*a* may analyze a set of spine lines 3522 that may be represented in a first framework 3530*a* by a straight line group object 3554 such as an edge group. Group components such as a base line 3556-1 and/or a height line 3556-2 may, according to some embodiments, be added to the set of spine lines 3522 in association with the straight line grouping. In some embodiments, a first existing plane 3580*a* may also or alternatively be represented by the first framework 3530*a*. The first framework 3530*a* may comprise, for example, a plane group object 3558*a* to represent the first existing plane 3580*a*.

According to some embodiments, in the case that the set of spine lines 3522 and/or the straight line group object 3554 appear to be perpendicularly oriented to the first existing plane 3580*a* and/or the plane group object 3558*a*, a plane-direction constraint object 3560-9*a* may be added to the first framework 3530*a*. The plane-direction constraint may, for example, assign, define, and/or identify the perpendicular relationship between the set of spine lines 3522 comprising the straight line group (e.g., represented by the straight line group object 3554) and the first existing plane 3580*a*. In some embodiments, the plane-direction constraint and/or the plane-direction constraint object 3560-9*a* may be associated with a constraint strength. The plane-direction constraint object 3560-9*a* may, for example, comprise a constraint strength indicator 3562*a*. As shown in FIG. 35A, the constraint strength indicator 3562*a* may show that the plane-direction constraint between the set of spine lines 3522 and the first existing plane 3580*a* is a value of three. In some embodiments, the value of three may indicate (e.g., as describe elsewhere herein) that the plane-direction constraint strength is "Okay".

The second graphical analysis method 3500b may, according to some embodiments, operate to analyze a spine line 3520 to determine if a relationship exists (and/or to define such a relationship) with a second existing plane 3580b. As shown in FIG. 35B, for example, the spine line 3520 may be an arch shape that intersects with (and/or comes close to intersecting with) the second existing plane 3580b. The spine line 3520 and the second existing plane 3580b may, according to some embodiments, be represented by a second framework 3530b. The second framework 3530b may comprise, for example, a curve group object 3550 (such as an arch group) and/or a plane group object 3558b. In some embodiments, the two group objects 3550, 3558b may be joined (e.g., at the ends of the respective arch shapes) by point-to-point join objects 3540.

In some embodiments, the connections between the endpoints of the spine line 3520 and the second existing plane 3580b and/or the apparent substantially parallel orientation between the two may be defined in and/or by a plane-direction constraint. A plane-direction constraint object 3560-9b may, for example, be added to the second framework 3530 to define a directional characteristic of the spine line 3520 and/or the straight line group associated therewith. In some embodiments, the strength of the constraint may be represented by a constraint strength indicator 3562b. As shown in FIG. 35B, for example, the constraint strength indicator 3562b of the plane-direction constraint object 3560-9b may indicate a strength of five. The strength of five may, for example, indicate a "better" strength of the plane-direction relationship.

Figure 36:
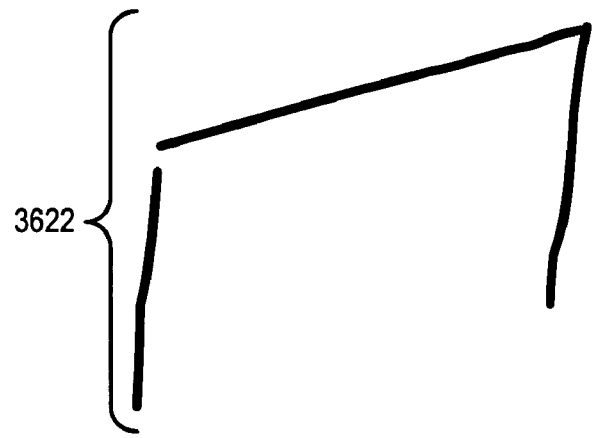
FIG. 36 is a diagram of a graphical analysis method according to some embodiments.
Figure 36:
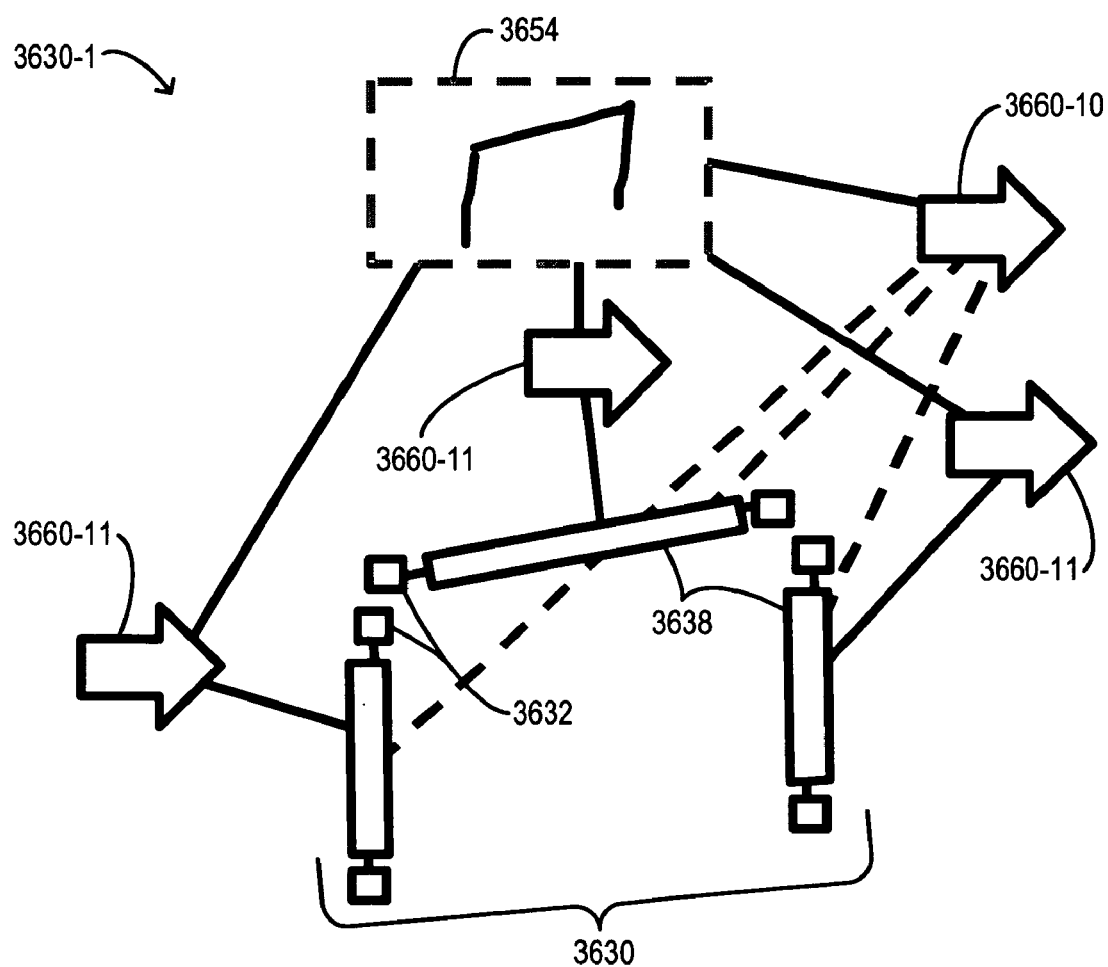

Referring now to FIG. 36, a diagram of a graphical analysis method 3600 according to some embodiments is shown. The graphical analysis method 3600 may, for example, be associated with the system 100 and/or with any of the methods 200, 300, 400, 500, 710, 910, 1310, 1720, 1824, 2630, 2732 described herein. According to some embodiments, the graphical analysis method 3600 may be an exemplary implementation of the method 2630 described in conjunction with FIG. 26. The graphical analysis method 3600 may, for example, be associated with defining constraints at 2632.

The graphical analysis method 3600 may, for example, analyze a set of spine lines 3622 that may also or alternatively be represented by a framework 3630. The framework 3630 may comprise, for example, endpoint objects 3632 and/or straight line part objects 3638 representing the set of spine lines 3622. In some embodiments, the set of spine lines 3622 may also or alternatively be represented by an enhanced framework 3630-1. The enhanced framework 3630-1 may, for example, comprise a straight line group object 3654 such as a rectangle group. According to some embodiments, the assignment of the set of spine lines 3622 to the rectangle group may define one or more constraints to be associated with the set of spine lines 3622. Constraints may be used, for example, to relate group objects and the parts that are members of the group.

The parts of the rectangle group (e.g., including the parts of the set of spine lines 3622) may, according to some embodiments, be utilized to determine the orientation of the rectangle group. A group-orient constraint may, for example, be assigned to the rectangle group to define how the parts of the group cause the rectangle group to be oriented. In some embodiments, a group-orient constraint object 3660-10 may be added to the enhanced framework 3630-1 to represent such a constraint. According to some embodiments, the orientation of the rectangle group may be propagated to all the members of the group. A part-of-group constraint may, for example, be associated with each part of the rectangle group to define how the parts should be oriented and/or react as part of the group.

According to some embodiments, one or more part-of-group constraint objects 3660-11 may be added the enhanced framework 3630-1 to represent such constraints.

If the normal of the group is determined by any means, the parts of the group may become oriented with the group via the part-of-group constraints. The group itself may use its members to determine its orientation using the group-orient constraint. In the case that two line parts in the same group become oriented, the group-orient constraint may, according to some embodiments, take the cross product of their vectors to determine its own normal. This may only work in the case that the line parts are not parallel. Because the group-orient constraint must generally wait until the directions of some parts are determined, it may use its strength parameter to signal when it is ready. While the parts are undetermined, for example, the strength of group-orient constraint may be set to "Impossible." When two parts become oriented, the constraint's strength may become "Essential."

Figure 37:
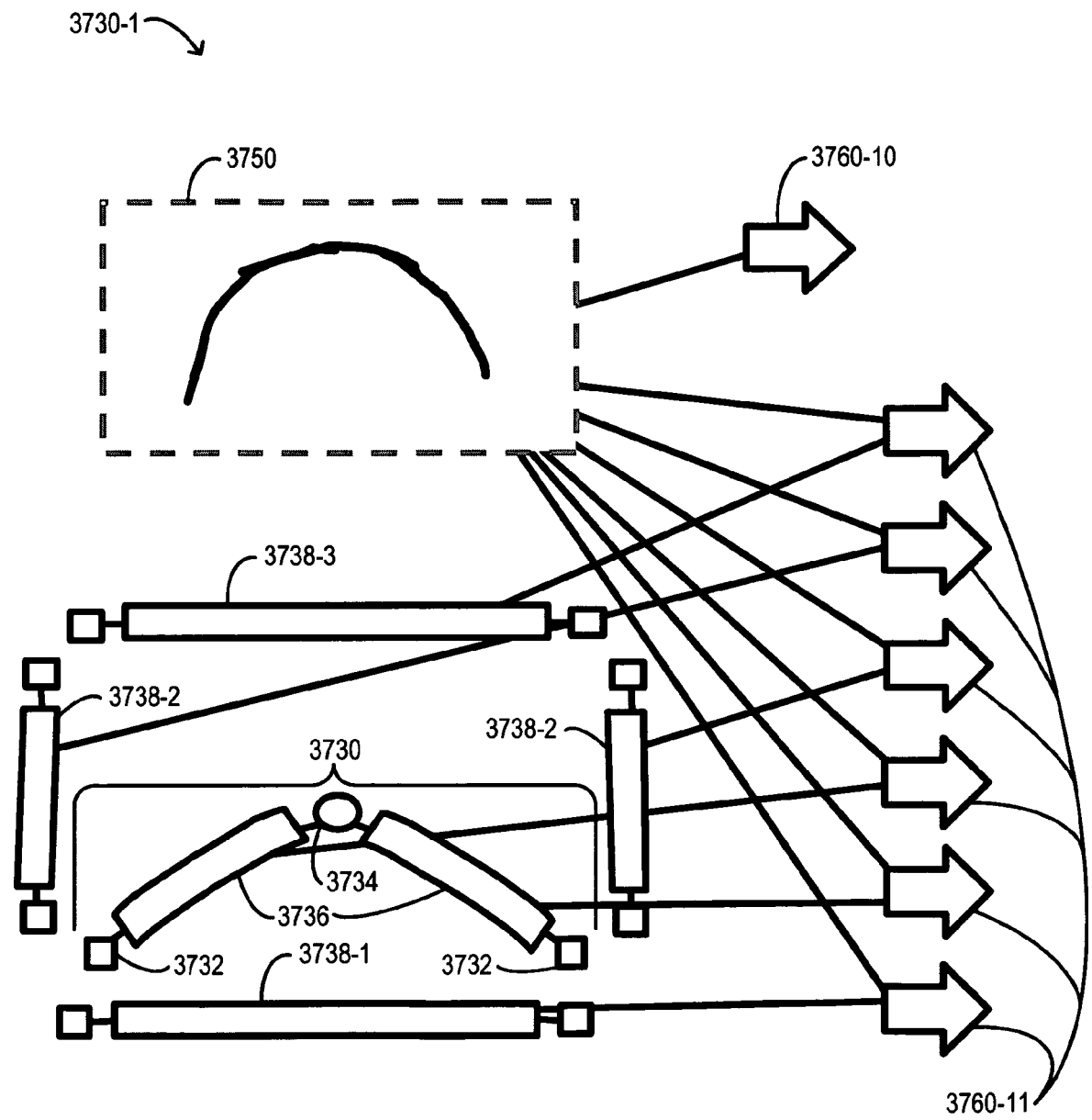
FIG. 37 is a diagram of an enhanced graphical framework according to some embodiments.

Referring now to FIG. 37, a diagram of an enhanced graphical framework 3730-1 according to some embodiments is shown. The enhanced graphical framework 3730-1 may, for example, be associated with the system 100 and/or with any of the methods 200, 300, 400, 500, 710, 910, 1310, 1720, 1824, 2630, 2732 described herein. In some embodiments, the enhanced graphical framework 3730-1 may be implemented with respect to the exemplary drawings 600, 2800 to produce a three-dimensional sketch. According to some embodiments, the enhanced graphical framework 3730-1 may be an exemplary implementation of the method 2630 described in conjunction with FIG. 26. The enhanced graphical framework 3730-1 may, for example, be associated with defining constraints at 2632.

In some embodiments, an original framework 3730 may represent a spine line associated with input from a user. The original framework 3730 may, for example, represent the exemplary spine lines 1420, 1620d, 2220, 2520, 2820 associated with the original line input data received by the user. In some embodiments, the original framework 3730 may comprise endpoint objects 3732, a midpoint object 3734, and/or curve part objects 3736 to represent the arch-shaped exemplary spine line. The enhanced framework 3730-1 may comprise the original framework 3730, a curve group object 3750 (such as an arch group), a base line object 3738-1, wand line objects 3738-2, and/or a mantel line object 3738-3.

According to some embodiments, the original framework 3730 may be tied and/or related to the enhanced framework 3730-1 via one or more constraints. The original framework 3730 (and/or underlying data) may, in some embodiments, be utilized to define a group-orient constraint to describe the orientation of the curve group. The group-orient constraint may, for example, be represented by a group-orient constraint object 3760-10 within the enhanced framework 3730-1. In some embodiments, the individual parts of the original framework 3730 and/or the component parts of the enhanced framework 3730-1 may be related to the orientation of the group via part-of-group constraints. The part-of-group constraints may, for example, be represented by part-of-group constraint objects 3760-11 within the enhanced framework 3730-1.

Figure 38:
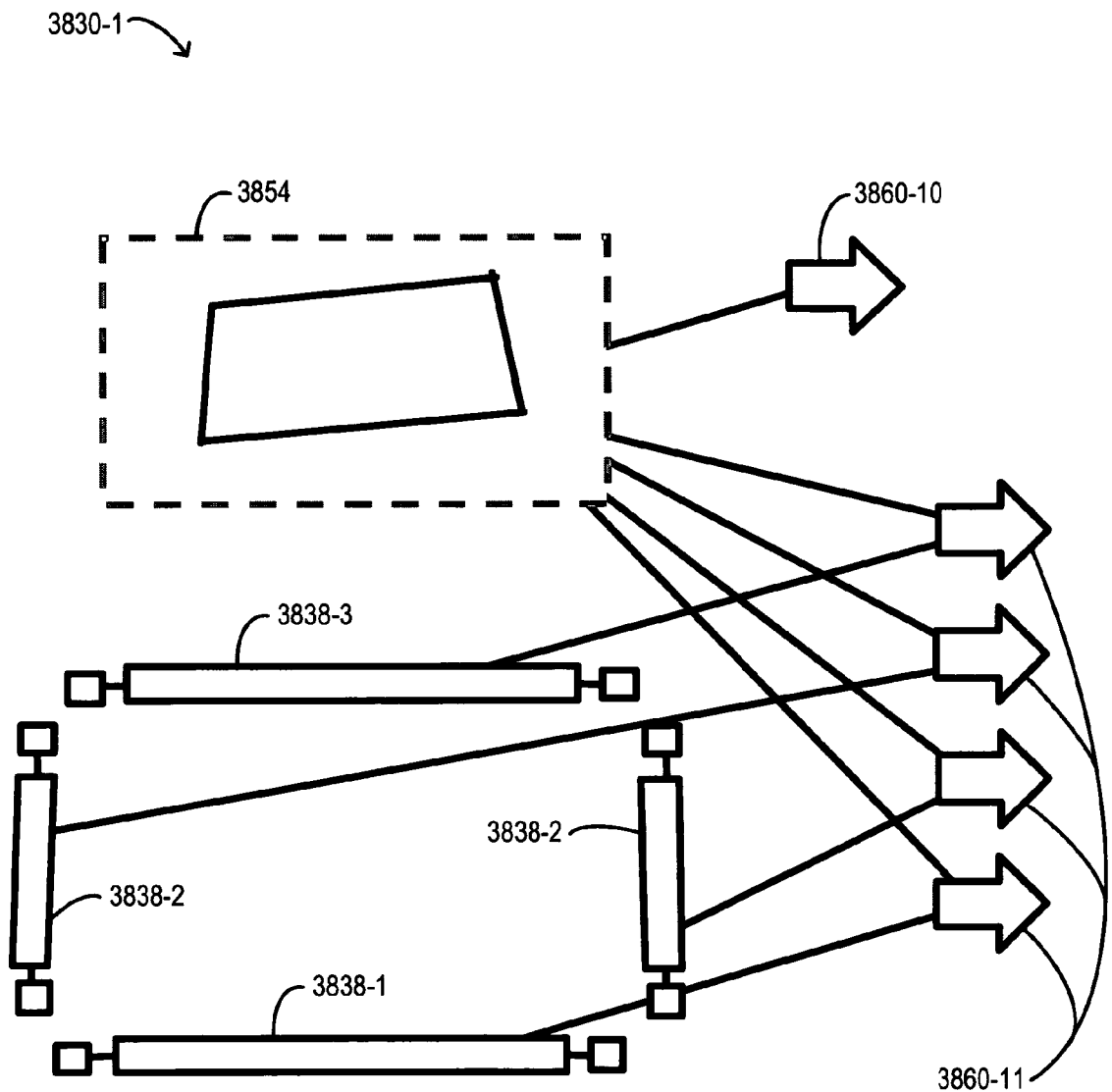
FIG. 38 is a diagram of an enhanced graphical framework according to some embodiments.

Turning to FIG. 38, a diagram of an enhanced graphical framework 3830-1 according to some embodiments is shown. The enhanced graphical framework 3830-1 may, for example, be associated with the system 100 and/or with any of the methods 200, 300, 400, 500, 710, 910, 1310, 1720, 1824, 2630, 2732 described herein. In some embodiments, the enhanced graphical framework 3830-1 may be implemented with respect to the exemplary drawings 600, 2800 to produce a three-dimensional sketch. According to some embodiments, the enhanced graphical framework 3830-1 may be an exemplary implementation of the method 2630 described in conjunction with FIG. 26. The enhanced graphical framework 3830-1 may, for example, be associated with defining constraints at 2632.

In some embodiments, the enhanced framework 3830-1 may be associated with the enhanced framework 3730-1 describe in conjunction with FIG. 37. The enhanced framework 3830-1 may, for example represent a straight line group such as a rectangle group associated with the component parts of the curve and/or arch group assigned to the exemplary spine line. The enhanced framework 3830-1 may, according to some embodiments, comprise a straight line group object 3854, a base line object 3838-1, wand line objects 3838-2, and/or a mantel line object 3838-3. In some embodiments, the component parts assigned to the straight line group may be utilized to define the orientation (and/or other characteristics) of the rectangle group. A group-orient constraint object 3860-10 may, for example, be added to the enhanced framework 3830-1 to signify the group-orient constraint. In some embodiments, the component parts may then, for example, be related to the rectangle group via part-of-group-constraints. One or more part-of group-constraint objects 3860-11 may, for example, be added to the enhanced framework 3830-1 to represent such constraints.

Figure 39:
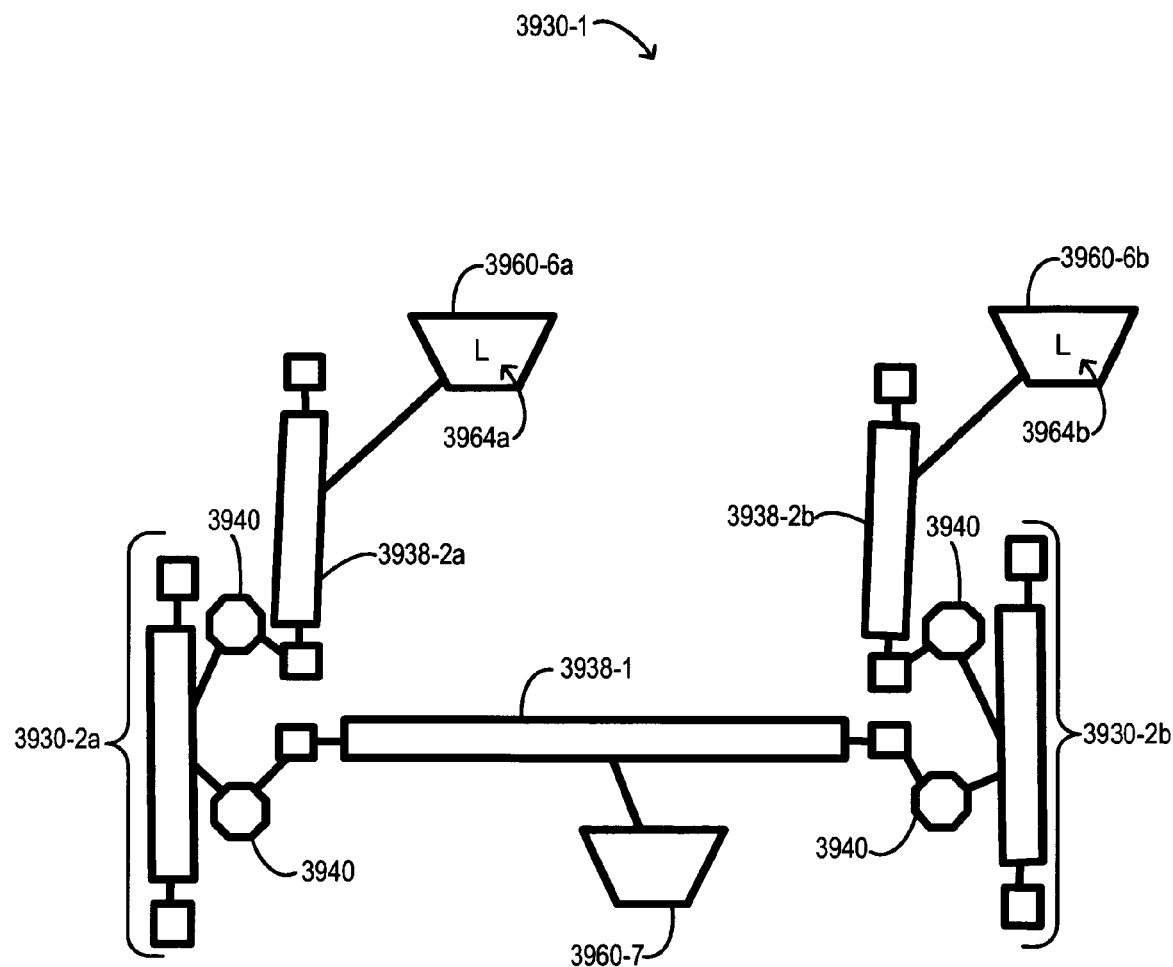
FIG. 39 is a diagram of an enhanced graphical framework according to some embodiments.

Turning to FIG. 39, a diagram of an enhanced graphical framework 3930-1 according to some embodiments is shown. The enhanced graphical framework 3930-1 may, for example, be associated with the system 100 and/or with any of the methods 200, 300, 400, 500, 710, 910, 1310, 1720, 1824, 2630, 2732 described herein. In some embodiments, the enhanced graphical framework 3930-1 may be implemented with respect to the exemplary drawings 600, 2800 to produce a three-dimensional sketch. According to some embodiments, the enhanced graphical framework 3930-1 may be an exemplary implementation of the method 2630 described in conjunction with FIG. 26. The enhanced graphical framework 3930-1 may, for example, be associated with defining constraints at 2632.

In some embodiments, constraints may also or alternatively be added and/or defined to represent the relationships between newly drawn objects and existing objects. The enhanced framework 3930-1 may, for example, represent the relationships between component lines added to define the exemplary spine line. A base line object 3938-1, wand line objects 3938-2, and the endpoint objects 3932 associated therewith may, for example, be used to represent the component lines that intersect with existing drawing objects. According to some embodiments, the base line object 3938-1 and the wand line objects 3938-2 may, for example, intersect the left and right edges of the existing table object 680, 2880 shown in any of FIG. 6 and/or FIG. 28.

In some embodiments, the intersected parts of the existing table object may be represented by existing object frameworks 3930-2a, 3930-2b. According to some embodiments, point-to-part join objects 3940 may also or alternatively be included in the enhanced framework 3930-1 to signify the intersections and/or connections between the component lines and the parts of the existing drawing. In some embodiments, the connections may be utilized to define one or more constraints associated with the component lines. The base line object 3938-1 may, for example, be assigned a fixed-line constraint since both of its ends are attached to existing objects (e.g., the left and right sides of the existing table). The fixed-line constraint may, according to some embodiments, be represented in the enhanced framework 3930-1 by a fixed-line constraint object 3960-7.

According to some embodiments, the wand line objects 3938-2 may also or alternatively be related to the existing parts. The left wand line object 3938-2a may, for example be determined to be connected on one end to the existing left side of the table and may appear substantially perpendicular to the left side of the table. In some embodiments, a rung-direction constraint may be defined to describe this relationship. A first rung-direction constraint object 3960-6a may, for example, be included within the enhanced framework to signify the constraint. According to some embodiments, the first rung-direction constraint object 3960-6a may comprise a first constraint attribute indicator 3964a. The first constraint attribute indicator 3964a may, for example, contain a value of "L", representing the perpendicular nature of the rung-direction constraint.

In some embodiments, the second wand line object 3938-2b may also be connected on one end to an existing object (e.g., the right side of the existing table) and may appear to be substantially perpendicular to the existing object. A rung-direction constraint may, according to some embodiments, be utilized to describe this relationship as well. In some embodiments, a second rung-direction constraint object 3960-6b may be included in the enhanced framework 3930-1. The second rung-direction constraints object 396-6b may, for example, comprise a second constraint attribute indicator 3964b having a value of "L". The "L" value may indicate, for example, that the second rung-direction constraint is perpendicular in nature.

Figure 40A:
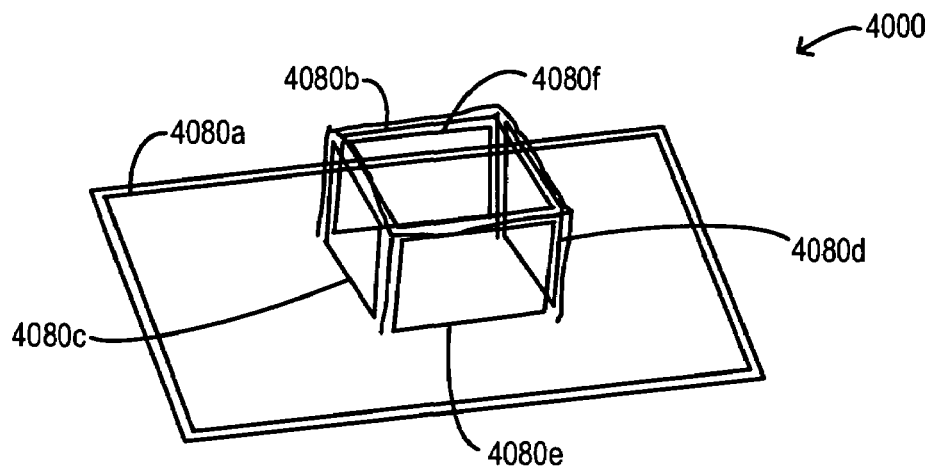
FIG. 40A is a diagram of a drawing according to some embodiments.
Figure 40B:
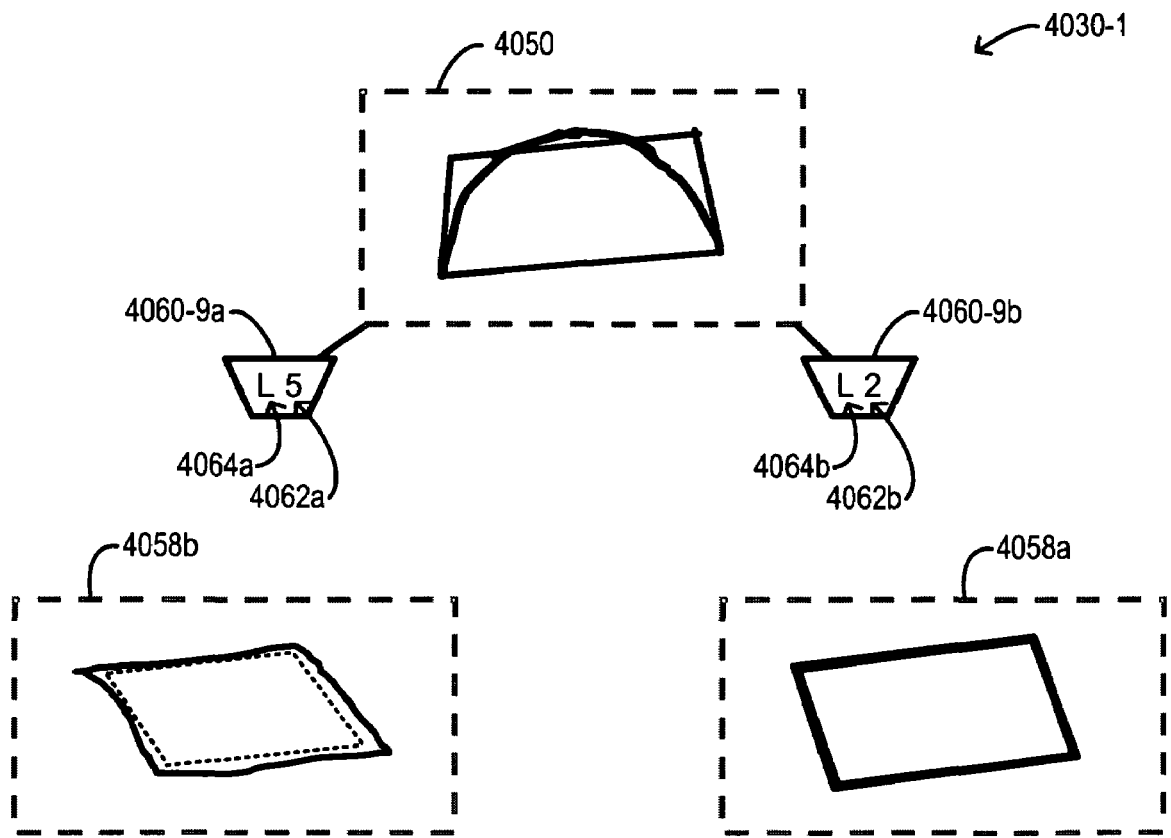
FIG. 40B is a diagram of an enhanced graphical framework according to some embodiments.

Turning to FIG. 40A and FIG. 40B, diagrams of a drawing 4000 and of an enhanced graphical framework 4030-1 according to some embodiments are shown. The drawing 4000 may, for example, be associated with the system 100 and/or with any of the methods 200, 300, 400, 500, 710, 910, 1310, 1720, 1824, 2630, 2732 described herein. In some embodiments, the drawing 4000 may be implemented with respect to the exemplary drawings 600, 2800 to produce a three-dimensional sketch. According to some embodiments, the drawing 4000 may be an exemplary implementation of the method 2630 described in conjunction with FIG. 26. The drawing 4000 may, for example, be associated with defining constraints at 2632. The enhanced graphical framework 4030-1 may, according to some embodiments, represent the objects within the drawing 4000 and/or the relations there between.

In some embodiments, the drawing 4000 may represent the planar objects that already exist in the three-dimensional model in the example including the existing table object 670, 2870. The drawing 4000 may comprise, for example, a ground plane 4080a (e.g., upon which the existing table sits), a top plane 40480b representing the plane of the table top, and/or side, front, and/or back planes 4080c-e representing the vertical planes defined by the existing table. In some embodiments, any or all of these existing planes may define and/or be members of various plane groups. According to some embodiments, these plane groups may be tested against newly drawn lines to infer relationships between the newly drawn lines and the existing planes 4080a-e.

In FIG. 40B, for example, the enhanced framework 4030-1 may represent the exemplary spine line 1420, 1620d, 2220, 2520, 2820 and/or data associated therewith. The enhanced framework 4030-1 may, for example, comprise a curve group object 4050 representing the exemplary spine line and/or the curve group (such as an arch group) with which the exemplary spine line is determined to be associated with. In some embodiments, the curve group object 4050 may be tested against the existing plane objects 4080*a-f* to determine if relationships exist. According to some embodiments, the existing plane objects 4080*a-f* may be represented by one or more plane group objects 4058*a-b*. A first plane group object 4058*a* may, for example, represent the existing ground plane 4080*a*, and/or a second plane group object 4058*b* may represent the existing table top plane 4080*f*. In some embodiments, the curve group and/or the curve group object 4050 may be tested against the plane group objects 4058*a-b*.

The curve group object 4050 may, for example, be determined to be perpendicular to the ground plane group object 4058*a* and the table top plane group object 4058*b*. In some embodiments, plane-direction constraint objects 4060-9*a*, 4060-9*b* may be added to the enhanced framework 4030-1 to represent these relationships. The plane-direction constraint objects 4060-9*a*, 4060-9*b* may, according to some embodiments, comprise constraint strength indicators 4062*a-b* and/or constraint attribute indicators 4064*a-b*. The constraint strength indicators 4062*a-b* may indicate that the first plane-direction constraint relationship between the curve group and the ground plane is a value of two (e.g., "Orient"), while the second plane-direction constraint relationship between the curve group and the table top plane is a value of five (e.g., "Better"). In other words, the three-dimensional sketching tool may weigh the constraints, indicating which constraints are more likely. In example carried throughout, for example, the arch shape is more likely to be attached to the table top than to the ground plane. According to some embodiments, the plane-direction constraint objects 4060-9*a*, 4060-9*b* may also or alternatively comprise the constraint attribute indicators 4064*a-b*, indicating that the first relationships are perpendicular in nature ("L").

Figure 41:
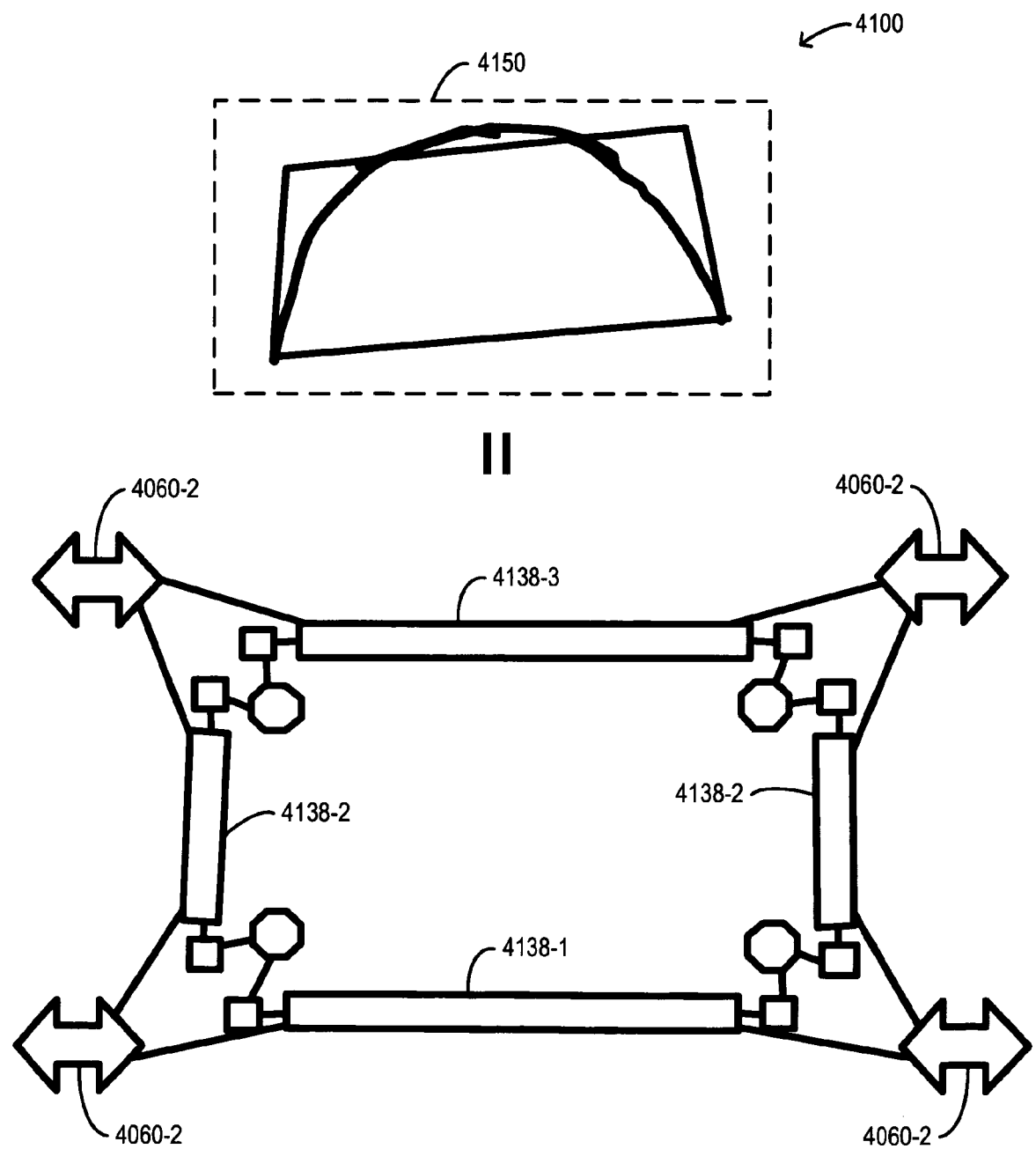
FIG. 41 is a diagram of a graphical analysis method according to some embodiments.

Referring now to FIG. 41, a diagram of a graphical analysis method 4100 according to some embodiments is shown. The graphical analysis method 4100 may, for example, be associated with the system 100 and/or with any of the methods 200, 300, 400, 500, 710, 910, 1310, 1720, 1824, 2630, 2732 described herein. In some embodiments, the graphical analysis method 4100 may be implemented with respect to the exemplary drawings 600, 2800 to produce a three-dimensional sketch. According to some embodiments, the graphical analysis method 4100 may be an exemplary implementation of the method 2630 described in conjunction with FIG. 26. The graphical analysis method 4100 may, for example, be associated with defining constraints at 2632.

The graphical analysis method 4100 may, for example, analyze a curve group that may, for example, represent the exemplary spine line 1420, 1620*d*, 2220, 2520, 2820 described herein. In some embodiments, the graphical analysis method 4100 may apply right-angle constraints to the group components associated with a curve group object 4150. An enhanced framework 4130-1 may, for example, represent the added constraints and the group components. The enhanced framework 4130-1 may, according to some embodiments, comprise a base line object 4138-1, wand line objects 4138-2, and/or a mantel line object 4138-3 to represent the group components associated with the curve group object 4150. According to some embodiments, the enhanced framework 4130-1 may also or alternatively comprise one or more right-angle constraint objects 4060-2 to signify the newly-defined right-angle relationships between the various straight line part component objects 4138-1, 4138-2, 4138-3.

Figure 42:
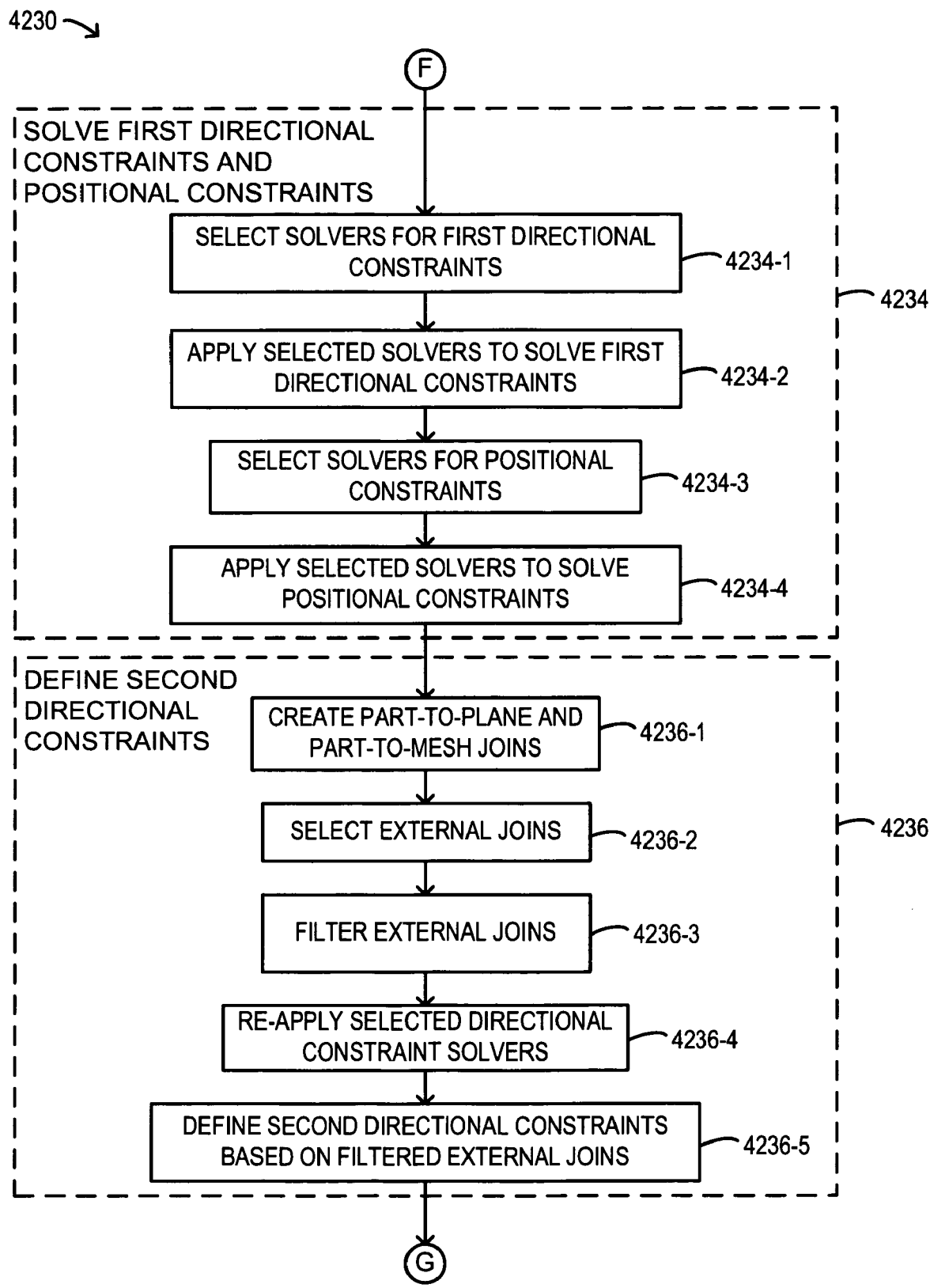
FIG. 42 is a flowchart of a method according to some embodiments.

Referring now to FIG. 42, a flowchart of a method 4230 according to some embodiments is shown. The method 4230 may, in some embodiments, be associated with the system 100 and/or any components thereof and/or may also or alternatively be associated with the methods 200, 300, 400, 500, 710, 910, 1310, 1720, 1824, 2630, 2732 described herein. The method 4230 may, for example, be a portion and/or continuation of the method 400 described in conjunction with FIG. 4. The method 4230 may, for example, be associated with generating and solving constraints at 430. In some embodiments, the method 4230 may also or alternatively be a continuation of the method 2630. The method 4230 may, for example, begin at F, where the method 2630 left off. In some embodiments, the method 4230 may also or alternatively be associated with the exemplary drawings 600, 2800 described in conjunction with any of FIG. 6A, FIG. 6B, and/or FIG. 28 herein.

In some embodiments, the method 4230 may begin at 4234 to solve first directional and positional constraints. The solving of the constraints 4234 may, for example, proceed to select solvers for the first directional constraints, at 4234-1. In some embodiments, each constraint may be associated with a "solver" which may, for example, comprise one or more formulas, expressions, and/or functions that store, calculate, and/or otherwise determine various values associated with the constraint. According to some embodiments, solvers associated with the first directional constraints (e.g., determined at 2632-2) may be selected, identified, and/or otherwise determined. The solving of the constraints 4234 may continue, according to some embodiments, to apply the selected solvers to solve the first directional constraints, at 4234-2. Any solvers selected at 4234-1 may, for example, be activated, run, and/or otherwise applied to process information associated with the first directional constraints. At 4234-3, the solving of the constraints 4234 may continue, for example, to select solvers for the positional constraints. The selected solvers may then, according to some embodiments, be applied at 4234-4.

According to some embodiments, the method 4230 may continue to define second directional constraints at 4236. Second directional constraints may be defined, for example, once the first directional constraints and positional constraints have been solved. In some embodiments, the solving of the first directional constraints and the positional constraints may, for example, reveal potential second directional constraints (e.g., that may not have been recognizable prior to the initial solving). According to some embodiments, the first directional constraints may also or alternatively be re-analyzed to determine and/or define the second directional constraints. In some embodiments, the defining of the second directional constraints 4236 may begin at 4236-1 to create part-to-plane and part-to-mesh joins. Any spine line parts defined and/or solved may, for example, be compared to existing planes and/or meshes to determine if joins are likely and/or appropriate. The defining of the second directional constraints 4236 may continue, for example, to select external joins at 4236-2. In some embodiments, some or all of the external joins may comprise joins between spine lines (e.g., representing newly-added lines) and any existing graphical objects (e.g., planes, parts, and/or meshes) within the existing three-dimensional model.

According to some embodiments, the defining of the second directional constraints 4236 may continue to filter the external joins at 4236-3. Any external joins determined to be redundant, circular, and/or otherwise unnecessary may, for example, be removed and/or deleted. The defining of the second directional constraints 4236 may continue, according to some embodiments, to re-apply the selected directional constraint solvers at 4236-4. The same directional constraint solvers utilized to solve the first directional constraints may, for example, be re-applied to determine new values for attributes associated with the constraints. In some embodiments, such as in the case that the second directional constraints comprise entirely new constraints, new solvers may also or alternatively be selected and/or applied to solve the second directional constraints. According to some embodiments, the defining 4236 may continue at 4236-5 to define the second directional constraints based at least upon the filtered external joins. The second directional constraints may, for example, be defined based at least in part on the re-applied (and/or newly applied) solvers. In some embodiments, the method 4230 may then continue and/or end at G.

Figure 43:
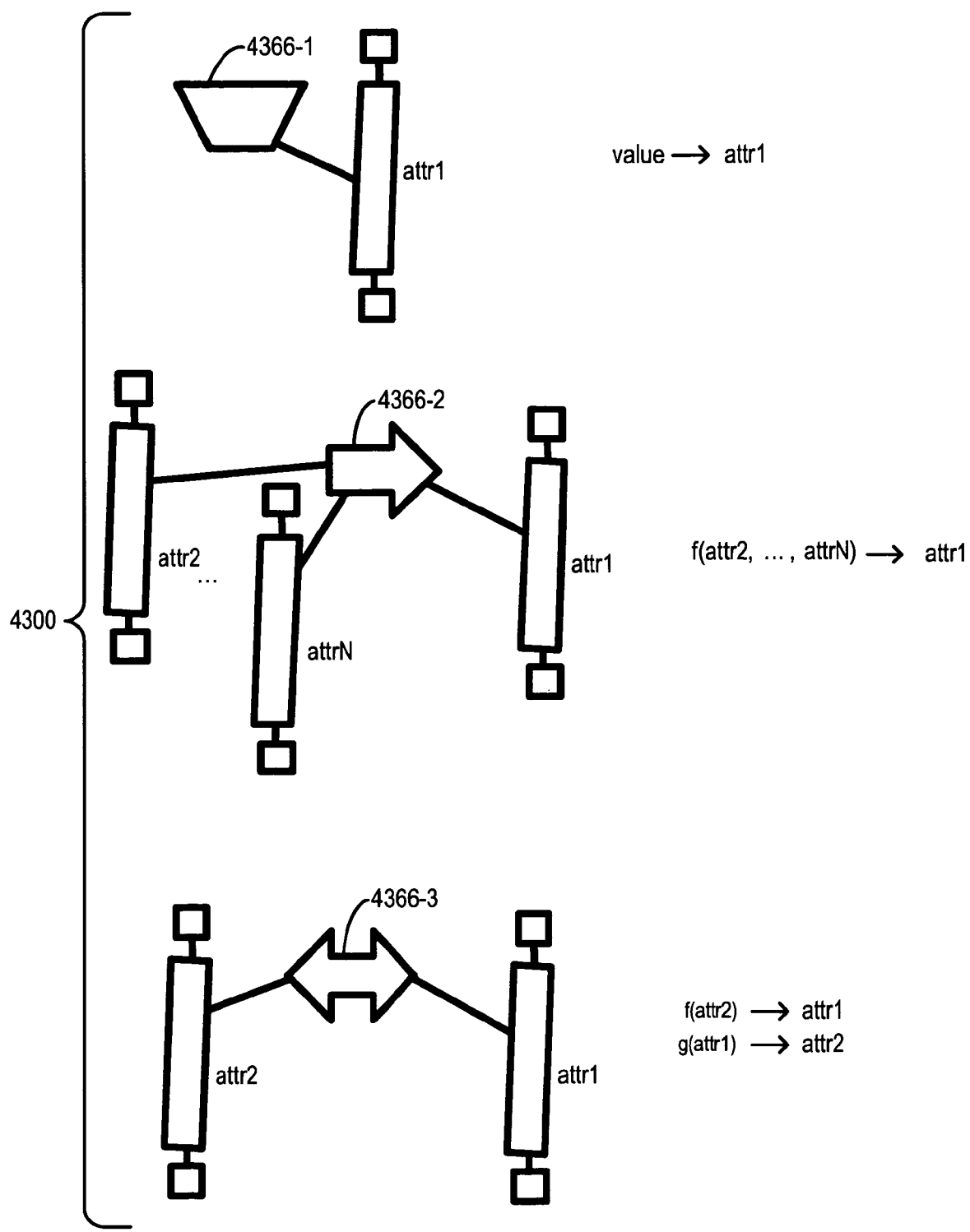
FIG. 43 is a diagram of a graphical analysis method according to some embodiments.

Referring now to FIG. 43, a diagram of a graphical analysis method 4300 according to some embodiments is shown. The graphical analysis method 4300 may, for example, be associated with the system 100 and/or with any of the methods 200, 300, 400, 500, 710, 910, 1310, 1720, 1824, 2630, 2732, 4230 described herein. In some embodiments, the graphical analysis method 4300 may be implemented with respect to the exemplary drawings 600, 2800 to produce a three-dimensional sketch. According to some embodiments, the graphical analysis method 4300 may be an exemplary implementation of the method 4230 described in conjunction with FIG. 42. The graphical analysis method 4300 may, for example, be associated with solving constraints at 4234.

The graphical analysis method 4300 may, for example, describe various types of constraint solvers. The solvers are shown in FIG. 43 in graphical framework notation for ease of explanation. The solvers may also or alternatively be described by and/or associated with various functions, expressions, and/or formulas. In some embodiments, fewer or more types of solvers than are shown in FIG. 43 may be included within the graphical analysis method 4300. In some embodiments, three types of solvers (e.g., as shown in FIG. 43) may exist. A unary constraint solver 4366-1 may, for example, simply store a value in a target attribute. The unary constraint solver 4366-1 may, for example, define a value for a first attribute such as "attr1".

In some embodiments, a one-way constraint solver 4366-2 may compute a value to store in a target attribute. The one-way constraint solver 4366-2 may, for example, be a function of various attribute values (e.g., "attr2" and/or "attrN") that defines a value for an attribute such as "attr1". In such a manner, for example, multiple attributes and/or characteristics may be utilized to define a single attribute and/or value thereof. According to some embodiments, binary constraint solvers 4366-3 may also or alternatively exist. Binary constraint solvers 4366-3 may, for example, comprise a reversible pair of solvers. A first function may, in some embodiments, define a value of a first attribute (e.g., "attr1") based on the value of a second attribute (e.g., "attr2"), while a second function may define the value of the second attribute (e.g., "attr2") based on the value of the first attribute (e.g., "attr1").

Figure 44:
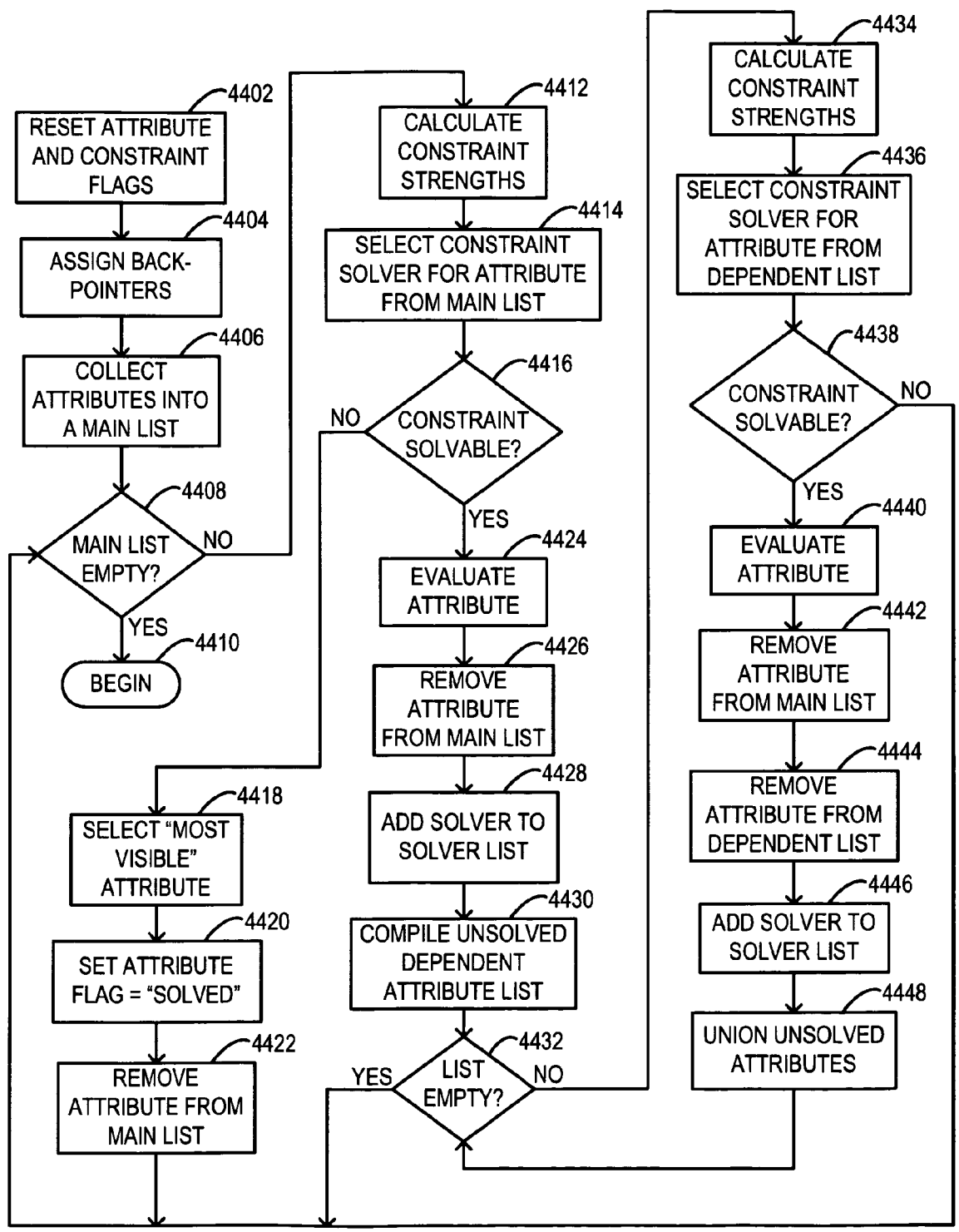
FIG. 44 is a flowchart of a method according to some embodiments.

Turning to FIG. 44, a flowchart of a method 4400 according to some embodiments is shown. The method 4400 may, in some embodiments, be associated with the system 100 and/or any components thereof and/or may also or alternatively be associated with the methods 200, 300, 400, 500, 710, 910, 1310, 1720, 1824, 2630, 2732, 4230 described herein. The method 4400 may, for example, be a portion and/or continuation of the method 4230 described in conjunction with FIG. 42. The method 4400 may, for example, be associated with selecting constraint solvers at 44234-1 and/or 4234-3. In some embodiments, the method 4400 may also or alternatively be associated with the exemplary drawings 600, 2800 described in conjunction with any of FIG. 6A, FIG. 6B, and/or FIG. 28 herein.

In some embodiments, the method 4400 may begin to reset attribute and constraint flags at 4402. According to some embodiments, the method 4400 may continue to assign back-pointers at 4404. Every attribute may, for example, be assigned one or more back-pointers associating the attribute with constraints that may effect the value of the attribute. Back-pointers may, for example, be pointers utilized by constraints to refer to associated dependent values. The method 4400 may continue to collect attributes into a main list at 4406, according to some embodiments. All attributes may, for example, be compiled into a single list. In some embodiments, the method 4400 may continue to determine if the main list is empty, at 4408. In the case that the main list is empty, for example, the method 4400 may simply end at 4410. In the case that the main list of attributes is not empty, the method 4400 may, for example, proceed to calculate constraint strengths at 4412. In some embodiments, the constraint strengths may be similar to the constraint strengths described in conjunction with the graphical framework 3430 and/or the constraint strength indicator 3462, 3562a-b, 4062a-b. The current strength of all constraints associated with an attribute may, for example, be determined.

According to some embodiments, the method 4400 may continue to select a constraint solver for an attribute from the main list, at 4414. Each attribute from the main list may, for example, be analyzed to determine the best available and/or possible solver that may be related to the constraints associated with the attribute. According to some embodiments, the solver associated with the highest strength constraint for the attribute may be chosen. In some embodiments, the method 4400 may continue to determine if a solvable constraint exists, at 4416. In the case that the selected solver and/or solvers can not yield an acceptable result for a constraint, for example, no solvable constraint may exist. According to some embodiments, some constraints may be solvable while others may not. In some embodiments, if no solvable constraint exists, the method 4400 may continue to select the "most visible" constraint at 4418. Of all the non-solvable constraints associated with an attribute, for example, the constraint that is most easily graphically discernable and/or the "biggest" constraint may be chosen. According to some embodiments, the method 4400 may then continue to set the attribute flag to "solved", at 4420. The "most visible" constraint may be utilized, for example, to force an emulated solved state for the attribute. At 4422, the attribute may then be removed from the main list. The method 4400 may then proceed back to 4408, for example, to determine if any more attributes reside within the main list.

According to some embodiments, in the case that a solvable constraint is determined to exist at 4416, the method 4400 may continue to evaluate the attribute at 4424. The solver related to the solvable constraint may, for example, be used to determine and/or compute a value for the attribute. The method 4400 may then, for example, continue to remove the attribute from the main list at 4426. In some embodiments, the method 4400 may continue to add the solver to a solver list at 4428. The method 4400 may then, for example, compile any unsolved dependent attributes into a dependent attribute list at 4430. Any attributes that depend upon and/or are affected by the value of the attribute just solved (e.g., at 4424) may, for example, be compiled into a list. The method 4400 may, according to some embodiments, continue to determine if the dependent attribute list is empty, at 4432. In the case that the dependent attribute list is empty, the method 4400 may proceed back to 4408 to determine if any other attributes remain to be solved.

In some embodiments, if the dependent attribute list is not empty, the method 4400 may continue to calculate constraint strengths at 4434. All constraints associated with a dependent attribute from the list may, for example, be evaluated for strength. According to some embodiments, the calculation at 4434 may be similar to the calculation performed at 4412. In some embodiments, the method 4400 may continue to select a constraint solver for an attribute from the dependent attribute list, at 4436. According to some embodiments, the best solver available for a dependent attribute may be selected. The selection at 4436 may, for example, be similar to the selection at 4414. In some embodiments, the method 4400 may continue to determine if a solvable constraint exists for the dependent attribute at 4438. According to some embodiments, the determination at 4438 may be similar to the determination at 4416. If no solvable constraint exists for the dependent attribute, for example, the method 4400 may proceed back to 4408 to determine if other attributes remain to be solved.

In some embodiments, if a solvable constraint does exist for the dependent attribute, the method 4400 may continue to evaluate the attribute at 4440. The solver associated with the solvable constraint may, for example, be applied to determine a value of the dependent attribute. In some embodiments, the evaluation at 4440 may be similar to the evaluation at 4424. According to some embodiments, the method 4400 may continue to remove the dependent attribute from the main list at 4442. The method 4400 may also or alternatively continue to remove the dependent attribute from the dependent attribute list, at 4444. In some embodiments, the method 4400 may then continue to add the solver to the solver list at 4446. According to some embodiments, the method 4400 may union unsolved attributes at 4448. Any attributes that depend upon and/or are affected by the solved dependent attribute may, for example, be added to the dependent attribute list. In some embodiments, the method 4400 may then proceed back to 4432 to determine if any dependent attributes remain to be solved.

Figure 45A:
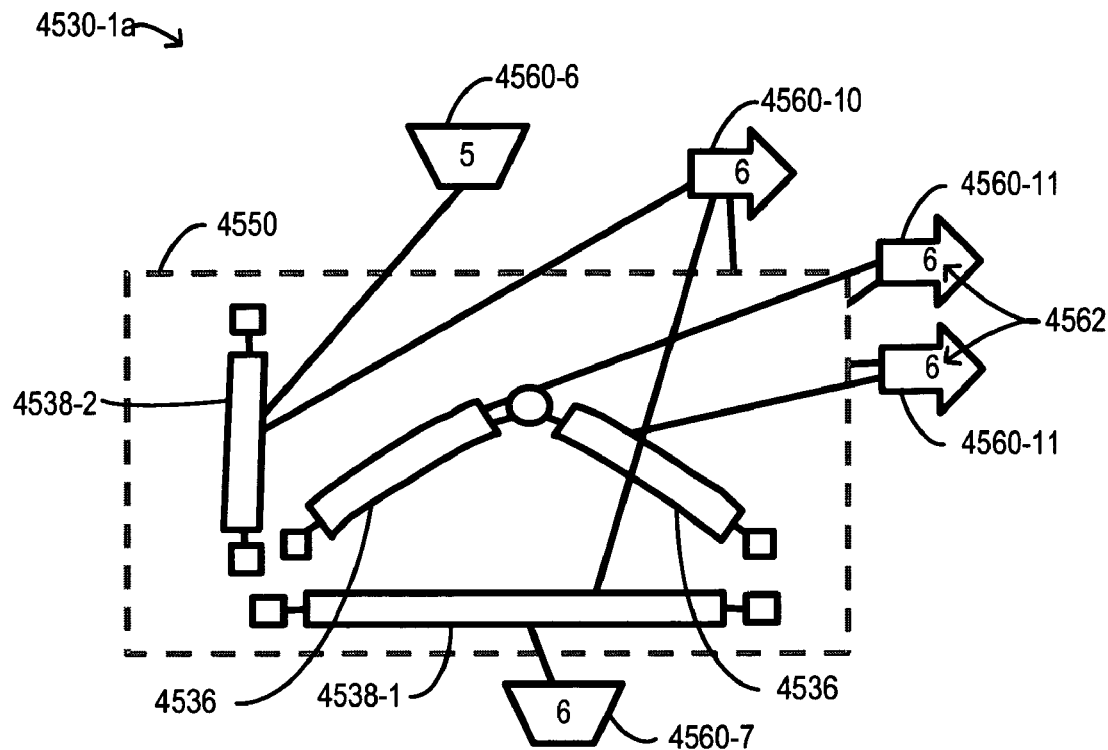
FIGS. 45A & 45B are diagrams of enhanced graphical frameworks according to some embodiments.
Figure 45B:
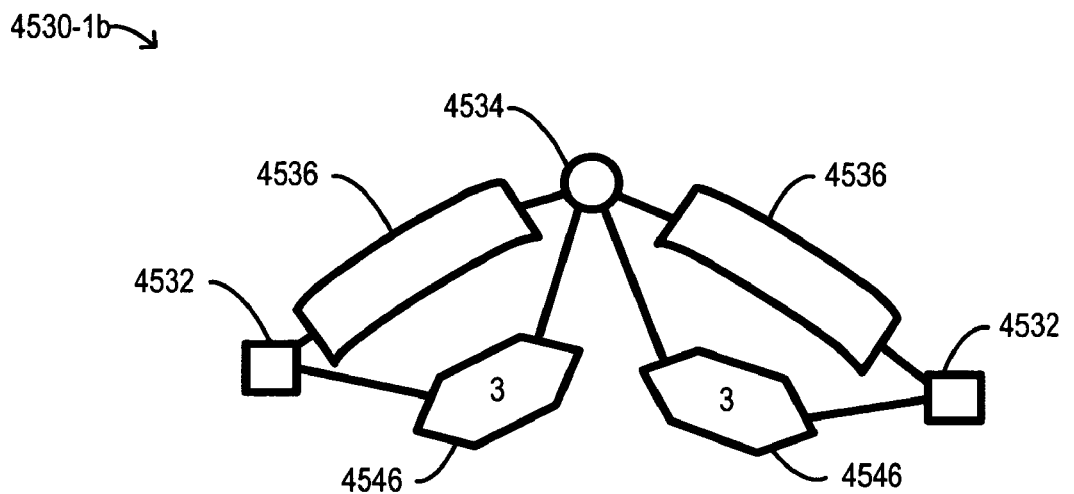

Referring to FIG. 45A and FIG. 45B, diagrams of enhanced graphical frameworks 4530-1a, 4530-1b according to some embodiments are shown. The enhanced graphical frameworks 4530-1a, 4530-1b may, for example, be associated with the system 100 and/or with any of the methods 200, 300, 400, 500, 710, 910, 1310, 1720, 1824, 2630, 2732, 4230, 4400 described herein. In some embodiments, the enhanced graphical frameworks 4530-1a, 4530-1b may be implemented with respect to the exemplary drawings 600, 2800 to produce a three-dimensional sketch. According to some embodiments, the enhanced graphical frameworks 4530-1a, 4530-1b may describe exemplary implementations of the method 4230 described in conjunction with FIG. 42. The enhanced graphical frameworks 4530-1a, 4530-1b may, for example, be associated with solving constraints at 4234.

The first enhanced graphical framework 4530-1a shown in FIG. 45A may, according to some embodiments, represent various constraints associated with the exemplary spine lines 1420, 1620d, 2220, 2520, 2820 described herein. The first enhanced graphical framework 4530-1a may, for example, comprise two curve part objects 4536 to represent the arched line drawn by the user. In some embodiments, the curve part objects 4536 may be part of a curve group such as an arch group that may, for example, be represented by a curve group object 4550. According to some embodiments, part-of-group constraint objects 4560-11 may represent the relationship between the curve part objects 4536 and the curve group object 4550. As shown in FIG. 45A, the part-of-group constraint objects 4560-11 may be identified by single block arrows representing that the part-of-group constraints are associated with one-way constraint solvers. The part-of-group constraint objects 4560-11 may also or alternatively comprise constraint strength indicators 4562 that may, for example, indicate that the part-of-group constraints are a strength of six (e.g., "Essential").

In some embodiments, the first enhanced graphical framework 4530-1a may also or alternatively comprise a base line object 4538-1 and/or a wand line object 4538-2 representing component parts of the curve group. Both of the component part objects 4538-1, 4538-2 may, according to some embodiments, be associated via a group-orient constraint to the curve group. A group-orient constraint object 4560-10 may, for example, represent such a relationship. In some embodiments, the group-orient constraint object 4560-10 may comprise a constraint strength indicator 4562 indicating that the one-way constraint (e.g., indicated by the single block arrow) is a strength of six (e.g., "Essential").

The base line object 4538-1 may also or alternatively be defined by a fixed-line constraint due to the fact that the base line runs between the two curve parts of the user's lines. This relationship may, for example, be signified by a fixed-line constraint object 4560-7 having a strength of six (e.g., "Essential"). The wand line object 4538-2 may also or alternatively be defined by a rung-direction constraint due to the fact that the wand line intersects the user's arch on one side and protrudes outwardly from that point. This relationship may, for example, be represented by a rung-direction constraint object 4560-6 having a strength of five (e.g., "Better"). In some embodiments, the fixed-line constraint object 4560-7 and/or the rung-direction constraint object 4560-6 may be represented by trapezoidal blocks indicating that the constraints are unary in nature.

The second enhanced graphical framework 4530-1b may, according to some embodiments, comprise endpoint objects 4532, curve part objects 4536, and/or a midpoint object 4534 representing the user's arch-shaped input. The second enhanced graphical framework 4530-1b may also or alternatively comprise end-of-part join objects 4546 representing positional constraints of the ends of the user's arch-shaped input. The end-of-part join objects 4546 may, for example, be associated with constraint strengths of three (e.g., "Okay") indicating the likelihood of the positional constraints associated with the ends of the arch shape.

In some embodiments, the enhanced graphical frameworks 4530-1 may be produced and/or processed as a result of the method 4400 and/or may otherwise be related to the various constraints and procedures described herein. According to some embodiments for example, applying the constraint-solving algorithm of method 4400 to the enhanced graphical frameworks 4530-1, the main list of attributes may include vectors of the two curve part object 4536, the four generated line parts 4538-1, 4538-2 (and two line part objects not shown in FIG. 45A or FIG. 45B), a rectangle group object (not shown in FIG. 45A or FIG. 45B), and the arch curve group object 4550.

Of the constraints available to each attribute, the one with highest strength may, according to some embodiments, be the fixed-line constraint object 4560-7 attached to the base line object 4538-1 whose strength is "Essential". Attributes that depend on the base line's solver may, in some embodiments, be vectors of the left and right wand lines (of which the left wand line object 4538-2 is shown). The best solver for these items may, for example, be in the rung-direction constraint object 4560-6 attached to the left wand line object 4538-2 whose strength is "Better." The mantel line (not shown), arch curve group object 4550, and rectangle group (also not shown) now may depend, for example, on the left wand line object 4538-2 and may be added to the dependent list. According to some embodiments, the two groups became solvable once two non-parallel lines within them become solved. Out of these attributes the best solver may, for example, be in the group-orient constraint object 4560-10 of the arch curve group object 4550, whose strength is "Essential." Once the vector of the arch curve object 4550 becomes solved, all the remaining parts become dependent on the arch curve object 4550 via their part-of-group constraints 4560-11 whose strength are "Essential."

A similar process may produce the positional solvers of FIG. 44B. The first check for solvable constraints may force the system to arbitrarily pick a starting point, according to some embodiments. Assuming that point one is picked as a starting point, for example, the solvers in the end-of-part constraint objects 4546 may be selected to solve for the next points in the chain (e.g., first point two, and then point three).

Figure 46A:
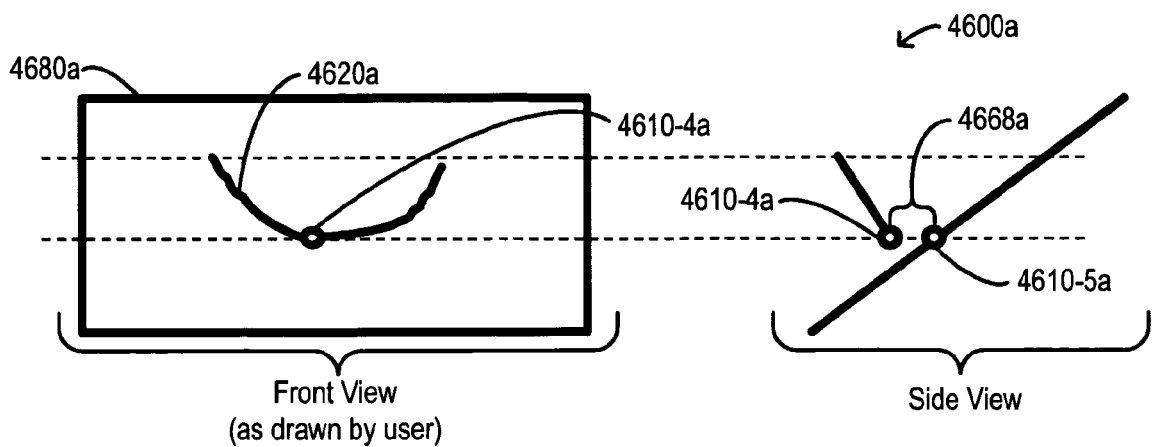
FIGS. 46A & 46B are diagrams of drawings according to some embodiments.
Figure 46B:
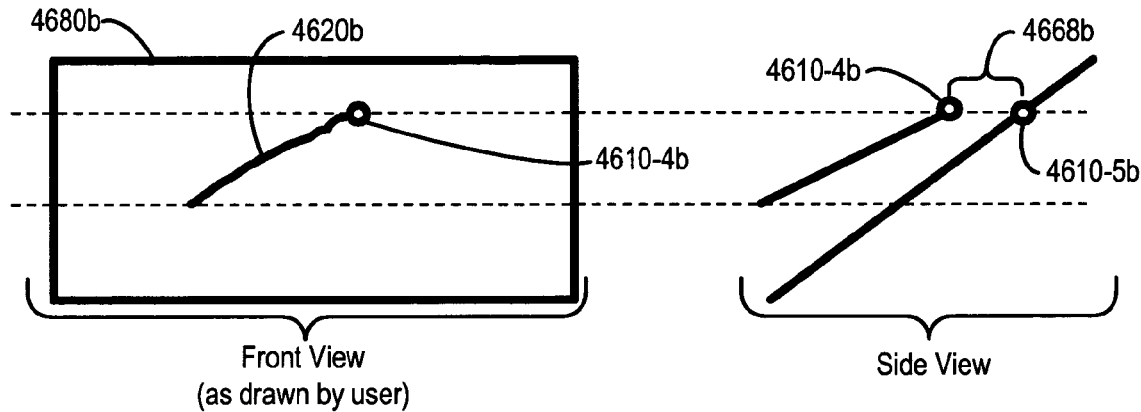
Figure 46C:
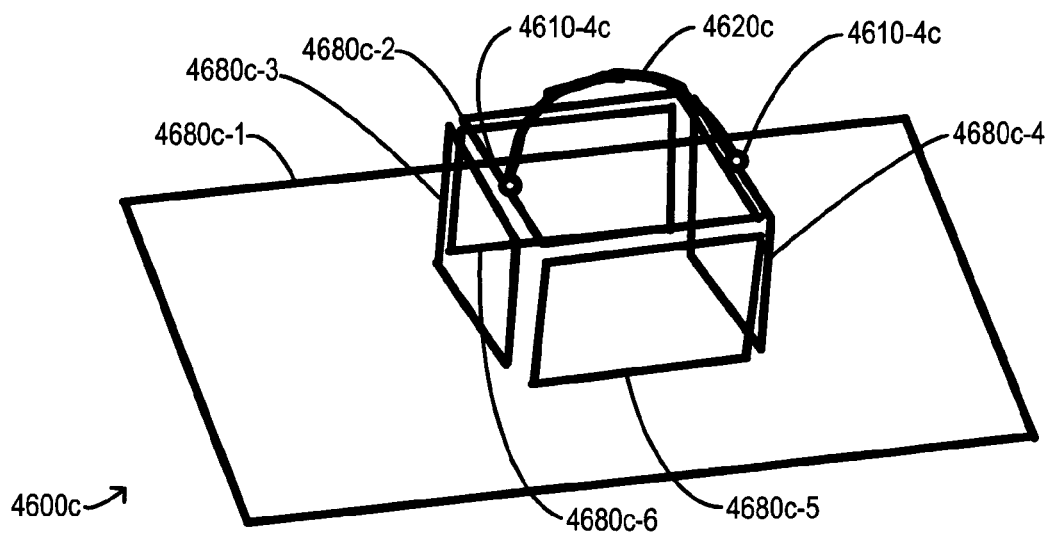
FIG. 46C is a diagram of an exemplary drawing according to some embodiments.

Turning to FIG. 46A, FIG. 46B, and FIG. 46C, diagrams of drawings 4600a-b and an exemplary drawing 4600c according to some embodiments are shown. The drawings 4600a-c and/or the exemplary drawing 4600c may, for example, be associated with the system 100 and/or with any of the methods 200, 300, 400, 500, 710, 910, 1310, 1720, 1824, 2630, 2732, 4230, 4400 described herein. In some embodiments, the drawings 4600a-c and/or the exemplary drawing 4600c may be implemented with respect to and/or be similar to the exemplary drawings 600, 2800 to produce a three-dimensional sketch. According to some embodiments, the drawings 4600a-c and/or the exemplary drawing 4600c may be exemplary implementations of the method 4230 described in conjunction with FIG. 42. The drawings 4600a-c and/or the exemplary drawing 4600c may, for example, be associated with creating part-to-plane and/or part-to-mesh joins at 4236-1.

In some embodiments, the first drawing 4000a may comprise a front view and a side view of a first spine line 4620a associated with input from a user. The front view may, according to some embodiments, represent the view in which the user has provided the input. The first spine line 4620a may, for example, be drawn and/or situated over and/or on a first existing plane object 4680a. In some embodiments, a central, lower, and/or interior spine line point 4610-4a may be utilized to determine the relationship and/or expected relationship between the first spine line 4620a and the first existing plane object 4680a. For example, the interior point 4620a may be determined to be the closest point to the first existing plane object 4680a. As shown in the side view, for example, the interior point 4610-4a may be separated by a first gap 4668a from the first nearest plane point 4610-5a. The first gap 4668a may, according to some embodiments, be determined to be the smallest gap between the first spine line 4620a and the first existing plane object 4680a. In such a manner, for example, the position of the first spine line 4620a in the third dimension (e.g., shown in the side view) may be at least partially inferred.

The second drawing 4600b may also comprise a front view and a side view of a second spine line 4620b over a second existing plane object 4680b. In some embodiments, an exterior and/or upper second spine line point 4610-4b may be determined to be closest to the second existing plane object 4680b. As shown in the side view, for example, the upper second spine line point 4610-4b may be separated by a second gap 4668b from the nearest second plane point 4610-5b. In some embodiments, the second gap 4668b may be determined to be the smallest gap between the second spine line 4620b and the second existing plane object 4680b. In such a manner, for example, the position of the second spine line 4620b in the third dimension (e.g., shown in the side view) may be at least partially inferred.

The exemplary drawing 4600c may, according to some embodiments, be similar to the exemplary drawings 600, 2800 described herein. The exemplary drawing 4600c may, for example, comprise an exemplary spine line 4620c having two spine line endpoints 4610-4c. In some embodiments, the exemplary spine line 4620c may overlap an existing ground plane object 4680-c1, an existing table top plane object 4680c-2, an existing left side of table plane object 4680c-3, an existing right side of table plane object 4680c-4, an existing front of table plane object 4680c-5, and/or an existing rear of table plane object 4680c-6. According t some embodiments, the spine line endpoints 4610-4c may be considered to be the "closest" points on the exemplary spine line 4620c. Because the existing table top plane object 4680c-2 may already be known and/or identified as the "closest" plane object, the exemplary spine line 4620c may be determined to intersect with the existing table top plane object 4680c-2.

Figure 47A:
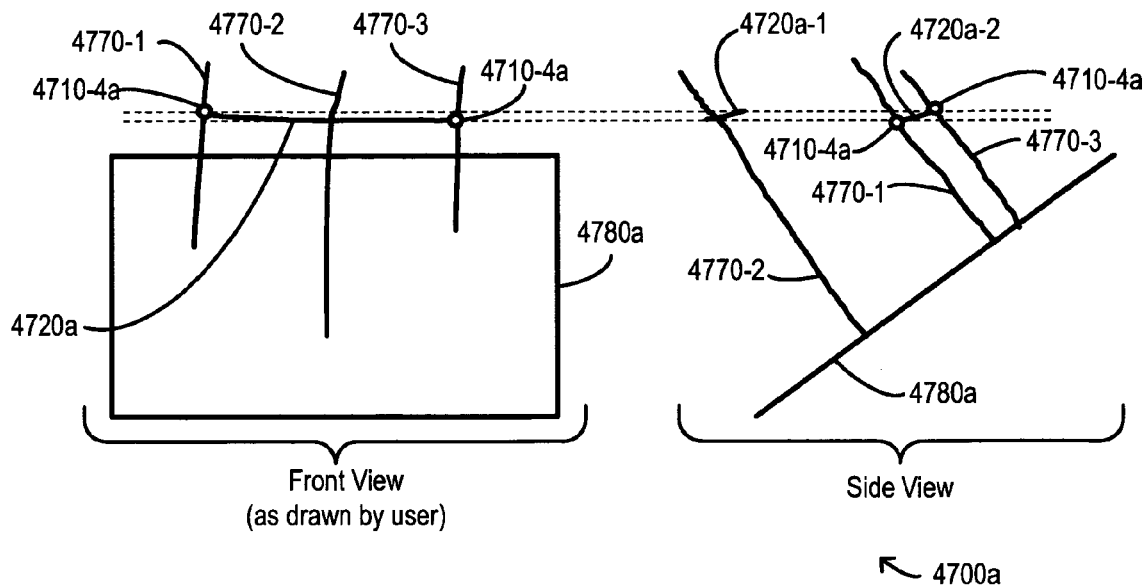
FIG. 47A is a diagram of a drawing according to some embodiments.
Figure 47B:
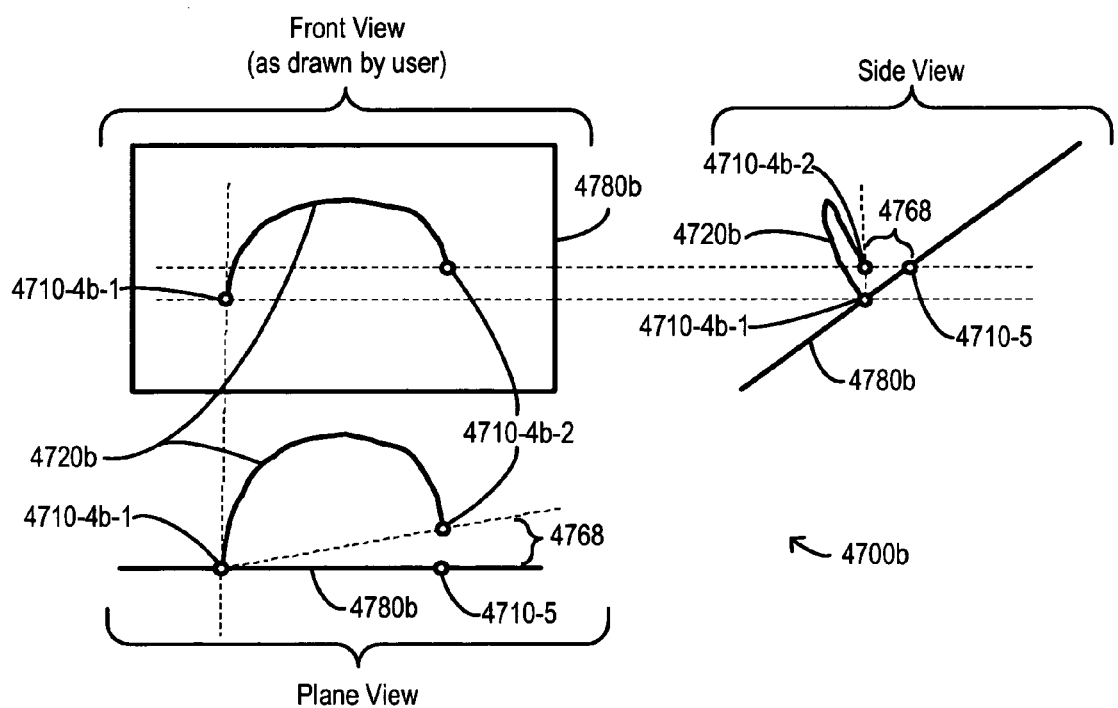
FIG. 47B is a diagram of an exemplary drawing according to some embodiments.

Referring to FIG. 47A and FIG. 47B, diagrams of a drawing 4700a and an exemplary drawing 4700b according to some embodiments are shown, respectively. The drawing 4700a and/or the exemplary drawing 4700b may, for example, be associated with the system 100 and/or with any of the methods 200, 300, 400, 500, 710, 910, 1310, 1720, 1824, 2630, 2732, 4230, 4400 described herein. In some embodiments, the drawing 4700a and/or the exemplary drawing 4700b may be implemented with respect to and/or be similar to the exemplary drawings 600, 2800, 4600c to produce a three-dimensional sketch. According to some embodiments, the drawing 4700a and/or the exemplary drawing 4700b may be exemplary implementations of the method 4230 described in conjunction with FIG. 42. The drawings 4600a-c and/or the exemplary drawing 4600c may, for example, be associated with selecting external joins at 4236-2 and/or filtering external joins at 4236-3.

According to some embodiments, external joins may be selected to facilitate joining of objects to the existing three-dimensional model. In the case that multiple external joins exist in a drawing, the bottommost external join may be selected to initiate external join selection (e.g., to prevent consecutively selected joins from being negative). According to some embodiments, the drawing 4700a may illustrate an exemplary external join selection procedure. For example, the drawing 4700a may comprise a spine line 4720a having first spine line endpoints 4710-4a. In some embodiments, the drawing 4700a may also or alternatively comprise existing line objects 4770 and/or a first existing plane object 4780a. As shown in FIG. 47A, the existing line objects 4770 may comprise three separate vertical lines 4770-1, 4770-2, 4770-3. The first spine line endpoints 4710-4a may, in some embodiments, coincide with the first and third existing line objects 4770-1, 4770-3. The spine line 4720a may, for example, be associated with a fixed-line constraint to describe the intersection with the first and third existing line objects 4770-1, 4770-3.

In some embodiments, priority may be given to external joins associated with constraints determining the direction of the spine line 4720a. As shown in the side view of FIG. 47A, for example, there are at least two potential locations in the third dimension for the spine line 4720a. The first spine line location 4720a-1 intersects the spine line 4720a with the second existing line object 4770-2, while the second spine line location 4720a-2 intersects the spine line 4720a with the first and third existing line objects 4770-1, 4770-3. At least because the direction of the spine line 4720a may be partially defined by the fixed-line constraint tying the first spine line endpoints 4710-4a to the first and third existing line objects 4770-1, 4770-3, the second spine line location 4720a-2 may, according to some embodiments, be selected as the proper three-dimensional position for the spine line 4720a.

In the exemplary drawing 4700b, an exemplary spine line 4720b may comprise first and second spine line endpoints 4710-4b-1, 4710-4b-2 over a second existing plane object 4780b. In some embodiments, any external joins within the exemplary drawing 4700b may be tested to determine if they should be kept or removed. Assuming the left-most second spine line endpoint 4710-4b-1 is selected, for example, a gap 4768 may exist between the right-most second spine line endpoint 4710-4b-2 and the nearest plane point 4710-5. The gap 4768 may, according to some embodiments, be and/or represent a gap angle. The gap angle may, for example, be the angle formed between a line extending from the left-most second spine line point 4710-4a-1 and the right-most second spine line point 4710-4a-2 and a line extending from the left-most second spine line point 4710-4a-1 to the plane point 4710-5. According to some embodiments, external joins having gap angles below a certain threshold may be kept, while other may be filtered out and/or removed.

Figure 48A:
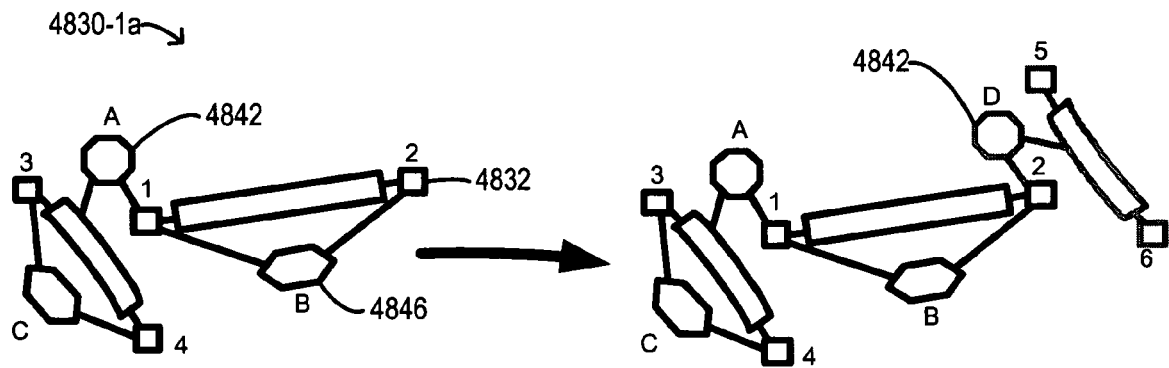
FIGS. 48A & 48B are diagrams of enhanced graphical frameworks according to some embodiments.
Figure 48B:
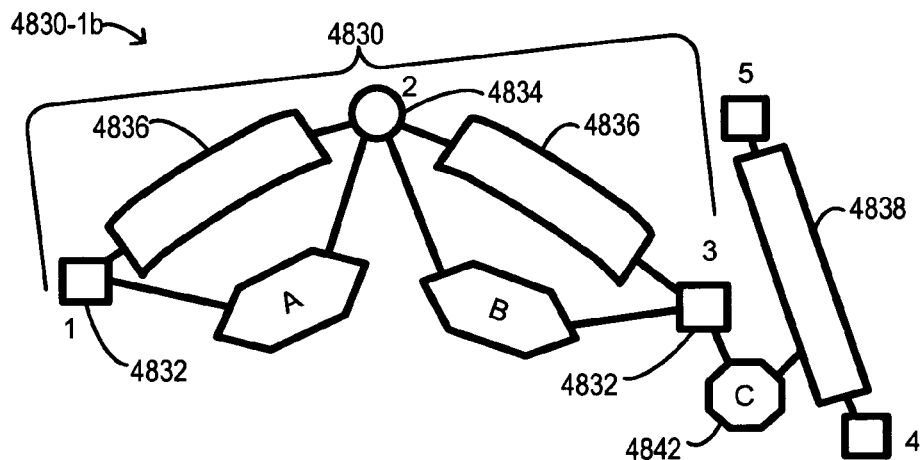
Figure 48C:
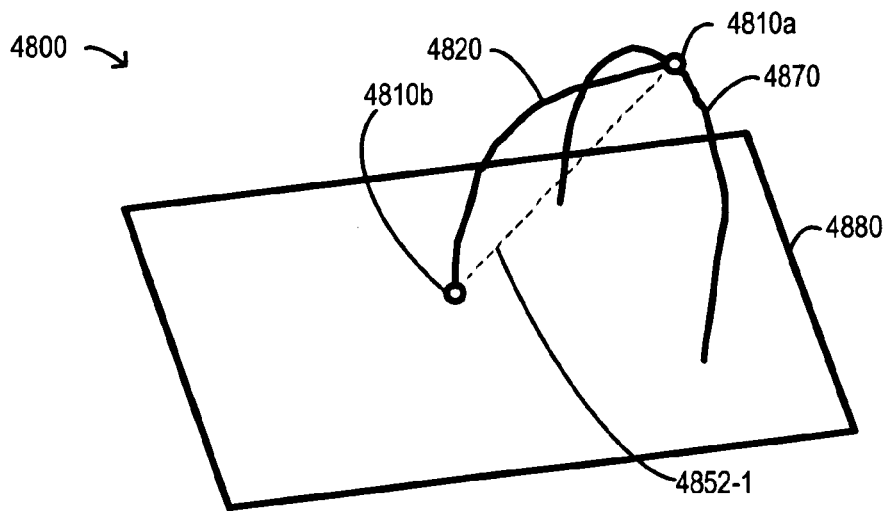
FIG. 48C is a diagram of a drawing according to some embodiments.

Turning to FIG. 48A, FIG. 48B, and FIG. 48C, diagrams of enhanced graphical frameworks 4830-1a, 4830-1b and a drawing 4800 according to some embodiments are shown, respectively. The enhanced graphical frameworks 4830-1a, 4830-1b and/or the drawing 4800 may, for example, be associated with the system 100 and/or with any of the methods 200, 300, 400, 500, 710, 910, 1310, 1720, 1824, 2630, 2732, 4230, 4400 described herein. In some embodiments, the enhanced graphical frameworks 4830-1a, 4830-1b and/or the drawing 4800 may be implemented with respect to the exemplary drawings 600, 2800, 4600c, 4700c to produce a three-dimensional sketch. According to some embodiments, the enhanced graphical frameworks 4830-1a, 4830-1b and/or the drawing 4800 may describe exemplary implementations of the method 4230 described in conjunction with FIG. 42.

The first enhanced graphical framework 4830-1a shown in FIG. 48A may, according to some embodiments, comprise various part and join objects. The first enhanced graphical framework 3830-1a may, for example, comprise four endpoint objects 4832, numbered one through four, and three join objects (e.g., a point-to-part join object 4842 and two end-of-part join objects 4846) labeled "A", "B", and "C". In some embodiments, the order of solving the constraints in the first enhanced graphical framework 4830-1a may be to solve point three based on point one (e.g., "$A_{1-3}$"), to solve point four based on point three (e.g., "$C_{3-4}$"), and then to solve point two based on point one (e.g., "$B_{1-2}$"). In some embodiments, solvers may be reversed to compute values in the correct order in the case that external joins are kept.

An external second point-to-part join object 4842 labeled "D" may be, for example, have been added (e.g., at 2732-1a) between the current framework objects (e.g., point two) and an object including points five and six. The object including points five and six may, according to some embodiments, be an existing object of the three-dimensional model. In some embodiments, such as in the case that the join "D" is determined to be kept (i.e., not removed), a solver associated with the join "D" may be added to the beginning of the solver list, and/or the solver associated with join "B" may be reversed to compute values in the correct order. The new order of solving may be, for example, to solve point two based on point five (e.g., "$D_{5-2}$"), to solve point one based on point two (e.g., "$B_{2-1}$"), to solve point three based on point one (e.g., "$A_{1-3}$"), and to solve point four based on point three (e.g., "$C_{3-4}$").

In some embodiments, the second enhanced graphical framework 4830-1b may represent the exemplary spine lines 1420, 1620d, 2220, 2520, 2820, 4620c, 4720c described herein. The second enhanced graphical framework 4830-1b may comprise, for example, an original framework 4830. In some embodiments, the original framework 4830 may comprise endpoint objects 4832, a midpoint object 4834, and/or curve part objects 4836 representing the user's arch-shaped input. In some embodiments, the original framework 4830 may also or alternatively comprise end-of-part join objects 4846. According to some embodiments, the endpoint objects 4832 and the midpoint object 4834 may be labeled, from left to right, as points one through three. The end-of-part join objects may also be labeled from left to right as join "A" and join "B". In some embodiments, the order for solving the original framework 4830 may be to solve point two based on point one (e.g., "$A_{1-2}$") and then to solve point three based on point two (e.g., "$B_{2-3}$").

According to some embodiments, the original framework 4830 may be connected via an external point-to-part join object 4842 (e.g., labeled join "C") to the right side of the existing table object 670, 2870, 3270a-b represented in the second enhanced graphical framework 4830-1b by a straight part object 4838 and two endpoint objects 4832 labeled points four and five, as shown. In some embodiments, the order of solving the original framework 4830 may be changed to accommodate the new join. The order of solving may become, for example, to solve point three based on point four (e.g., "$C_{4-3}$"), to solve point two based on point three (e.g., "$B_{3-2}$"), and to solve point one based on point two (e.g., "$A_{2-1}$"). In such a manner, for example, the order of solvers may be altered based on external join additions to maintain proper computational composition within the second enhanced graphical framework 4830-1b.

In the drawing 4800, an implementation of the method 4230 described in conjunction with FIG. 42 may be illustrated. The drawing 4800 may, for example, provide an example of how second directional constraints may be added (e.g., at 4236). In some embodiments, the drawing 4800 may comprise a spine line 4820 attached between an existing line object 4870 and an existing plane object 4880. The spine line 4820 may extend, for example, between a first point 4810a (e.g., on the existing line object 4870) and a second point 4810b (e.g., on the existing plane object 4880).

In some embodiments, such as in the case that a point-to-part join at the first point 4810a and a part-to-plane join at the second point 4810b are determined to be valid, secondary directional constraints may be created. For example, a base line component 4852-1 associated with a curve group of the spine line 4820 may, once the two joins are determined to be valid, be analyzed to determine one or more secondary directional constraints. The base line component 4852-1 may, for example, be associated with a fixed-line constraint due to the connection between the two points 4810a, 4810b. According to some embodiments, adding constraints (such as secondary directional constraints) based upon selected external joins may allow more precise computation of the orientation of the spine line 4820.

Figure 49:
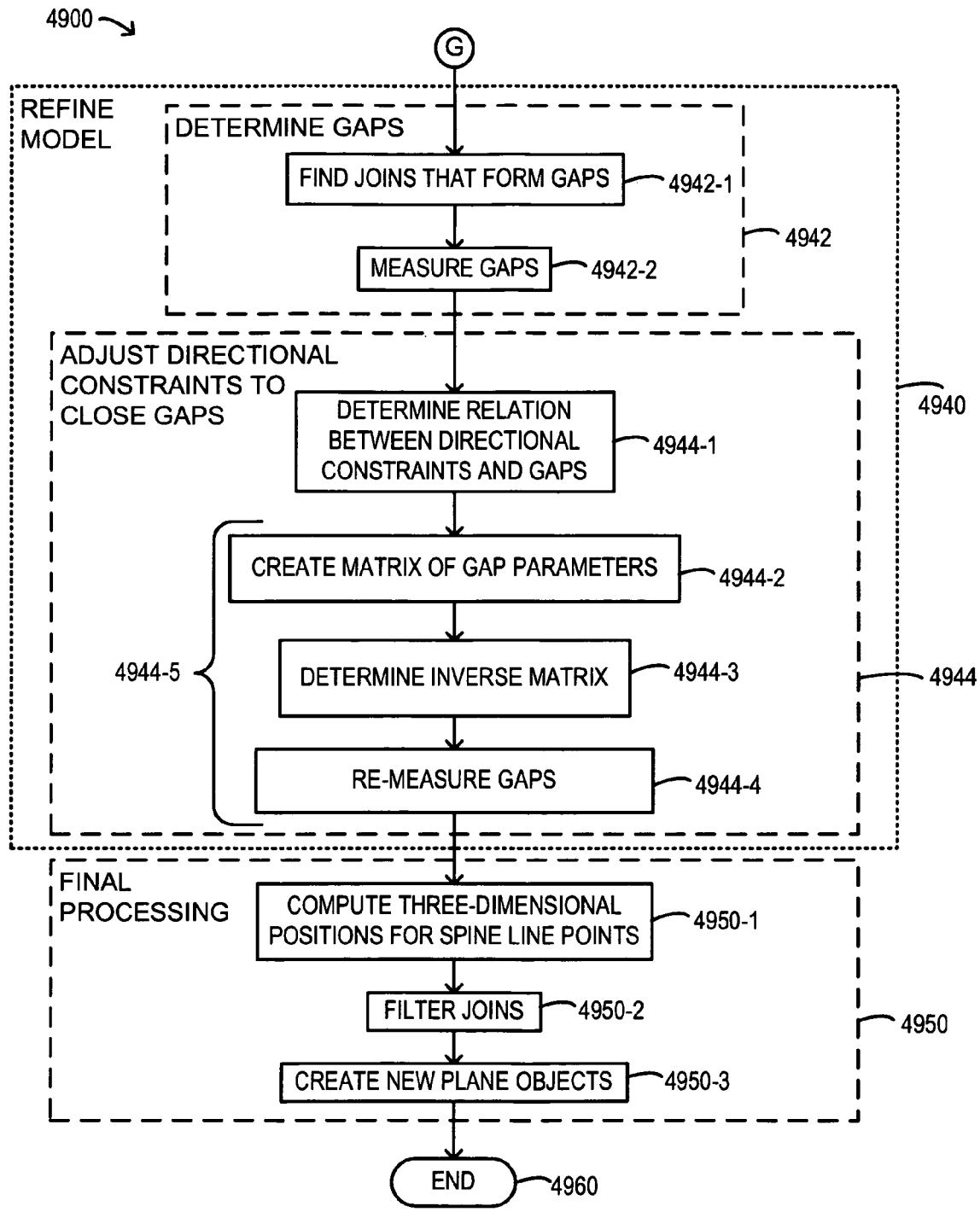
FIG. 49 is a flowchart of a method according to some embodiments.

Referring now to FIG. 49, a flowchart of a method 4900 according to some embodiments is shown. The method 4900 may, in some embodiments, be associated with the system 100 and/or any components thereof and/or may also or alternatively be associated with the methods 200, 300, 400, 500, 710, 910, 1310, 1720, 1824, 2630, 2732, 4230, 4400 described herein. The method 4900 may, for example, be a portion and/or continuation of the method 400 described in conjunction with FIG. 4. The method 4900 may, for example, be associated with refining the model at 440 and/or with the final processing at 450. In some embodiments, the method 4900 may also or alternatively be a continuation of the method 4230. The method 4900 may, for example, begin at G, where the method 4230 left off. In some embodiments, the method 4900 may also or alternatively be associated with the exemplary drawings 600, 2800, 4600c, 4700b described in conjunction with any of FIG. 6A, FIG. 6B, FIG. 28, FIG. 46C, and/or FIG. 47B herein.

In some embodiments, the method 4900 may begin at 4940 to refine the model. The refining of the model 4940 may, for example, proceed to determine gaps, at 4942. According to some embodiments, determining of the gaps 4942 may initiate to find join that form gaps at 4942-1. Any or all joins in the framework associated with the user's input may, for example, be analyzed to determine where gaps may occur and/or exist. In some embodiments, the determining of the gaps 4942 may also or alternatively measure the gaps, at 4942-2.

The method 4900 may, according to some embodiments, continue to adjust the directional constraints to close the identified gaps, at 4944. The adjusting of the constraints 4944 may, for example, determine the relation between the directional constraints and the gaps, at 4944-1. In some embodiments, the adjusting of the constraints 4944 may continue to create a matrix of gap parameters at 4944-2. The various parameters that define and/or are associated with the gaps may, for example, be utilized to create and/or populate a matrix. According to some embodiments, the adjusting 4944 may then determine an inverse to the matrix at 4944-3. In some embodiments, an LU decomposition technique may be utilized to determine an approximate inverse to the matrix of gap parameters. The adjusting 4944 may then, for example, re-measure the gaps at 4944-4. In some embodiments, the creation of the matrix at 4944-2, the determining of the inverse matrix at 4944-3, and/or the re-measuring of the gaps at 4944-4 may be repeated in a loop at 4944-5. The loop 4944-5 may, for example, process the gaps a number of times to substantially reduce the sizes of and/or to substantially eliminate the gaps. According to some embodiments, the loop 4944-5 may be repeated five times.

In some embodiments, the method 4900 may continue to undertake final processing at 4950. The final processing 4950 may begin, for example, to compute three-dimensional positions for the points of the spine lines, at 4950-1. The final processing 4950 may then, according to some embodiments, filter joins at 4950-2 and/or create new plane objects at 4950-3. The final processing 4950 may, in some embodiments, perform the various procedures to add the newly created three-dimensional lines and/or objects to the three-dimensional model. In some embodiments, the method 4900 may proceed to render the newly edited model and/or end at 4960.

Figure 50A:
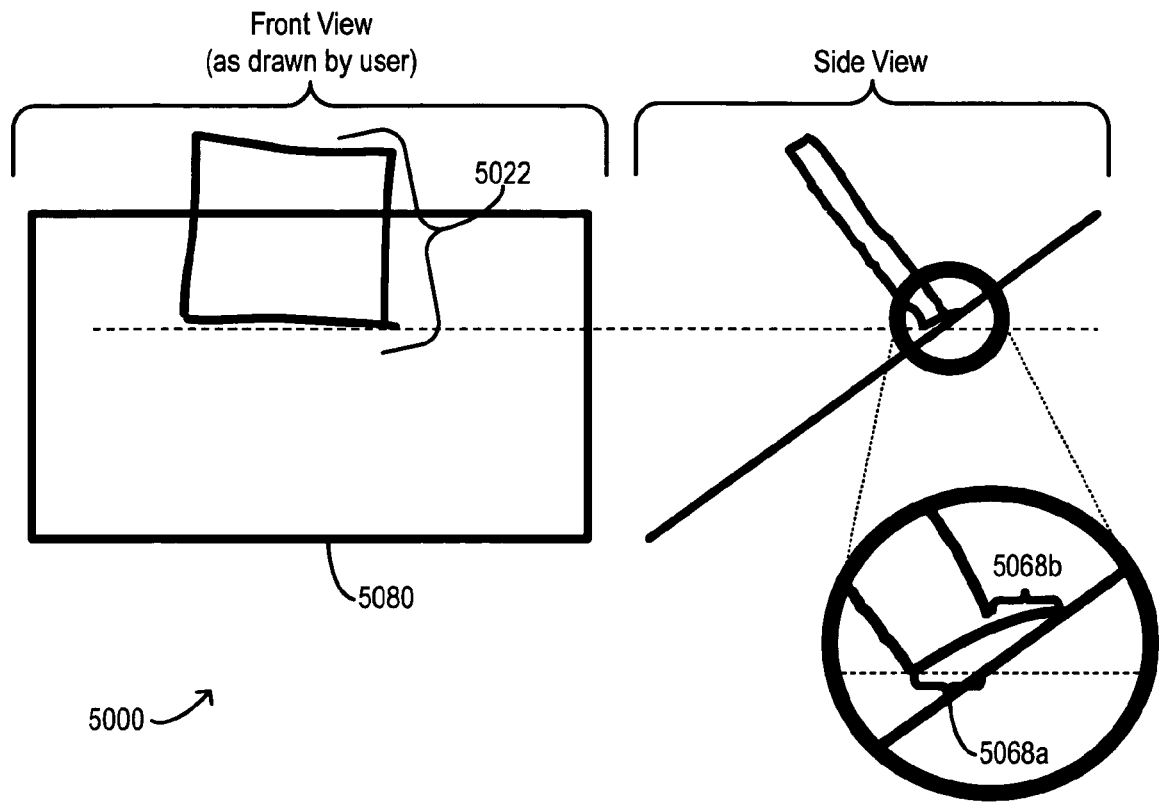
FIG. 50A is a diagram of a drawing according to some embodiments.
Figure 50B:
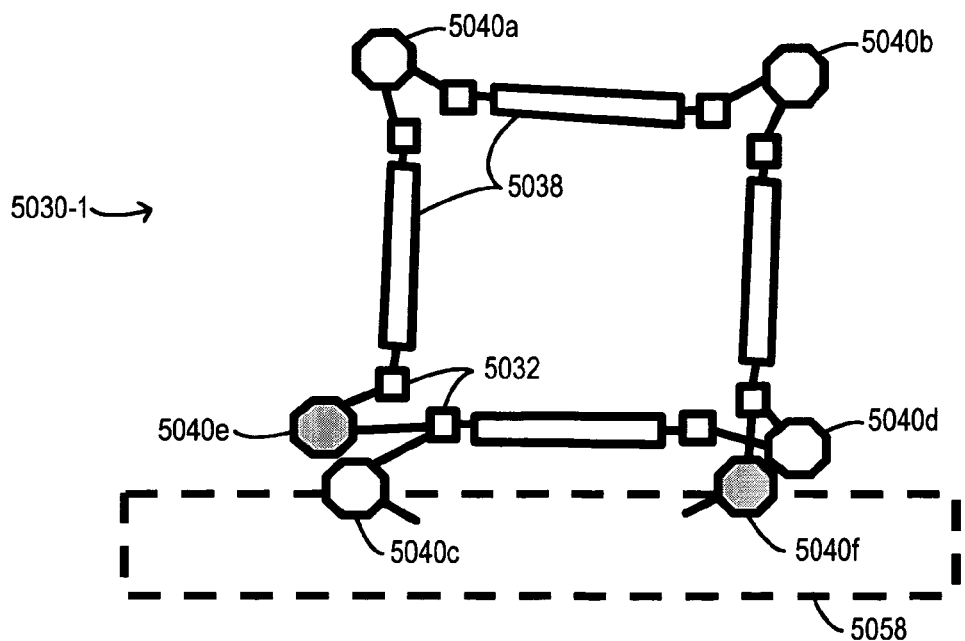
FIG. 50B is a diagram of an enhanced graphical framework according to some embodiments.

Referring now to FIG. 50A and FIG. 50B, a diagram of a drawing 5000 and of an enhanced graphical framework 5030-1 according to some embodiments are shown, respectively. The drawing 5000 and/or the enhanced graphical framework 5030-1 may, for example, be associated with the system 100 and/or with any of the methods 200, 300, 400, 500, 710, 910, 1310, 1720, 1824, 2630, 2732, 4230, 4200, 4900 described herein. In some embodiments, the drawing 5000 and/or the enhanced graphical framework 5030-1 may be implemented with respect to the exemplary drawings 600, 2800, 4600c, 4700b to produce a three-dimensional sketch. According to some embodiments, the drawing 5000 and/or the enhanced graphical framework 5030-1 may be exemplary implementations of the method 4900 described in conjunction with FIG. 49. The drawing 5000 and/or the enhanced graphical framework 5030-1 may, for example, be associated with finding joins that form gaps at 4942-1.

The drawing 5000 may, for example, comprise a set of spine lines 5022 that resemble a box shape drawn by a user in a front view. The set of spine lines 5022 may, in some embodiments, be positioned on and/or over an existing plane object 5080. As shown in the side view (and/or exploded side view), the orientation of the set of spine lines 5022 in the third dimension may leave one or more gaps 5068a-b. The first gap 5068a may, for example, exist between the set of spine lines 5022 and the existing plane object 5080, while the second gap 5068b may exist between parts of the set of spine lines 5022. Such gaps may, according to some embodiments, be likely due to the fact that hand-sketching is not precise, and even complex and/or efficient algorithms for solving hand sketch lines may not be perfect.

In some embodiments, the enhanced graphical framework 5030-1 may represent the set of spine lines 5022, a plane group object 5058 to represent the existing plane object 5080, and/or the relations thereof. The enhanced graphical framework 5030-1 may, for example, comprise various endpoint objects 5032 and/or various straight line part objects 5038 to represent the set of spine lines 5022. The enhanced graphical framework 5030-1 may also or alternatively comprise one or more join objects 5040a-f to represent the joins between the framework objects. According to some embodiments, the first, second, third, and fourth join objects 5040a-d may be solved (e.g., via solvers), while the fifth and sixth join objects 5040e-f may be unsolved and/or unresolved. In some embodiments, the unsolved join objects 5040e-f may coincide with, define, and/or represent the gaps 5068a-b. In the case that join objects 5040a-f form a loop of joins, as in the case of the drawing 5000, not all join objects 5040a-f and/or the joins represented thereby may be solvable. The result, for example, may produce the gaps 5068a-b.

Figure 51:
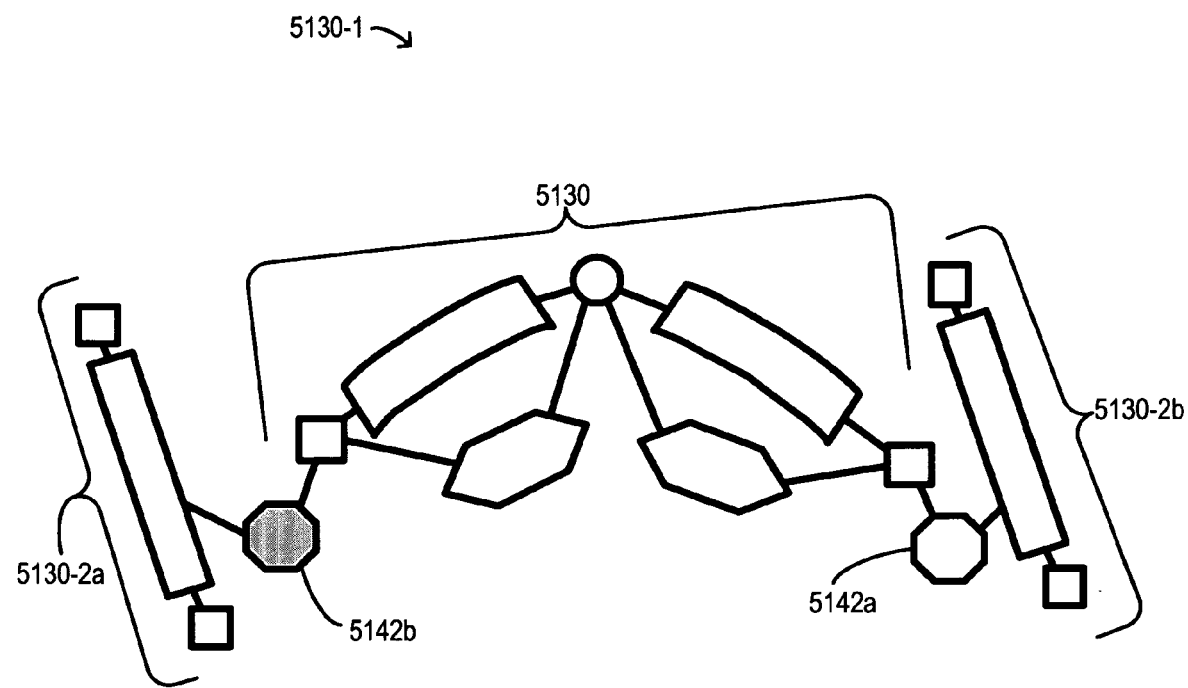
FIG. 51 is a diagram of an enhanced graphical framework according to some embodiments.

Turning to FIG. 51, of an enhanced graphical framework 5130-1 according to some embodiments are shown. The enhanced graphical framework 5130-1 may, for example, be associated with the system 100 and/or with any of the methods 200, 300, 400, 500, 710, 910, 1310, 1720, 1824, 2630, 2732, 4230, 4200, 4900 described herein. In some embodiments, the enhanced graphical framework 5130-1 may be implemented with respect to the exemplary drawings 600, 2800, 4600c, 4700b to produce a three-dimensional sketch. According to some embodiments, the enhanced graphical framework 5130-1 may be an exemplary implementation of the method 4900 described in conjunction with FIG. 49. The enhanced graphical framework 5130-1 may, for example, be associated with finding joins that form gaps at 4942-1.

In some embodiments, the enhanced graphical framework 5130-1 may comprise an original framework 5130 representing the exemplary spine lines 1420, 1620d, 2220, 2520, 2820, 4620c, 4720b described herein. The enhanced graphical framework 5130-1 may also or alternatively comprise existing frameworks 5130-2a, 5130-2b representing the left and right edges of the existing table object 670, 2870, respectively. According to some embodiments, the enhanced graphical framework 5130-1 may also or alternatively comprise one or more join objects 5142a-b representing the point-to-part joins between the original framework 5030 and the existing frameworks 5130-2a, 5130-2b. The first join object 5142a may, for example, be solved, while the second join object 5140b may be unsolved, forming and/or representing a gap between the left end of the exemplary spine line and the left edge of the table. According to some embodiments, this gap may be identified and then closed.

Figure 52:
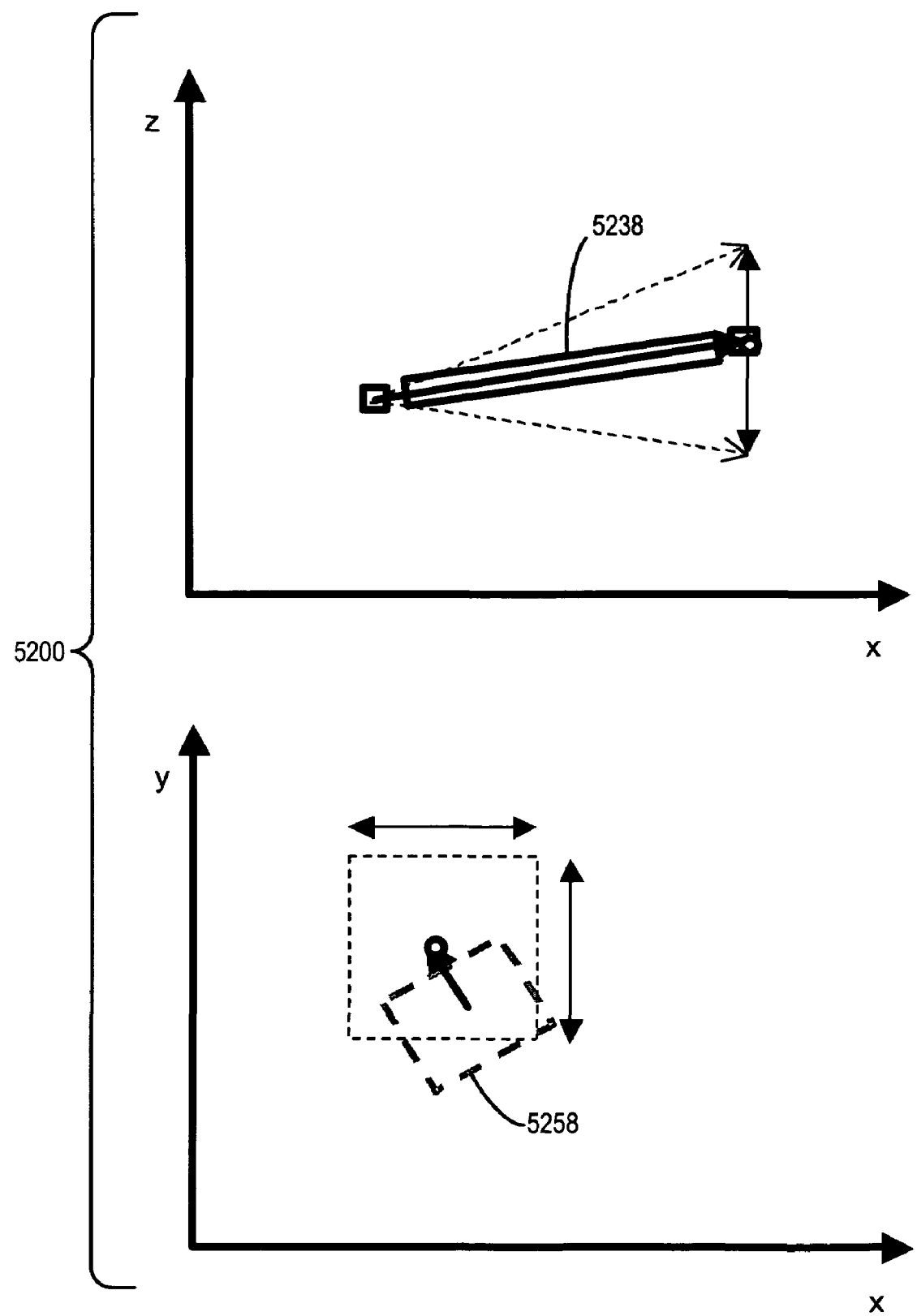
FIG. 52 is a diagram of a graphical analysis method according to some embodiments.

Referring to FIG. 52, for example, diagrams of a graphical analysis method 5200 according to some embodiments are shown. The graphical analysis method 5200 may, for example, be associated with the system 100 and/or with any of the methods 200, 300, 400, 500, 710, 910, 1310, 1720, 1824, 2630, 2732, 4230, 4400, 4900 described herein. According to some embodiments, the graphical analysis method 5200 may be an exemplary implementation of the method 4900 described in conjunction with FIG. 49. The graphical analysis method 5200 may, for example, be associated with adjusting directional constraints to close gaps at 4942-1.

In some embodiments, directional constraints associated with framework objects such as those shown in FIG. 51 may be modified and/or adjusted to close any identified gaps. Framework objects with line-like vectors (such as a straight line part object 5238) may, for example, be modified by changing a constraint value in the third-dimension (e.g., along the z-axis). Framework objects with normal-like vectors (such as a plane group object 5258) may, for example, be modified by changing constraint values in either or both of the x-axis and/or y-axis directions. According to some embodiments, the constraints associated with framework objects may be adjusted in a manner that substantially retains the look and/or structure of the user's hand-drawn input. Changing the z-axis position of the straight line part object 5238 by changing a value of an associated constraint, for example, may be transparent to the user that provided the input for the line in a view of only the x-axis and y-axis directions. In some embodiments, line-like framework objects may therefore have one-dimension of freedom for correction, while plane-like objects may have two-dimensions of freedom for correction.

Figure 53:
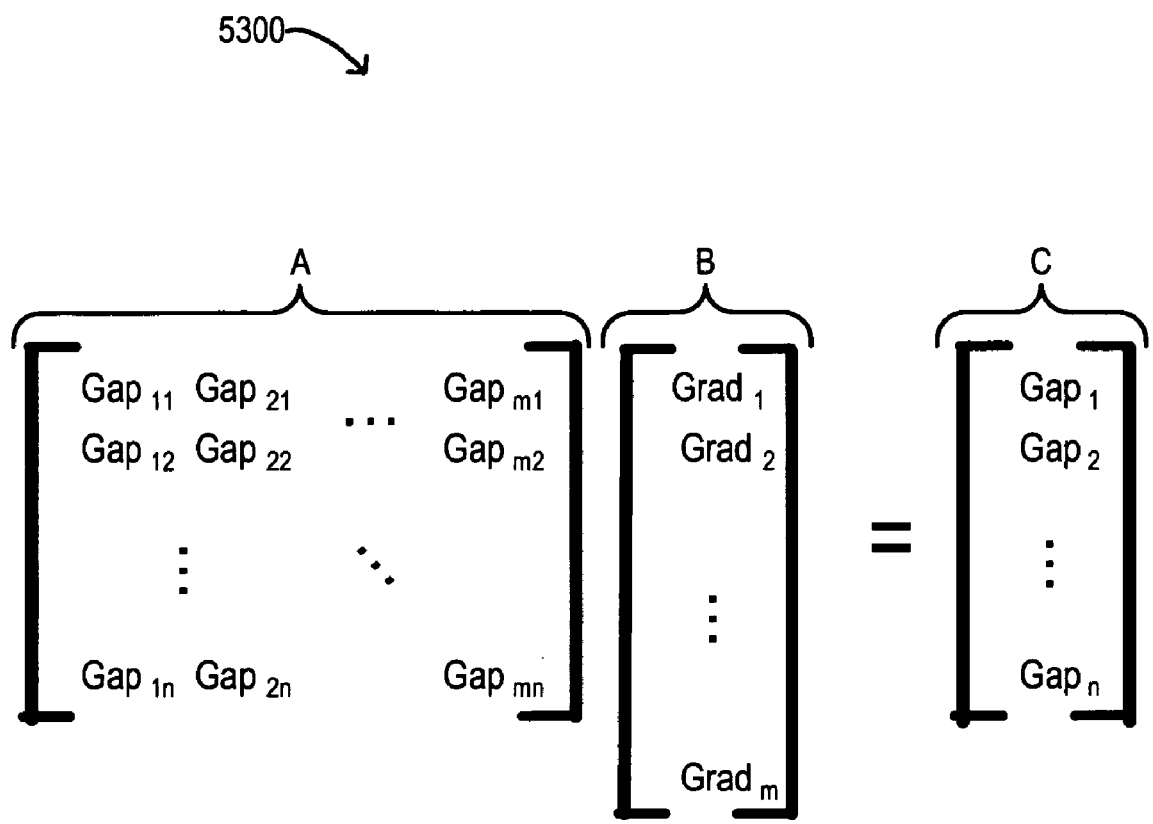
FIG. 53 is a diagram of a graphical analysis method according to some embodiments.

Turning to FIG. 53, a diagram of a graphical analysis method 5300 according to some embodiments are shown. The graphical analysis method 5300 may, for example, be associated with the system 100 and/or with any of the methods 200, 300, 400, 500, 710, 910, 1310, 1720, 1824, 2630, 2732, 4230, 4400, 4900 described herein. In some embodiments, the graphical analysis method 5300 may be implemented with respect to the exemplary drawings 600, 2800, 4600c, 4700b to produce a three-dimensional sketch. According to some embodiments, the graphical analysis method 5300 may be an exemplary implementation of the method 4900 described in conjunction with FIG. 49. The graphical analysis method 5300 may, for example, be associated with the loop that utilizes matrix operations to close gaps at 4944-5.

According to some embodiments, the graphical analysis method 5300 may comprise three matrices labeled "A", "B", and "C". In some embodiments, the matrix "A" may be computed based on the parameters associated with the identified gaps. The columns of the "A" matrix may, for example, represent the number of modifiable dimensions of the directional solvers associated with the gaps. A column may be computed, according to some embodiments, by setting one parameter to a small value and setting all other parameters to zero. Any directional and/or positional solvers may then be re-computed, for example, and the gaps re-measured to determine how the parameter is related to the gaps. These gap values may, according to some embodiments, be used as the values for the column of the "A" matrix. In some embodiments, this method may be repeated for each column in the "A" matrix. According to some embodiments, the original gap values (e.g., with all parameters set to zero) may be stored in the "C" matrix. According to some embodiments, the "B" matrix may be a solution to the direction values (e.g., of the directional constraints) given known values for the matrix "C" (e.g., known gap values).

In some embodiments, matrix decomposition techniques such as LU decomposition may be used to close the gaps. In the case that a single iteration of the graphical analysis method 5300 may not substantially close the gaps, the graphical analysis method 5300 may be repeated as desired. In the case that the graphical analysis method 5300 may cause the gaps to grow larger, the values of the result vector may be halved to facilitate gap reduction.

Figure 54:
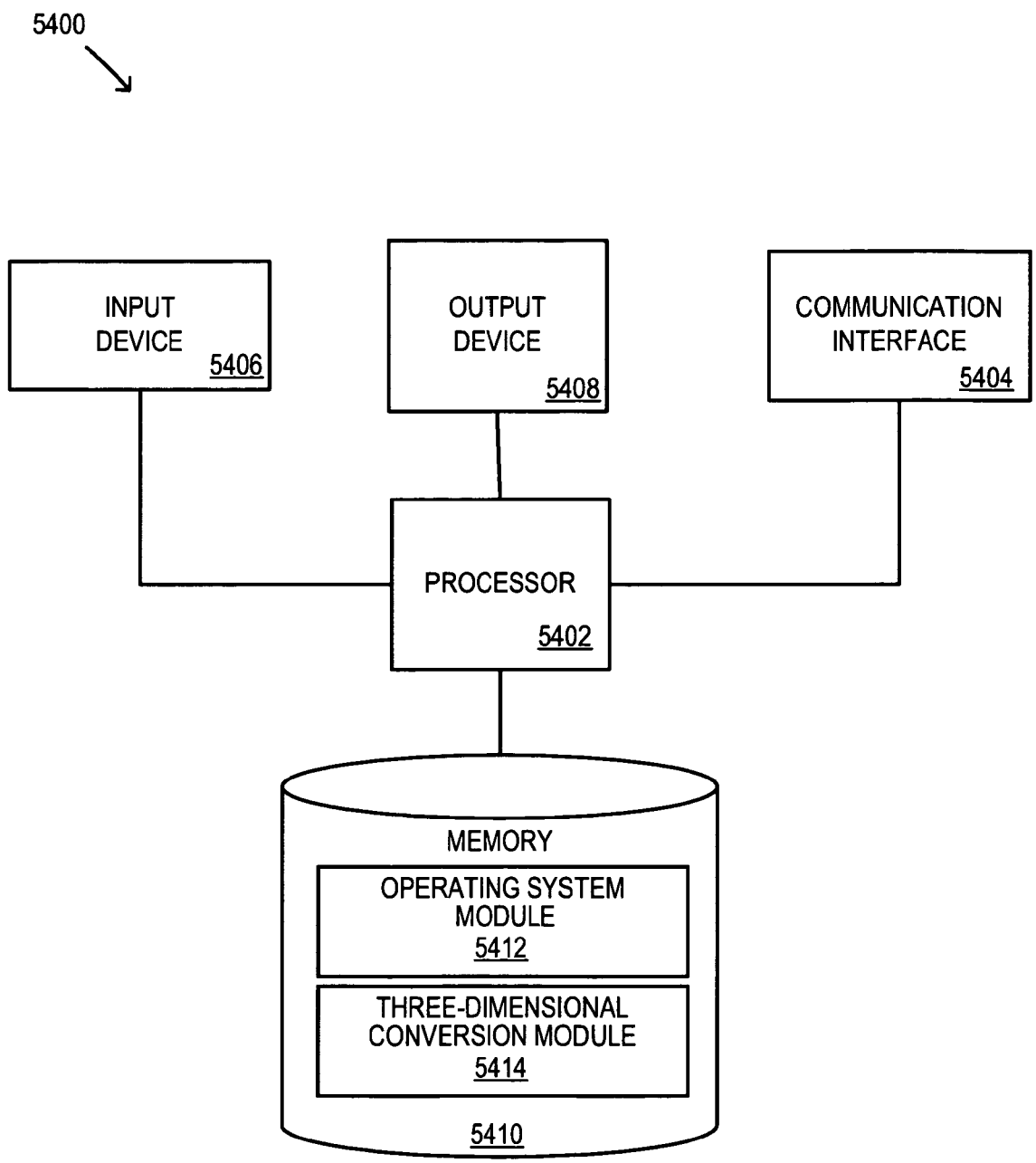
FIG. 54 is a diagram of a system according to some embodiments.

Referring now to FIG. 54, a block diagram of a system 5400 according to some embodiments is shown. The system 5400 may, for example, be utilized to implement and/or perform the methods 200, 300, 400, 500, 710, 910, 1310, 1720, 1824, 2630, 2732, 4230, 4400, 4900 described herein and/or may be associated with the exemplary drawings 600, 2800, 4600c, 4700b described in conjunction with any of FIG. 2, FIG. 3, FIG. 4, FIG. 5, FIG. 6, FIG. 7, FIG. 9, FIG. 13, FIG. 17, FIG. 18, FIG. 26, FIG. 27, FIG. 28, FIG. 42, FIG. 44, FIG. 46C, FIG. 47B, and/or FIG. 49. In some embodiments, fewer or more components than are shown in FIG. 54 may be included in the system 5400. According to some embodiments, different types, layouts, quantities, and configurations of systems may be used.

In some embodiments, the system 5400 may be or include a computer such as a PC, a notebook, a server, and/or a Personal Digital Assistant (PDA). In some embodiments, the system 5400 may include one or more processors 5402, which may be any type or configuration of processor, microprocessor, and/or microengine that is or becomes known or available. In some embodiments, the system 5400 may also or alternatively include a communication interface 5404, an input device 5406, an output device 5408, and/or a memory device 5410, all and/or any of which may be in communication with the processor 5402. The memory device 5410 may store, for example, an operating system module 5412 and/or a three-dimensional conversion module 5414.

The communication interface 5404, the input device 5406, and/or the output device 5408 may be or include any types and/or configurations of devices that are or become known or available. According to some embodiments, the input device 5406 may include a keypad, a mouse, a digitizer, one or more buttons, and/or one or more softkeys and/or variable function input devices. The communication interface 5404 may, according to some embodiments, allow the system 5400 to communicate with various other devices, systems, and/or computers as desired.

The memory device 5410 may be or include, according to some embodiments, one or more magnetic storage devices, such as hard disks, one or more optical storage devices, and/or solid state storage. The memory device 5410 may store, for example, the operating system module 5412 and/or the three-dimensional conversion module 5414. The modules 5412, 5414 may be any type of applications, modules, programs, and/or devices that are capable of facilitating three-dimensional sketching. Either or both of the operating system module 5412 and/or the three-dimensional conversion module 5414 may, for example, comprise instructions that cause the processor 5402 to operate the system 5400 in accordance with embodiments as described herein.

For example, the three-dimensional conversion module 5414 may be operable to receive input (e.g., via the input device 5406) from a user associated with creating, defining, and/or editing a three-dimensional sketch. According to some embodiments, the three-dimensional conversion module 5414 may convert the user's input (e.g., two-dimensional and/or hand-drawn input) into three-dimensional lines within a three-dimensional model. In some embodiments, the user's input may be converted in a manner consistent with embodiments described herein that maintains the look, feel, and/or overall structure of the user's input while significantly closing the gaps in the three-dimensional model. In some embodiments, if the resulting three-dimensional positions of the user's input are not perfect and/or as desired by the user, the user may interface with the system 5400 and/or with the three-dimensional conversion module 5414 to correct the three-dimensional positioning. In such a manner, for example, the user may easily and/or effectively utilize the system 5400 to produce a true three-dimensional sketch that may be rendered and/or viewed as desired.

Figure 55:
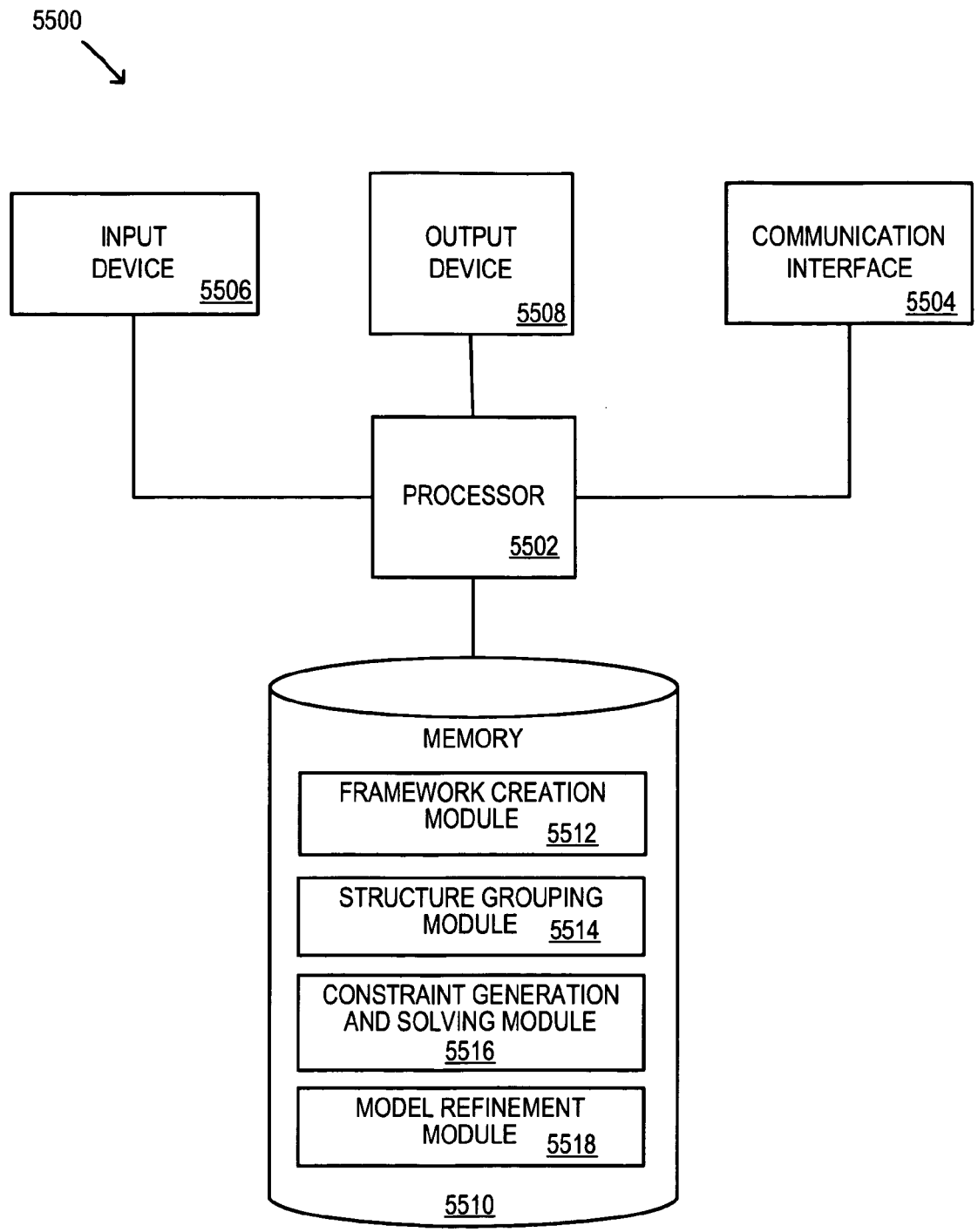
FIG. 55 is a diagram of a system according to some embodiments.

Referring to FIG. 55, a block diagram of a system 5500 according to some embodiments is shown. The system 5500 may, for example, be utilized to implement and/or perform the methods 200, 300, 400, 500, 710, 910, 1310, 1720, 1824, 2630, 2732, 4230, 4400, 4900 described herein and/or may be associated with the exemplary drawings 600, 2800, 4600c, 4700b described in conjunction with any of FIG. 2, FIG. 3, FIG. 4, FIG. 5, FIG. 6, FIG. 7, FIG. 9, FIG. 13, FIG. 17, FIG. 18, FIG. 26, FIG. 27, FIG. 28, FIG. 42, FIG. 44, FIG. 46C, FIG. 47B, and/or FIG. 49. In some embodiments, fewer or more components than are shown in FIG. 55 may be included in the system 5500. According to some embodiments, different types, layouts, quantities, and configurations of systems may be used.

In some embodiments, the system 5500 may be or include a computer such as a PC, a notebook, a server, and/or a Personal Digital Assistant (PDA). In some embodiments, the system 5500 may include one or more processors 5502, which may be any type or configuration of processor, microprocessor, and/or microengine that is or becomes known or available. In some embodiments, the system 5500 may also or alternatively include a communication interface 5504, an input device 5506, an output device 5508, and/or a memory device 5510, all and/or any of which may be in communication with the processor 5502. The memory device 5510 may store, for example, framework creation module 5512, a structure grouping module 5514, a constraint generation and solving module 5516, and/or a model refinement module 5518.

The communication interface 5504, the input device 5506, and/or the output device 5508 may be or include any types and/or configurations of devices that are or become known or available. According to some embodiments, the input device 5506 may include a keypad, a mouse, a digitizer, one or more buttons, and/or one or more softkeys and/or variable function input devices. The communication interface 5504 may, according to some embodiments, allow the system 5500 to communicate with various other devices, systems, and/or computers a desired.

The memory device 5510 may be or include, according to some embodiments, one or more magnetic storage devices, such as hard disks, one or more optical storage devices, and/or solid state storage. The memory device 5510 may store, for example, the framework creation module 5512, the structure grouping module 5514, the constraint generation and solving module 5516, and/or the model refinement module 5518. The modules 5512, 5514, 5516, 5518 may be any type of applications, modules, programs, and/or devices that are capable of facilitating three-dimensional sketching. The modules 5512, 5514, 5516, 5518 may, for example, comprise instructions that cause the processor 5502 to operate the system 5500 in accordance with embodiments as described herein.

The framework creation module 5512 may, for example, create framework objects associated with input received from a user. In some embodiments, the framework creation module 5512 may implement, for example, the creation of the framework at 410, 710, 910, 1310. The structure grouping module 5514, according to some embodiments, may group parts of the framework into recognizable structures. The structure grouping module 5514 may, for example, implement the grouping of structures at 420, 1720, 1824. The constraint generation and solving module 5516 may, according to some embodiments, produce, create, and/or otherwise determine constraints and/or solve the constraints associated with the framework. The constraint generation and solving module 5516 may, for example, implement the generation and solving of constraints at 430, 2630, 2732, 4230. In some embodiments, the model refinement module 5518 may refine the three-dimensional model by substantially closing gaps in the framework. The model refinement module 5518 may, for example, implement the model refinement at 440, 4940.

The several embodiments described herein are solely for the purpose of illustration. Persons skilled in the art will recognize from this description that other embodiments may be practiced with modifications and alterations limited only by the claims.

What is claimed is:

1. A computer-implemented method to be executed by a processor, the method comprising:

receiving an indication of graphical input data from an input device, comprising two-dimensional data;

simplifying one or more segments of the graphical input data;

grouping the simplified segments of the graphical input data to form one or more spine lines;

determining a structure associated with the grouped simplified segments;

determining one or more component line parts to be added to the determined structure, wherein the one or more component line parts describe the determined structure, and wherein the determined structure comprises a first shape and the component line parts comprise a second shape;

creating one or more framework objects for one or more portions of the spine lines based at least in part on the one or more component line parts;

identifying joins between the one or more framework objects;

grouping the one or more portions of the spine lines into recognizable structures;

solving one or more constraints associated with a third dimension comprising:

defining a first positional constraint and a first directional constraint associated with the one or more framework objects;

solving the first positional constraints and the first directional constraint, wherein solving the first positional and directional constraints comprises defining a second directional constraint associated with the one or more framework objects;

determining gaps associated with the framework objects;

if gaps are determined, then adjusting at least one of the first directional constraint or the second directional constraint to close the determined gaps; and displaying an image associated with the framework objects.

2. The computer-implemented method of claim 1, further comprising:

determining to convert the graphical input data into three-dimensional data.

3. The computer-implemented method of claim 1, wherein the receiving of the indication of the graphical input data comprises:
   receiving an indication of two-dimensional graphical data from an input device.

4. The computer-implemented method of claim 3, wherein the input device is at least one of a digitizer or a pointer device.

5. The computer-implemented method of claim 1, wherein the simplifying of the one or more segments of the graphical input data comprises:
   identifying one or more points defined by the graphical input data;
   determining to remove one or more of the identified points; and
   removing the one or more determined points.

6. The computer-implemented method of claim 1, wherein the grouping of the simplified segments of the graphical input data to form the one or more spine lines comprises:
   identifying one or more line segments defined by the graphical input data;
   creating a region around each of the identified one or more line segments; and
   combining any overlapping regions to form one or more polygons.

7. The computer-implemented method of claim 6, wherein the regions comprise boxes defined by points offset from the one or more spine line segments.

8. The computer-implemented method of claim 6, wherein the regions comprise one or more probability regions and wherein overlap is defined by an overlap between two or more probability areas associated with one or more probability values.

9. The computer-implemented method of claim 6, wherein the grouping of the simplified segments of the graphical input data to form the one or more spine lines further comprises:
   converting the one or more polygons into the one or more spine lines; and
   merging the one or more spine lines at any intersections and corners.

10. The computer-implemented method of claim 9, wherein the converting the one or more polygons into the one or more spine lines comprises:
   simplifying the one or more polygons;
   pairing opposing segments of the one or more polygons;
   filtering the paired polygon segments;
   grouping the paired polygon segments into one or more polygon sections; and
   converting the one or more polygon sections into one or more spine line points.

11. The computer-implemented method of claim 10, wherein the converting of the one or more polygon sections into the one or more spine line points, comprises:
   pairing points on opposite sides of each of the one or more polygon sections;
   connecting the paired points with rung lines; and
   identifying the midpoints of the rung lines as the one or more spine line points.

12. The computer-implemented method of claim 1, wherein the creating of the one or more framework objects for the one or more portions of the one or more spine lines comprises:
   identifying any straight portions of the one or more spine lines;
   identifying any corners of the one or more spine lines;
   determining the sharpness of any identified corners;
   splitting the one or more spine lines into one or more parts; and
   creating a framework object for each of the parts of the one or more spine lines.

13. The computer-implemented method of claim 12, wherein the straight portions of the one or more spine lines are identified by performing a least squares analysis on the one or more spine lines.

14. The computer-implemented method of claim 13, wherein the least squares analysis is performed in both directions along the one or more spine lines.

15. The computer-implemented method of claim 12, wherein the splitting of the one or more spine lines into the one or more parts comprises:
   splitting the one or more spine lines into one or more of a straight part, a curved part, a point, or an endpoint.

16. The computer-implemented method of claim 1, wherein the identifying the joins between the one or more framework objects comprises:
   identifying connections between one or more parts of the one or more spine lines;
   creating point-to-point join objects between the framework objects associated with any identified connections between spine line point parts;
   creating point-to-part join objects between the framework objects associated with any identified connections between spine line point parts and other spine line parts;
   removing redundant and circular join objects;
   determining a sharpness of each of the joins; and
   storing an indication of the sharpness of the joins associated with the join objects.

17. The computer-implemented method of claim 1, wherein the grouping of the one or more portions of the spine lines into recognizable structures comprises:
   grouping curve parts of the one or more spine lines into one or more curve groups; and
   grouping straight parts of the one or more spine lines into one or more straight-line groups.

18. A computer-implemented method to be executed by a processor, the method comprising:
   receiving graphical input data from an input device;
   determining a framework associated with the graphical input data comprising two-dimensional data, wherein determining a framework comprises:
      determining a structure;
      determining one or more component line parts to be added to the determined structure, wherein the one or more component line parts describe the determined structure, and wherein the determined structure comprises a first shape and the component line parts comprise a second shape;
   determining one or more positional constraints associated with the framework and associated with a third dimension;
   determining one or more first directional constraints associated with the framework and associated with the third dimension;
   solving the one or more first directional constraints, wherein solving the one or more first directional constraints comprises defining one or more second directional constraints associated with the framework and associated with the third dimension;
   solving the one or more positional constraints;
   defining one or more second directional constraints;
   determining gaps associated with the determined structure;

if gaps are determined, then adjusting at least one of the first directional constraints or one of the second directional constraints to close the determined gaps; and displaying an image associated with the determined structure.

19. The computer-implemented method of claim 18, wherein the determining of the framework associated with the graphical input data further comprises:

receiving an indication of the graphical input data;

simplifying one or more segments of the graphical input data;

grouping the simplified segments of the graphical input data to form one or more spine lines, wherein the structure is associated with the grouped simplified segments;

creating one or more framework objects for one or more portions of the spine lines;

identifying joins between the one or more framework objects; and grouping the one or more portions of the spine lines into recognizable structures.

20. The computer-implemented method of claim 18, wherein the determining of the one or more positional constraints comprises:

identifying connections between one or more objects of the framework and one or more objects within an existing three-dimensional model framework;

creating point-to-point join objects between any identified connections between framework point objects and model framework point objects;

creating point-to-part join objects between any identified connections between framework point objects and model framework part objects or between framework part objects and model framework point objects;

identifying joins between the one or more framework objects;

defining any point-to-point joins between the one or more framework objects;

defining any point-to-part joins between the one or more framework objects; and creating part-part joins between any framework part objects that intersect.

21. The computer-implemented method of claim 18, wherein the determining of the one or more first directional constraints comprises:

determining at least one of a parallel constraint, a right-angle constraint, a parallel planes constraint, a perpendicular-to-plane constraint, a parallel-to-plane constraint, a rung direction constraint, a fixed-line constraint, a line direction constraint, a plane direction constraint, a group orient constraint, or a part-of-group constraint.

22. The computer-implemented method of claim 18, wherein the solving of the one or more first directional constraints comprises:

selecting one or more solvers for the one or more first directional constraints; and applying the selected solvers to solve the one or more first directional constraints.

23. The computer-implemented method of claim 18, wherein the solving of the one or more positional constraints comprises:

selecting one or more solvers for the one or more positional constraints; and applying the selected solvers to solve the one or more positional constraints.

24. The computer-implemented method of claim 18, wherein the defining of the one or more second directional constraints comprises:

identifying connections between one or more framework part objects and one or more plane objects within an existing three-dimensional model framework;

creating part-to-plane join objects between any identified connections between framework part objects and model framework plane objects;

identifying connections between one or more framework part objects and one or more mesh objects within the existing three-dimensional model framework;

creating part-to-mesh join objects between any identified connections between framework part objects and model framework mesh objects.

25. The computer-implemented method of claim 24, wherein the defining of the one or more second directional constraints further comprises:

identifying any external joins in the framework;

filtering the identified external joins;

re-applying one or more solvers utilized to solve the one or more first directional constraints; and defining the one or more second directional constraints based at least in part on the filtered external joins.

26. A computer-implemented method to be executed by a processor, the method comprising:

receiving graphical input data from an input device;

determining a framework associated with the graphical input data comprising two-dimensional data, wherein determining of the framework associated with the graphical input data comprises:

determining a structure;

determining one or more component line parts to be added to the determined structure, wherein the one or more component line parts describe the determined structure, and wherein the determined structure comprises a first shape and the component line parts comprise a second shape;

determining one or more constraints associated with the framework and associated with a third-dimension, wherein the one or more constraints comprise at least one or more first directional constraints;

solving the one or more first directional constraints, wherein solving the one or more first directional constraint comprises defining one or more second directional constraint associated with the third dimension;

identifying gaps within the framework; and if gaps are determined, then adjusting at least one of one or more first directional constraints or one or more of the second directional constraints to close the determined gaps; and displaying an image associated with the framework.

27. The computer-implemented method of claim 26, wherein the determining of the framework associated with the graphical input data further comprises:

receiving an indication of the graphical input data;

simplifying one or more segments of the graphical input data;

grouping the simplified segments of the graphical input data to form one or more spine lines, wherein the structure is associated with the grouped simplified segments;

creating one or more framework objects for one or more portions of the spine lines;

identifying joins between the one or more framework objects; and grouping the one or more portions of the spine lines into recognizable structures.

28. The computer-implemented method of claim 26, wherein the determining of the one or more constraints associated with the framework comprises:
- determining one or more positional constraints;
- determining one or more first directional constraints;
- solving the one or more first directional constraints;
- solving the one or more positional constraints; and
- defining one or more second directional constraints.

29. The computer-implemented method of claim 26, further comprising:
- determining three-dimensional positions for any spine line points associated with the framework;
- filtering any joins within the framework;
- creating one or more new framework plane objects; and
- rendering the graphical input data in three-dimensions.

30. The computer-implemented method of claim 26, the identifying of the gaps within the framework comprises:
- identifying joins within the framework that form gaps; and
- measuring the gaps.

31. The computer-implemented method of claim 30, wherein the joins that form gaps are joins that have not been completely solved.

32. The computer-implemented method of claim 26, wherein the adjusting of the one or more first directional constraints or one or more of the second directional constraints to close the identified gaps comprises:
- determining a relationship between each of the one or more directional constraints and the gaps;
- creating a matrix of gap parameters;
- determining an inverse matrix; and
- re-measuring the gaps.

33. The computer-implemented method of claim 32, wherein the creating of the matrix of gap parameters, the determining of the inverse matrix, and the re-measuring of the gaps is repeated until the gaps are substantially closed.

34. A computer-implemented method to be executed by a processor, the method comprising:
- receiving an indication of graphical input data from an input device, the graphical input data comprising two-dimensional data;
- simplifying one or more segments of the graphical input data;
- grouping the simplified segments of the graphical input data to form one or more spine lines;
- determining a structure associated with the grouped simplified segments;
- determining one or more component line parts to be added to the determined structure, wherein the one or more component line parts describe the determined structure, and wherein the determined structure comprises a first shape and the component line parts comprise a second shape;
- creating one or more framework objects for one or more portions of the spine lines based at least in pan on the one or more component line parts;
- identifying joins between the one or more framework objects;
- grouping the one or more portions of the spine lines into recognizable structures;
- determining one or more positional constraints associated with the one or more framework objects associated with a third dimension;
- determining one or more first directional constraints associated with the one or more framework objects and associated with the third dimension;
- solving the one or more first directional constraints associated with the third dimension;
- solving the one or more positional constraints associated with the third dimension;
- defining one or more second directional constraints associated with the one or more framework objects and associated with the third dimension;
- identifying gaps within the framework;
- if gaps are determined, then adjusting the at least one of the one or more first directional constraints or the one or more second directional constraints to close the identified gaps; and
- displaying an image associated with the framework.

35. The computer-implemented method of claim 34, further comprising:
- determining to convert the graphical input data into three-dimensional data.

36. The method of claim 35, wherein the graphical input data represents a portion of a drawing.

37. The computer-implemented method of claim 36, wherein the determining to convert the graphical input data into the three-dimensional data comprises:
- receiving an indication to change a view of the drawing.

38. The computer-implemented method of claim 36, wherein the determining to convert the graphical input data into the three-dimensional data comprises:
- receiving an indication to change a parameter associated with the drawing.

39. The computer-implemented method of claim 34, further comprising:
- determining three-dimensional positions for any points of the one or more spine line;
- filtering joins within the framework; and
- creating one or more new framework plane objects.

40. The computer-implemented method of claim 34, further comprising:
- rendering the graphical input data in three-dimensions.

* * * * *

UNITED STATES PATENT AND TRADEMARK OFFICE
CERTIFICATE OF CORRECTION

PATENT NO. : 7,586,490 B2  Page 1 of 1
APPLICATION NO. : 11/111168
DATED : September 8, 2009
INVENTOR(S) : Richard McDaniel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 907 days.

Signed and Sealed this

Fourteenth Day of September, 2010

David J. Kappos
*Director of the United States Patent and Trademark Office*